United States Patent
Kinamon et al.

(10) Patent No.: US 10,177,832 B2
(45) Date of Patent: Jan. 8, 2019

(54) USING A COAXIAL CABLE FOR DISTRIBUTING MIMO SIGNALS IN-HOUSE

(71) Applicant: Cellium Technologies, LTD., Tel Aviv (IL)

(72) Inventors: Roy Kinamon, Tel Aviv (IL); Gal Zuckerman, Holon (IL); Oz Liv, Tel Aviv (IL)

(73) Assignee: Cellium Technologies, Ltd., Tel Aviv (IL)

( * ) Notice: Subject to any disclaimer, the term of this patent is extended or adjusted under 35 U.S.C. 154(b) by 0 days.

(21) Appl. No.: 15/894,182

(22) Filed: Feb. 12, 2018

(65) Prior Publication Data

US 2018/0167128 A1 Jun. 14, 2018

Related U.S. Application Data

(63) Continuation-in-part of application No. 15/244,306, filed on Aug. 23, 2016, now Pat. No. 10,027,374.

(Continued)

(51) Int. Cl.

| | |
|---|---|
| *H04B 7/06* | (2006.01) |
| *H04L 5/00* | (2006.01) |
| *H04B 7/0413* | (2017.01) |
| *H04B 10/25* | (2013.01) |
| *H04B 10/114* | (2013.01) |
| *H04B 10/00* | (2013.01) |

(52) U.S. Cl.
CPC ......... *H04B 7/0697* (2013.01); *H04B 7/0413* (2013.01); *H04B 7/06* (2013.01); *H04B 10/114* (2013.01); *H04B 10/1149* (2013.01); *H04B 10/14* (2013.01); *H04B 10/25* (2013.01); *H04L 5/00* (2013.01); *H04L 5/0032* (2013.01)

(58) Field of Classification Search
USPC ........... 375/211, 219, 220, 222, 240, 240.26, 375/257, 256, 259, 285, 284, 295, 316, 375/324, 347, 299, 302
See application file for complete search history.

(56) References Cited

U.S. PATENT DOCUMENTS

| | | | | |
|---|---|---|---|---|
| 5,339,184 A | * | 8/1994 | Tang | H04B 10/25752 370/343 |
| 6,459,725 B1 | * | 10/2002 | Baker | H04B 7/0822 370/315 |

(Continued)

*Primary Examiner* — Linda Wong
(74) *Attorney, Agent, or Firm* — Intrinsic Law Corp.

(57) ABSTRACT

Systems and methods for using spatial multiplexing in conjunction with a coaxial cable deployed in-house. Input streams associated with spatial multiplexing are converted into respective signals occupying different respective frequencies. The signals are transported, via a coaxial cable deployed in-house, into a certain room located in-house, thereby enabling a presence of the plurality of signals in the certain room. The signals are shifted into respective output signals that occupy a single wireless frequency by up-converting each signal from the corresponding different frequency into the single wireless frequency. The output signals are transmitted wirelessly, using only the single wireless frequency, via respective antennas located in the certain room, all said antennas operating in conjunction with the single wireless frequency, thereby achieving spatial multiplexing in the certain room and in conjunction with the coaxial cable.

13 Claims, 33 Drawing Sheets

Related U.S. Application Data

(60) Provisional application No. 62/209,404, filed on Aug. 25, 2015, provisional application No. 62/620,571, filed on Jan. 23, 2018, provisional application No. 62/504,003, filed on May 10, 2017.

(56) References Cited

U.S. PATENT DOCUMENTS

| | | | | |
|---|---|---|---|---|
| 8,867,931 | B2* | 10/2014 | Gupta | H04L 27/2096 398/115 |
| 9,380,636 | B2* | 6/2016 | Lu | H04W 24/02 |
| 9,479,807 | B1* | 10/2016 | Bugajski | H04N 21/2402 |
| 2003/0185287 | A1* | 10/2003 | Ogawa | H04B 3/36 375/211 |
| 2008/0317464 | A1* | 12/2008 | Li | H04W 88/08 398/43 |
| 2011/0200030 | A1 | 8/2011 | Noh et al. | |
| 2011/0206088 | A1* | 8/2011 | Binder | H04B 7/15542 375/136 |
| 2011/0237289 | A1* | 9/2011 | Fodor | H04W 52/367 455/522 |
| 2011/0294452 | A1* | 12/2011 | Kawai | H03F 1/26 455/293 |
| 2011/0299633 | A1* | 12/2011 | Mirzaei | H03D 7/1441 375/340 |
| 2012/0220246 | A1* | 8/2012 | Kushnir | H04B 1/04 455/118 |
| 2012/0236906 | A1* | 9/2012 | Binder | H04B 7/15542 375/133 |
| 2013/0004180 | A1* | 1/2013 | Gupta | H04L 27/2096 398/115 |
| 2013/0178177 | A1* | 7/2013 | Kushnir | H04B 1/04 455/118 |
| 2014/0072064 | A1* | 3/2014 | Lemson | H04B 10/25753 375/267 |
| 2014/0185704 | A1* | 7/2014 | Sturkovich | H04L 1/0003 375/296 |
| 2014/0289353 | A1* | 9/2014 | Kliger | H04L 12/2803 709/208 |
| 2015/0038185 | A1* | 2/2015 | Saban | H04W 88/085 455/509 |
| 2015/0071075 | A1* | 3/2015 | Ramakrishnan | H04L 65/4069 370/236 |
| 2015/0207545 | A1* | 7/2015 | Zhuang | H04B 7/024 370/329 |
| 2015/0222470 | A1* | 8/2015 | Kushnir | H04L 27/364 375/285 |
| 2015/0373587 | A1* | 12/2015 | Josiam | H04W 28/20 370/338 |
| 2016/0013855 | A1* | 1/2016 | Campos | H04B 7/12 370/343 |
| 2016/0329631 | A1* | 11/2016 | Rheinfelder | H01Q 1/246 |

* cited by examiner

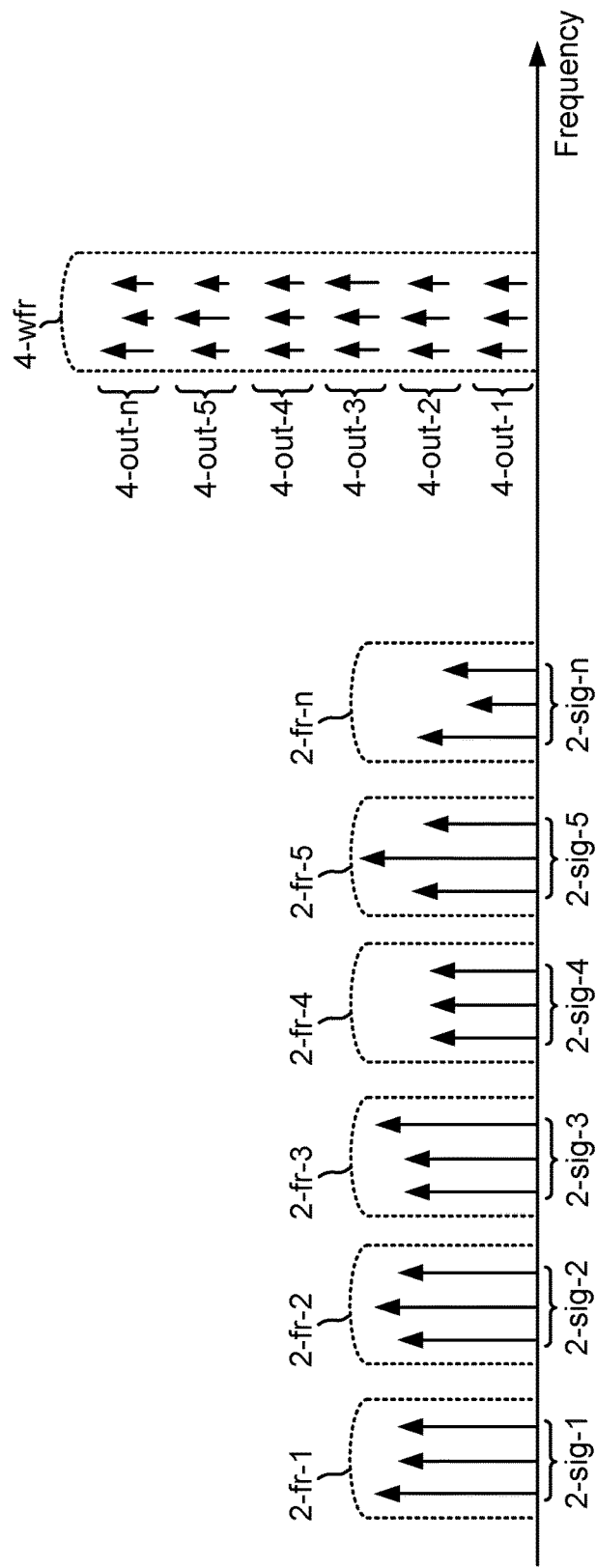
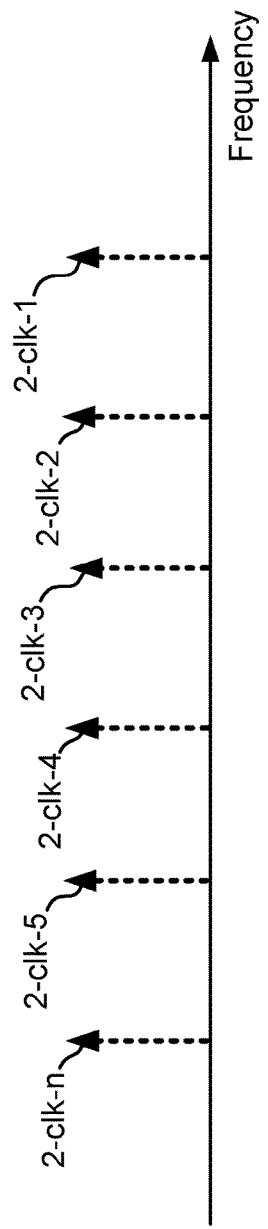
FIG. 1B
FIG. 1C

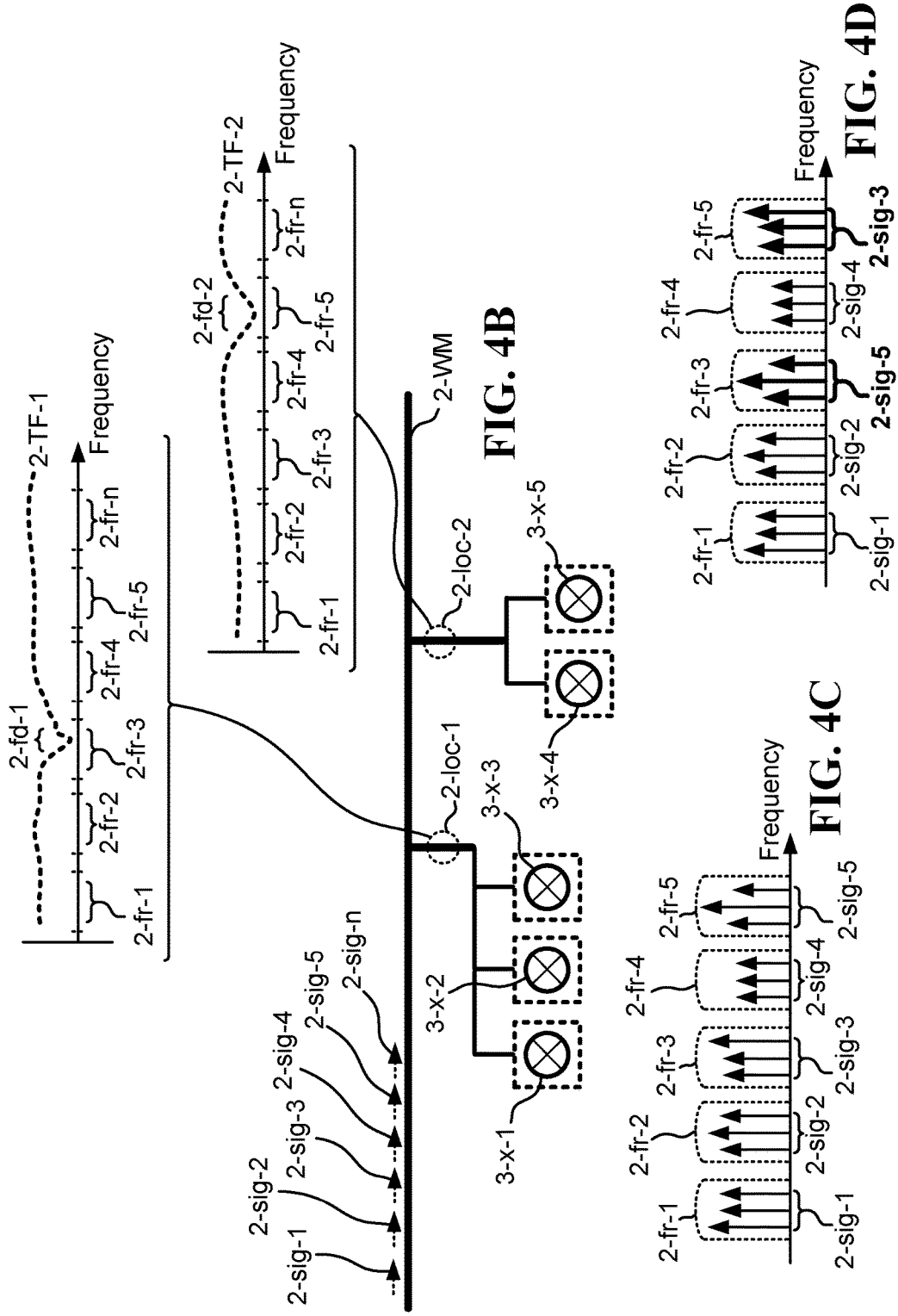

USING A COAXIAL CABLE FOR DISTRIBUTING MIMO SIGNALS IN-HOUSE

RELATED APPLICATIONS

This application is a continuation-in-part of U.S. patent application Ser. No. 15/244,306, titled "Systems and Methods for Wireless Communication Using a Wire-Based Medium," filed on Aug. 23, 2016, which claims priority to U.S. Provisional Application No. 62/209,404, titled "Systems and Methods for Wireless Communication Using a Wire-Based Medium," filed on Aug. 25, 2015. This application also claims priority to U.S. Provisional Application No. 62/620,571, titled "Systems and Methods for Improving Communication Performance Using a Wire-Based Medium," filed on Jan. 23, 2018, and to U.S. Provisional Application No. 62/504,003, titled "MIMO Wireless Communication Using a Wire-Based Medium," filed on May 10, 2017.

TECHNICAL FIELD

The present application relates to the field of wireless communication. More specifically, it relates to wireless communication systems and methods using a wire-based medium.

BACKGROUND

Wireless communication with mobile devices may be adversely affected by signal fading, multi-path, electromagnetic wave propagation through walls, and other such phenomena. Needed are methods and systems to better facilitate wireless communication.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

One or more embodiments are directed to a method for using spatial multiplexing to mitigate wire-based interferences;

One or more embodiments are directed to a method for using spatial multiplexing in conjunction with a wire-based medium;

One or more embodiments are directed to a method for re-using a plurality of streams associated with spatial multiplexing and transported over a wire-based medium;

One or more embodiments are directed to a method for preventing a first wireless transmission from interfering with a second wireless transmission both transported over a wire-based medium;

One or more embodiments are directed to a method for covering wirelessly multiple spatial locations via a wire-based medium using grouping of streams associated with spatial multiplexing;

One or more embodiments are directed to a method for achieving spatial-division-multiple-access via a wire-based medium by grouping of streams in conjunction with a plurality of spatial locations;

One or more embodiments are directed to a method for using wireless frame aggregation to mitigate wire-based interferences;

One or more embodiments are directed to a method for transporting a plurality of streams associated with spatial multiplexing over a wire-based medium together with corresponding mixer signals;

One or more embodiments are directed to a system configured to facilitate spatial multiplexing to mitigate wire-based interferences;

One or more embodiments are directed to a system configured to use spatial multiplexing in conjunction with a wire-based medium;

One or more embodiments are directed to a system configured to re-use a plurality of streams associated with spatial multiplexing and transported over a wire-based medium;

One or more embodiments are directed to a system configured to prevent a first wireless transmission from interfering with a second wireless transmission both transported over a wire-based medium;

One or more embodiments are directed to a system configured to cover wirelessly multiple spatial locations via a wire-based medium using grouping of streams associated with spatial multiplexing;

One or more embodiments are directed to a system configured to achieve spatial-division-multiple-access via a wire-based medium by grouping of streams in conjunction with a plurality of spatial locations;

One or more embodiments are directed to a system configured to use wireless frame aggregation to mitigate wire-based interferences;

One or more embodiments are directed to a system configured to transport a plurality of streams associated with spatial multiplexing over a wire-based medium together with corresponding mixer signals;

One or more embodiments are directed to a method for using spatial multiplexing to mitigate wire-based interferences. The method comprises converting, by a base converter, a plurality of input streams into a respective plurality of signals occupying different frequency ranges, in which the plurality of input streams are associated with spatial multiplexing; transporting, by the base converter, the plurality of input signals via a wire-based medium respectively to a plurality of mixers, in which an interference associated with the wire-based medium affects at least one of the signals in one of the frequency ranges, but not all of the signals in all of the frequency ranges; shifting, by each of the plurality of mixers, the respective one of the signals from the respective frequency range to a single wireless frequency range, thereby creating, respectively, a plurality of output signals each occupying the single wireless frequency range and corresponding to the respective stream; and transmitting wirelessly the plurality of output signals respectively via a plurality of antennas thereby achieving spatial multiplexing in conjunction with the plurality of output signals all occupying the single wireless frequency range, wherein at least one of the plurality of output signals transmitted wirelessly is affected by the interference, but not all of the output signals are affected by the interference, thereby facilitating successful decoding of N data streams associated with the spatial multiplexing;

One or more embodiments are directed to a system operative to use spatial multiplexing in conjunction with a wire-based medium. The system comprises an access point; a base converter; a wire-based medium; and a plurality of antennas; wherein the system is configured to: convert a plurality of streams associated with spatial multiplexing, respectively, into a plurality of signals occupying respectively a plurality of different frequencies; transport the plurality of signals, in conjunction with the plurality of different frequencies, via a wire-based medium; shift the plurality of signals into, respectively, a plurality of output signals, in which all said output signals occupy a single wireless frequency, in which said shift is achieved by up-converting each one of the signals from the corresponding one of the different frequencies into the single wireless frequency; and transmit wirelessly, using only the single wireless frequency, the plurality of output signals, respectively, via a plurality of antennas all operating in conjunction with the single wireless frequency, thereby achieving spatial multiplexing in conjunction with the wire-based medium;

One or more embodiments are directed to a method for generating simultaneously two multiple-input-multiple-output (MIMO) transmissions using two separate wireless frequency ranges;

One or more embodiments are directed to a system operative to generate simultaneously two multiple-input-multiple-output (MIMO) transmissions using two separate wireless frequency ranges;

One or more embodiments are directed to a method for generating simultaneously two multiple-input-multiple-output (MIMO) transmissions associated with a single service-set-identifier (SSID) but using two separate wireless frequency ranges;

One or more embodiments are directed to a method for using spatial multiplexing in conjunction with a plurality of multi-conductor cables;

One or more embodiments are directed to a system operative to use spatial multiplexing in conjunction with a plurality of multi-conductor cables;

One or more embodiments are directed to a method for propagating multiple-input-multiple-output (MIMO) signals from an outdoor environment to an indoor environment;

One or more embodiments are directed to a system operative to duplicated indoor several times a plurality of streams associated with spatial multiplexing and obtained outdoor;

One or more embodiments are directed to a method for propagating multiple-input-multiple-output (MIMO) signals between rooms;

One or more embodiments are directed to a system operative to duplicated indoor several times a plurality of streams associated with spatial multiplexing and obtained in a specific room;

One or more embodiments are directed to a method for replicating an exact frequency match among a plurality of signals associated with spatial multiplexing;

One or more embodiments are directed to a system operative to replicate an exact frequency match among a plurality of signals associated with spatial multiplexing;

One or more embodiments are directed to a system operative to direct transmissions over a wire-based medium;

One or more embodiments are directed to a method for adapting a wireless communication system by reorganizing related transmissions over a wire-based medium;

One or more embodiments are directed to a system operative to be easily fastened to a wall-mounted socket having an outer thread; and One or more embodiments are directed to a method for easily fastening a box to a wall-mounted socket.

An aspect of the invention is directed to a method for using spatial multiplexing in conjunction with a coaxial cable deployed in-house, comprising: converting a plurality of input streams associated with spatial multiplexing, respectively, into a plurality of signals occupying, respectively, a plurality of different frequencies; transporting the plurality of signals, via a coaxial cable deployed in-house, into a certain room located in-house, thereby enabling a presence of the plurality of signals in the certain room; shifting the plurality of signals into, respectively, a plurality of output signals, in which all said output signals occupy a single wireless frequency, and in which said shifting is achieved by up-converting each one of the signals, which are now present in the certain room, from the corresponding one of the different frequencies into the single wireless frequency; and transmitting wirelessly, using only the single wireless frequency, the plurality of output signals via a plurality of respective antennas located in the certain room, all said antennas operating in conjunction with the single wireless frequency, thereby achieving spatial multiplexing in the certain room and in conjunction with the coaxial cable.

Another aspect of the invention is directed to a system operative to use spatial multiplexing in conjunction with a coaxial cable deployed in-house, comprising: a base converter; a coaxial cable deployed in-house, said coaxial cable reaching into a certain room located in-house; and a plurality of antennas located in the certain room; wherein the system is configured to: convert, in the base converter, a plurality of streams associated with spatial multiplexing, respectively, into a plurality of signals occupying, respectively, a plurality of different frequencies; transport the plurality of signals, in conjunction with the plurality of different frequencies, via the coaxial cable, into the certain room, thereby enabling a presence of the plurality of signals in the certain room; shift the plurality of signals into, respectively, a plurality of output signals, in which all said output signals occupy a single wireless frequency, and in which said shift is achieved by up-converting each one of the signals, which are now present in the certain room, from the corresponding one of the different frequencies into the single wireless frequency; and transmit wirelessly, using only the single wireless frequency, the plurality of output signals, respectively, via the plurality of antennas located in the certain room, all said antennas operating in conjunction with the single wireless frequency, thereby achieving spatial multiplexing in the certain room and in conjunction with the coaxial cable.

In one or more embodiments, the system further comprises an access point operative to generate the plurality of streams from at least a single data stream. In one or more embodiments, the access point is co-located together with the base converter. In one or more embodiments, the access point and the base converter are co-located in a second room, and the coaxial cable is operative to communicatively connect together at least the second room and the certain room.

In one or more embodiments, the access point is a WiFi access point supporting at least partly a standard associated with IEEE 802.11, and the spatial multiplexing in conjunction with the plurality of streams is part of the standard. In one or more embodiments, the standard includes IEEE 802.11n, IEEE 802.11ac, or IEEE 802.11ax, or a combination of any of the foregoing. In one or more embodiments, the plurality of output signals all occupying the single wireless frequency are associated with the standard. In one or more embodiments, the single wireless frequency is a single channel associated with the standard, and the single channel is associated with an unlicensed ISM band selected from a group of unlicensed bands consisting of: (i) a 2.4 GHz band and (ii) a 5 GHz band.

In one or more embodiments, the plurality of output signals are received by a client device in the certain room as facilitated by the coaxial cable, thereby improving in-house WiFi communication. In one or more embodiments, the access point is an LTE or a 5G access point or an LTE or a 5G base station, the LTE or 5G access point or the LTE or 5G base station supporting at least partly a standard associated with LTE or 5G, respectively, in which the spatial multiplexing in conjunction with the plurality of streams are part of the standard. In one or more embodiments, the plurality of output signals all occupying the single wireless frequency are associated with the standard; the single wireless frequency is a single channel associated with the standard; and the single channel is associated with a licensed band selected from a group of licensed bands consisting of: (i) a 1.8 GHz band, (ii) a 1.9 GHz band, (iii) a 2.0 GHz band, (iv) a 2.3 GHz band, (v) a 2.5 GHz band, and (vi) a 3.5 GHz band. In one or more embodiments, the plurality of output signals are in a licensed band and are each transmitted at a power level below 10 (ten) dBm and above −30 (minus thirty) dBm.

In one or more embodiments, the plurality of different frequencies are located below 1.5 GHz, at frequency zones that are, at least momentarily, not occupied by in-house coaxial signals including DOCSIS signals, MoCA signals, and cable TV signals. In one or more embodiments, the plurality of streams are input to the base converter, from an access point, in a radio frequency form at frequency bands above 1.5 GHz; and said conversion of the plurality of streams, respectively, into the plurality of signals is performed, respectively, by a plurality of mixers in the base converter, the mixers operating as down-converters. In one or more embodiments, the frequency bands above 1.5 GHz include a 1.8 GHz band, a 1.9 GHz band, a 2.0 GHz band, a 2.3 GHz band, a 2.4 GHz band, a 2.5 GHz band, or a 5 GHz band, or a combination of any of the foregoing.

IN THE DRAWINGS

The embodiments are herein described, by way of example only, with reference to the accompanying drawings. No attempt is made to show structural details of the embodiments in more detail than is necessary for a fundamental understanding of the embodiments. In the drawings:

FIG. 1A illustrates one embodiment of a system operative to: convert a plurality of streams associated with spatial multiplexing into a plurality of signals, transport the plurality of signals via a wire-based medium, shift the plurality of signals into a plurality of output signals occupying a single wireless frequency range, and transmit wirelessly the output signals, thereby achieving spatial multiplexing in conjunction with the wire-based medium;

FIG. 4B illustrates one embodiment of a system operative to resolve a sub-optimal communication condition;

FIG. 4C illustrates one embodiment of frequency assignments for signals prior to resolving the sub-optimal communication condition;

FIG. 4D illustrates one embodiment of frequency assignments for signals after resolving the sub-optimal communication condition;

DETAILED DESCRIPTION

The following paragraphs are associated with FIG. 2A, FIG. 2B, FIG. 2C, FIG. 7A, FIG. 7B.

Figure 2A:
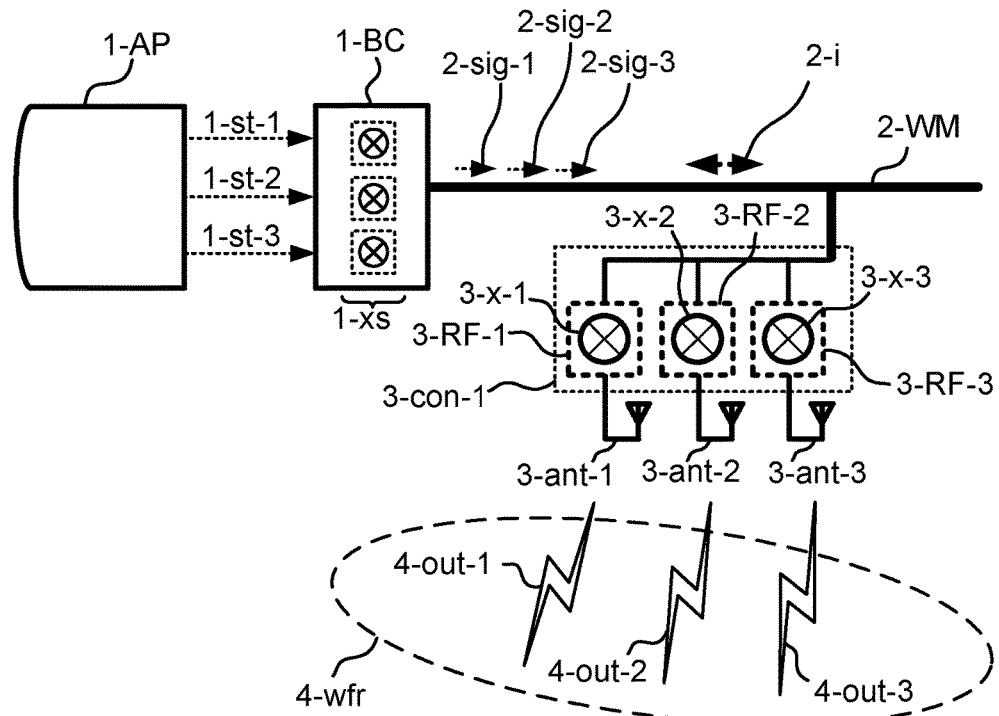
FIG. 2A illustrates one embodiment of a system operative to use spatial multiplexing to mitigate wire-based interferences.
Figure 2B:
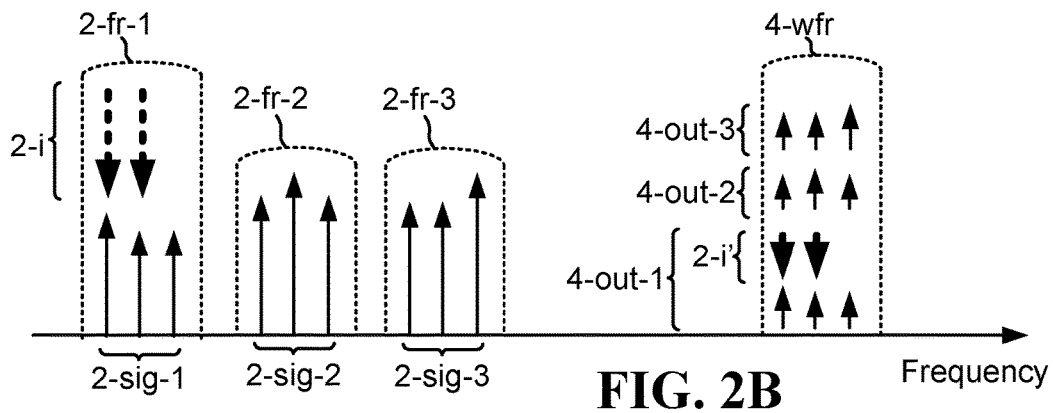
FIG. 2B illustrates one embodiment of different signals occupying various frequencies in conjunction with the system operative to use spatial multiplexing to mitigate wire-based interferences.
Figure 7A:
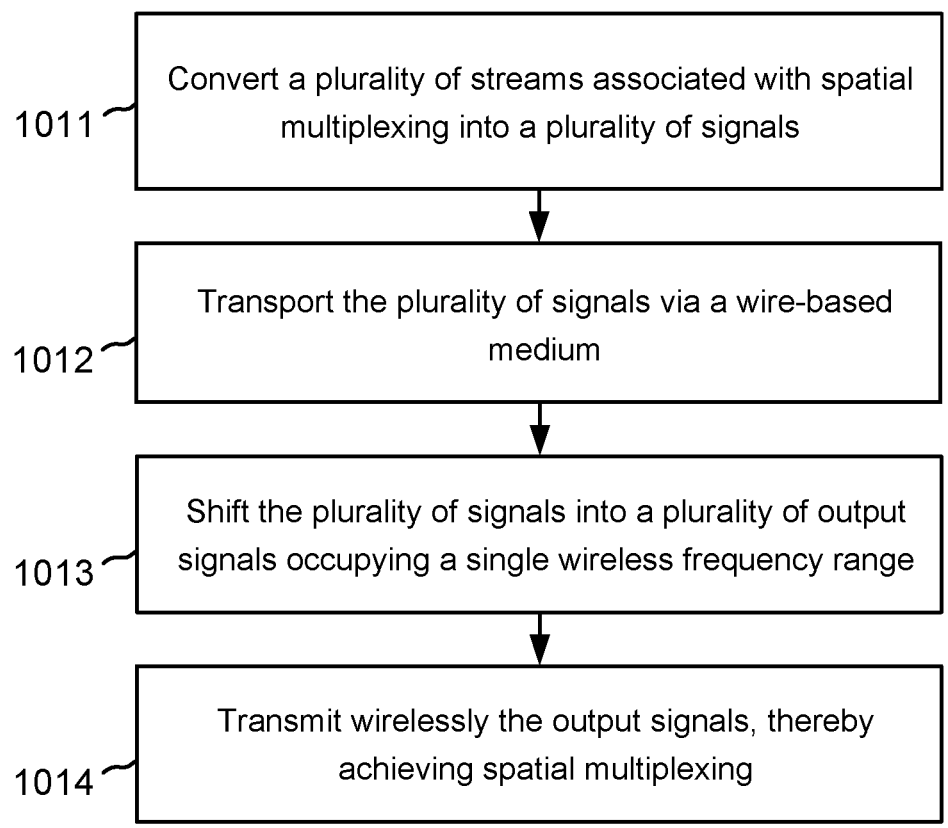
FIG. 7A illustrates one embodiment of a method for using spatial multiplexing in conjunction with a wire-based medium.
Figure 7B:
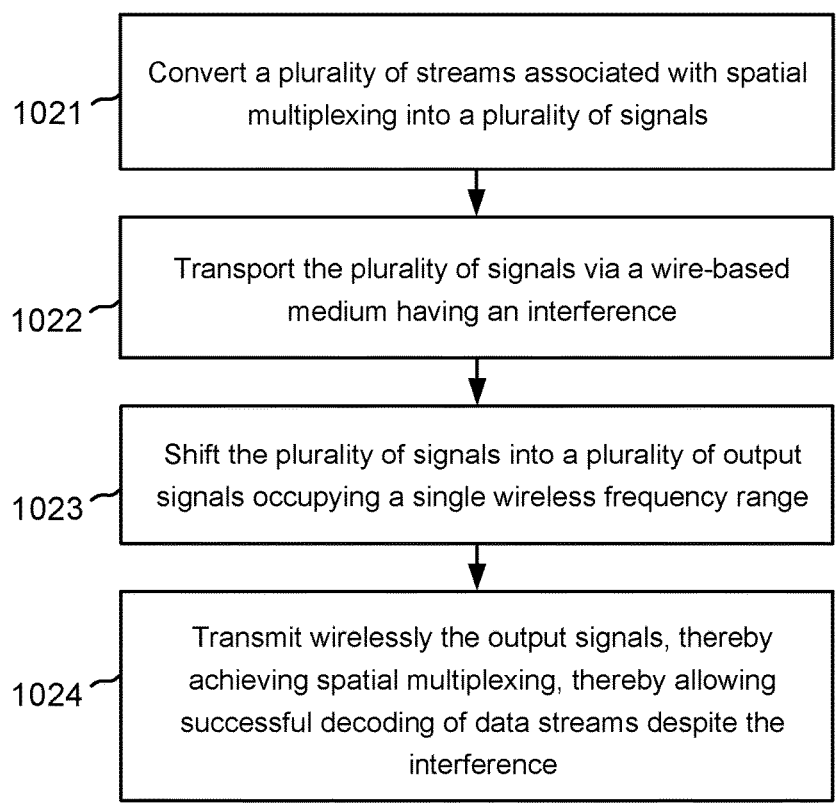
FIG. 7B illustrates one embodiment of a method for using spatial multiplexing to mitigate wire-based interferences.

FIG. 7B illustrates one embodiment of a method for using spatial multiplexing to mitigate wire-based interferences. In step 1021, converting, by a base converter 1-BC, a plurality of streams 1-st-1, 1-st-2, 1-st-3 respectively into a plurality of signals 2-sig-1, 2-sig-2, 2-sig-3 occupying respectively a plurality of different frequency ranges 2-fr-1, 2-fr-2, 2-fr-3, in which the plurality of streams are associated with spatial multiplexing, as illustrated in FIG. 2A. In step 1022, transporting, by the base converter 1-BC, the plurality of signals 2-sig-1, 2-sig-2, 2-sig-3 via a wire-based medium 2-WM respectively to a plurality of mixers 3-x-1, 3-x-2, 3-x-3, in which an interference 2-i (FIG. 2A) associated with the wire-based medium 2-WM affects at least one of the signals 2-sig-1 in one of the frequency ranges 2-fr-1, but not all of the signals in all of the frequency ranges. In step 1023, shifting, by each of the plurality of mixers 3-x-1, 3-x-2, 3-x-3, the respective one of the signals from the respective frequency range to a single wireless frequency range 4-wfr (i.e., 3-x-1 is shifting 2-sig-1 from 2-fr-1 to 4-wfr, 3-x-2 is shifting 2-sig-2 from 2-fr-2 to 4-wfr, and 3-x-3 is shifting 2-sig-3 from 2-fr-3 to 4-wfr), thereby creating, respectively, a plurality of output signals 4-out-1, 4-out-2, 4-out-3 each occupying the single wireless frequency range 4-wfr and corresponding to the respective stream (i.e. 4-out-1 corresponding to 1-st-1, 4-out-2 corresponding to 1-st-2, and 4-out-3 corresponding to 1-st-3). In step 1024, transmitting wirelessly the plurality of output signals 4-out-1, 4-out-2, 4-out-3 respectively via a plurality of antennas 3-ant-1, 3-ant-2, 3-ant-3 thereby achieving spatial multiplexing in conjunction with the plurality of output signals 4-out-1, 4-out-2, 4-out-3 all occupying the single wireless frequency range 4-wfr, wherein at least one of the plurality of output signals 4-out-1 transmitted wirelessly is affected 2-i' (FIG. 2B) by the interference 2-i (since 4-out-1 is derived from 2-sig-1 which was affected by the interference 2-i), but not all of the output signals are affected by the interference, thereby facilitating successful decoding of N data streams 1-ds-1, 1-ds-2 associated with the spatial multiplexing.

Figure 2C:
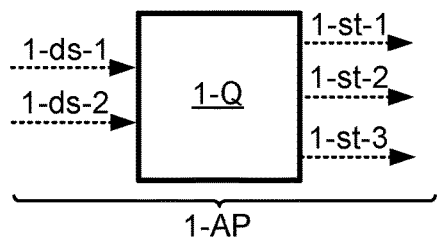
FIG. 2C illustrates one embodiment of a spatial expansion element.

One embodiment further comprises: generating, by an access point 1-AP, the plurality of streams 1-st-1, 1-st-2, 1-st-3, out of the N data streams 1-ds-1, 1-ds-2, using a spatial expansion element 1-Q, wherein: the N data streams 1-ds-1, 1-ds-2 (e.g. N=2) are mapped into the plurality of streams 1-st-1, 1-st-2, 1-st-3 comprising M streams (e.g. M=3), such that M is equal to N, or M is greater than N, in which the interference 2-i causes the access point 1-AP to decrease N relative to M, up to a point that facilitates said successful decoding of the N data streams 1-ds-1, 1-ds-2 associated with the spatial multiplexing, thereby essentially overcoming the interference 2-i. An example of such an embodiment is illustrated in FIG. 2C.

In one embodiment, the access point 1-AP is a wifi access point supporting at least partly a standard associated with IEEE 802.11, such as IEEE 802.11n or IEEE 802.11ac, in which the spatial multiplexing in conjunction with plurality of streams 1-st-1, 1-st-2, 1-st-3 is part of the standard.

In one embodiment, the plurality of output signals 4-out-1, 4-out-2, 4-out-3 are OFDM signals, thereby further overcoming the interference 2-i in conjunction with the spatial multiplexing.

In one embodiment, the access point 1-AP is an LTE access point or an LTE base-station supporting at least partly a standard associated with LTE, in which the spatial multiplexing in conjunction with plurality of streams 1-st-1, 1-st-2, 1-st-3 is part of the standard.

In one embodiment, said interference 2-i is associated with noise on the wire-based medium 2-WM.

In one embodiment, the interference 2-i is associated with signal reflections associated with the wire-based medium 2-WM, in which the signal reflections adversely affect a transfer function associated with the wire-based medium 2-WM in one of the frequency ranges 2-fr-1 associated with one of the signals 2-sig-1.

In one embodiment, the wire-based medium 2-WM is selected from a group consisting of: (i) a coaxial cable, (ii) a twisted-pair cable, (iii) category-5 cable, and (iv) any cable capable of facilitating propagation of electromagnetic signals.

In one embodiment, the wire-based medium 2-WM is a coaxial cable deployed in-house; the plurality of mixers 3-x-1, 3-x-2, 3-x-3 are associated respectively with a plurality of radio-frequency chains 3-RF-1, 3-RF-2, 3-RF-3 operative together to facilitate said shifting of the plurality of signals 2-sig-1, 2-sig-2, 2-sig-3 to the single wireless frequency range 4-wfr; and the plurality of radio-frequency chains 3-RF-1, 3-RF-2, 3-RF-3 are housed in at least a single converter 3-con-1 placed in a room in-house, or are housed respectively in a plurality of converters placed in a plurality of rooms in-house. In some embodiments, in-house can include a house, a building, or other structure that can include one or more rooms.

In one embodiment, the interference 2-i is associated with signals injected into the coaxial cable by in-house electronic appliances.

In one embodiment, the interference 2-i is associated with reflections produced by in-house stubs of the coaxial cable.

In one embodiment, the plurality of different frequency ranges 2-fr-1, 2-fr-2, 2-fr-3 are located below 1.5 GHz, at frequency zones that are, at least momentarily, not occupied by in-house coaxial signals such as DOCSIS signals, MoCA signals, and cable TV signals.

In one embodiment, the plurality of streams 1-st-1, 1-st-2, 1-st-3 are input to the base converter 1-BC in a radio frequency form at frequency bands above 1.5 GHz, such as a 1.8 GHz band, a 1.9 GHz band, a 2.0 GHz band, a 2.3 GHz band, a 2.4 GHz band, a 2.5 GHz band, or a 5 GHz band; and said conversion of the plurality of streams 1-st-1, 1-st-2, 1-st-3 respectively into the plurality of signals 2-sig-1, 2-sig-2, 2-sig-3 is performed respectively by a plurality of mixers 1-xs in the base converter 1-BC operating as down-converters.

In one embodiment, the plurality of streams 1-st-1, 1-st-2, 1-st-3 are input to the base converter 1-BC in a base-band form; and said conversion of the plurality of streams 1-st-1, 1-st-2, 1-st-3 respectively into the plurality of signals 2-sig-1, 2-sig-2, 2-sig-3 is performed respectively by a plurality of mixers 1-xs in the base converter 1-BC operating as up-converters.

In one embodiment, the plurality of streams 1-st-1, 1-st-2, 1-st-3 are input to the base converter 1-BC in a digital form; and said conversion of the plurality of streams 1-st-1, 1-st-2, 1-st-3 respectively into the plurality of signals 2-sig-1, 2-sig-2, 2-sig-3 is a modulation process, such as OFDM modulation process.

One embodiment further comprising: generating, by an access point 1-AP, the plurality of streams 1-st-1, 1-st-2, 1-st-3, out of the N data streams 1-ds-1, 1-ds-2, wherein: the access point 1-AP is a wifi access point supporting at least partly a standard associated with IEEE 802.11, such as IEEE 802.11n or IEEE 802.11ac, in which the spatial multiplexing in conjunction with plurality of streams 1-st-1, 1-st-2, 1-st-3 is part of the standard.

In one embodiment, the plurality of output signals 4-out-1, 4-out-2, 4-out-3 all occupying the single wireless frequency range 4-wfr are associated with the standard.

In one embodiment, the single wireless frequency range 4-wfr is a single channel associated with the standard.

In one embodiment, the single channel is associated with an unlicensed ism band selected from a group of unlicensed bands consisting of (i) the 2.4 GHz band, and (ii) the 5 GHz band.

In one embodiment, the plurality of output signals 4-out-1, 4-out-2, 4-out-3 are OFDM signals.

One embodiment further comprising: generating, by an access point 1-AP, the plurality of streams 1-st-1, 1-st-2, 1-st-3, out of the N data streams 1-ds-1, 1-ds-2, wherein: the access point 1-AP is an LTE access point supporting at least partly a standard associated with LTE, in which the spatial multiplexing in conjunction with plurality of streams 1-st-1, 1-st-2, 1-st-3 is part of the standard.

In one embodiment, the plurality of output signals 4-out-1, 4-out-2, 4-out-3 all occupying the single wireless frequency range 4-wfr are associated with the standard.

In one embodiment, the single wireless frequency range 4-wfr is a single channel associated with the standard.

In one embodiment, the single channel is associated with a licensed band selected from a group of licensed bands consisting of (i) the 1.8 GHz band, (ii) the 1.9 GHz band, and (iii) the 2.0 GHz band.

In one embodiment, the plurality of output signals 4-out-1, 4-out-2, 4-out-3 are OFDMA signals.

One embodiment is a system 1-AP, 1-BC, 2-WM, 3-x-1, 3-x-2, 3-x-3, 3-ant-1, 3-ant-2, 3-ant-3, 1-Q, configured to facilitate spatial multiplexing to mitigate wire-based interferences.

FIG. 7A illustrates one embodiment of a method for using spatial multiplexing in conjunction with a wire-based medium. In step 1011, Converting a plurality of streams 1-st-1, 1-st-2, 1-st-3, 1-st-4, 1-st-5, 1-st-n associated with spatial multiplexing, respectively, into a plurality of signals 2-sig-1, 2-sig-2, 2-sig-3, 2-sig-4, 2-sig-5, 2-sig-n occupying respectively a plurality of different frequencies 2-fr-1, 2-fr-2, 2-fr-3, 2-fr-4, 2-fr-5, 2-fr-n. In step 1012, Transporting the plurality of signals via a wire-based medium 2-WM. In step 1013, Shifting the plurality of signals into, respectively, a plurality of output signals 4-out-1, 4-out-2, 4-out-3, 4-out-4, 4-out-5, 4-out-n all occupying a single wireless frequency 4-wfr. In step 1014, Transmitting wirelessly the plurality of output signals, respectively, via a plurality of antennas 3-ant-1, 3-ant-2, 3-ant-3, 3-ant-4, 3-ant-5, 3-ant-n, thereby achieving spatial multiplexing in conjunction with the wire-based medium.

Figure 1A:
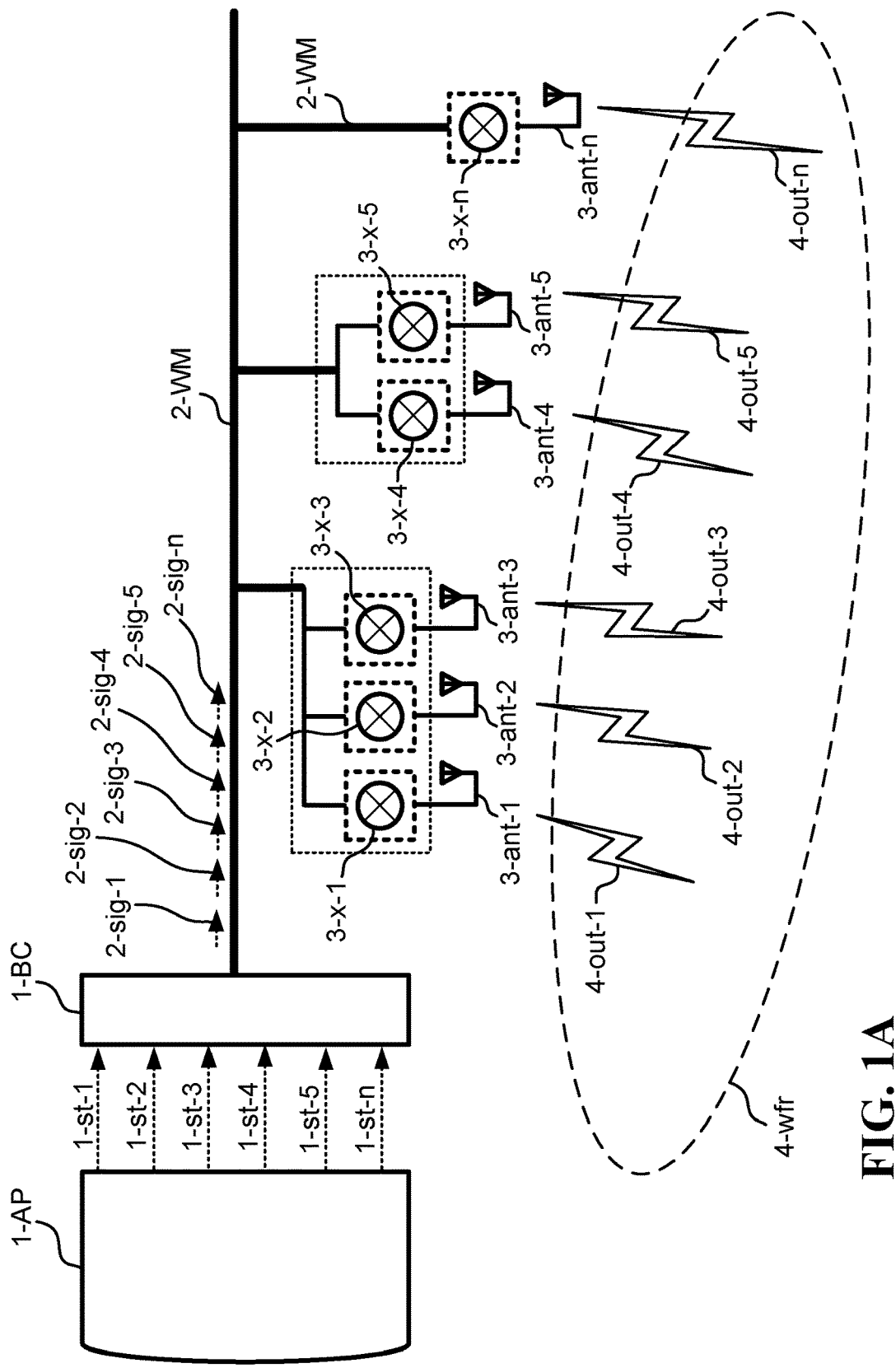
FIG. 1B illustrates one embodiment of the frequencies occupied by the plurality of signals transported via a wire-based medium, and the single wireless frequency occupied by the plurality of output signals.
FIG. 1C illustrates one embodiment of a plurality of mixer signals.

One embodiment is a system (FIG. 1A) operative to use spatial multiplexing in conjunction with a wire-based medium, for example as illustrated in FIG. 2A. The system includes: an access point 1-AP, a base converter 1-BC, a wire-based medium 2-WM, and a plurality of antennas 3-ant-1, 3-ant-2, 3-ant-3, 3-ant-4, 3-ant-5, 3-ant-n.

The system is configured to:
convert a plurality of streams 1-st-1, 1-st-2, 1-st-3, 1-st-4, 1-st-5, 1-st-n associated with spatial multiplexing, respectively, into a plurality of signals 2-sig-1, 2-sig-2, 2-sig-3, 2-sig-4, 2-sig-5, 2-sig-n occupying respectively a plurality of different frequencies 2-fr-1, 2-fr-2, 2-fr-3, 2-fr-4, 2-fr-5, 2-fr-n; transport the plurality of signals 2-sig-1, 2-sig-2, 2-sig-3, 2-sig-4, 2-sig-5, 2-sig-n, in conjunction with the plurality of different frequencies 2-fr-1, 2-fr-2, 2-fr-3, 2-fr-4, 2-fr-5, 2-fr-n, via the wire-based medium 2-WM;
shift the plurality of signals 2-sig-1, 2-sig-2, 2-sig-3, 2-sig-4, 2-sig-5, 2-sig-n into, respectively, a plurality of output signals 4-out-1, 4-out-2, 4-out-3, 4-out-4, 4-out-5, 4-out-n, in which all said output signals occupy a single wireless frequency 4-*wfr*, in which said shift is achieved by up-converting each one of the signals 2-*sig*-1, 2-*sig*-2, 2-*sig*-3, 2-*sig*-4, 2-*sig*-5, 2-*sig*-*n* from the corresponding one of the different frequencies 2-*fr*-1, 2-*fr*-2, 2-*fr*-3, 2-*fr*-4, 2-*fr*-5, 2-*fr*-*n* into the single wireless frequency 4-*wfr*; and transmit wirelessly, using only the single wireless frequency 4-*wfr*, the plurality of output signals 4-*out*-1, 4-*out*-2, 4-*out*-3, 4-*out*-4, 4-*out*-5, 4-*out*-*n*, respectively, via the plurality of antennas 3-*ant*-1, 3-*ant*-2, 3-*ant*-3, 3-*ant*-4, 3-*ant*-5, 3-*ant*-*n* all operating in conjunction with the single wireless frequency 4-*wfr*, thereby achieving spatial multiplexing in conjunction with the wire-based medium 2-WM.

Figure 3A:
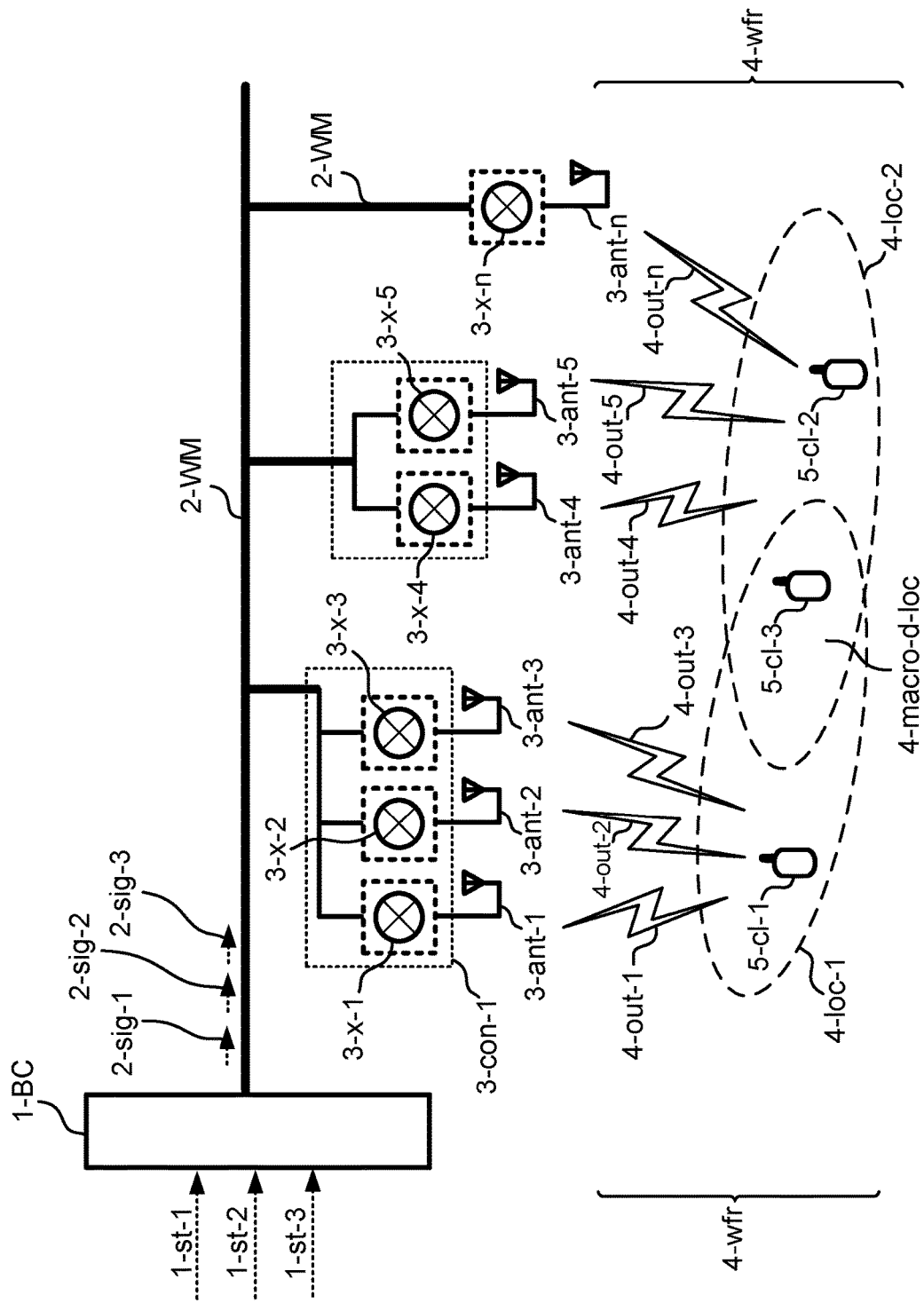
FIG. 3A illustrates one embodiment of a system operative to re-use a plurality of streams associated with spatial multiplexing and transported over a wire-based medium.
Figure 8:
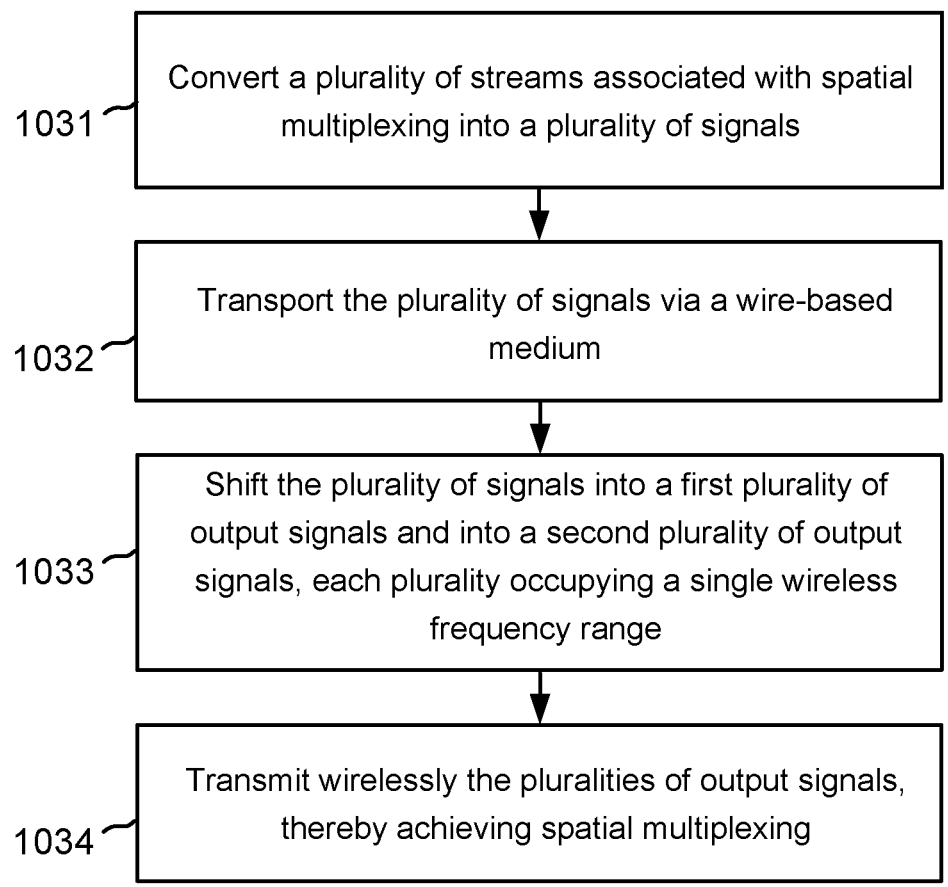
FIG. 8 illustrates one embodiment of a method for re-using a plurality of streams associated with spatial multiplexing and transported over a wire-based medium.

The following paragraphs are associated with FIG. 3A, FIG. 8.

FIG. 8 illustrates one embodiment of a method for re-using a plurality of streams associated with spatial multiplexing and transported over a wire-based medium. In step 1031, converting, by a base converter 1-BC, a plurality of streams 1-*st*-1, 1-*st*-2, 1-*st*-3 respectively into a plurality of signals 2-*sig*-1, 2-*sig*-2, 2-*sig*-3 occupying respectively a plurality of different frequency ranges 2-*fr*-1, 2-*fr*-2, 2-*fr*-3, in which the plurality of streams are associated with spatial multiplexing, as illustrated in FIG. 3A. In step 1032, transporting, by the base converter 1-BC, the plurality of signals 2-*sig*-1, 2-*sig*-2, 2-*sig*-3 via a wire-based medium 2-WM respectively to a first plurality of mixers 3-*x*-1, 3-*x*-2, 3-*x*-3, and respectively to a second plurality of mixers 3-*x*-4, 3-*x*-5, 3-*x*-*n*. In step 1033, shifting, by each of the first plurality of mixers 3-*x*-1, 3-*x*-2, 3-*x*-3, the respective one of the signals from the respective frequency range to a single wireless frequency range 4-*wfr* (i.e., 3-*x*-1 is shifting 2-*sig*-1 from 2-*fr*-1 to 4-*wfr*, 3-*x*-2 is shifting 2-*sig*-2 from 2-*fr*-2 to 4-*wfr*, and 3-*x*-3 is shifting 2-*sig*-3 from 2-*fr*-3 to 4-*wfr*), thereby creating, respectively, a first plurality of output signals 4-*out*-1, 4-*out*-2, 4-*out*-3 each occupying the single wireless frequency range 4-*wfr* and corresponding to the respective stream (i.e. 4-*out*-1 corresponding to 1-*st*-1, 4-*out*-2 corresponding to 1-*st*-2, and 4-*out*-3 corresponding to 1-*st*-3), and shifting, by each of the second plurality of mixers 3-*x*-4, 3-*x*-5, 3-*x*-*n*, the respective one of the signals from the respective frequency range to the single wireless frequency range 4-*wfr* (i.e., 3-*x*-4 is shifting 2-*sig*-1 from 2-*fr*-1 to 4-*wfr*, 3-*x*-5 is shifting 2-*sig*-2 from 2-*fr*-2 to 4-*wfr*, and 3-*x*-*n* is shifting 2-*sig*-3 from 2-*fr*-3 to 4-*wfr*), thereby creating, respectively, a second plurality of output signals 4-*out*-4, 4-*out*-5, 4-*out*-*n* each occupying the single wireless frequency range 4-*wfr* and corresponding to the respective stream (i.e. 4-*out*-4 corresponding to 1-*st*-1, 4-*out*-5 corresponding to 1-*st*-2, and 4-*out*-*n* corresponding to 1-*st*-3). In step 1034, transmitting wirelessly the first plurality of output signals 4-*out*-1, 4-*out*-2, 4-*out*-3 via a first plurality of antennas 3-*ant*-1, 3-*ant*-2, 3-*ant*-3 thereby achieving spatial multiplexing in conjunction with the first plurality of output signals all occupying the single wireless frequency range 4-*wfr*, and transmitting wirelessly the second plurality of output signals 4-*out*-4, 4-*out*-5, 4-*out*-*n* via a second plurality of antennas 3-*ant*-4, 3-*ant*-5, 3-*ant*-*n*, thereby achieving spatial multiplexing in conjunction with the second plurality of output signals all occupying the single wireless frequency range 4-*wfr*.

In one embodiment, the first plurality of output signals 4-*out*-1, 4-*out*-2, 4-*out*-3 transmitted wirelessly and the second plurality of output signals 4-*out*-4, 4-*out*-5, 4-*out*-*n* transmitted wirelessly, all occupying the single wireless frequency range 4-*wfr*, are combined wirelessly at different spatial locations 4-*macro-d-loc* such as to create macro-diversity in conjunction with the spatial multiplexing.

In one embodiment, the first plurality of output signals 4-*out*-1, 4-*out*-2, 4-*out*-3 and the second plurality of output signals 4-*out*-4, 4-*out*-5, 4-*out*-*n* are received and decoded in conjunction with said macro-diversity by a client device 5-*cl*-3 located in one of the different spatial locations 4-*macro-d-loc*.

In one embodiment, the plurality of signals 2-*sig*-1, 2-*sig*-2, 2-*sig*-3, the first plurality of output signals 4-*out*-1, 4-*out*-2, 4-*out*-3, and the second plurality of output signals 4-*out*-4, 4-*out*-5, 4-*out*-*n*, are OFDM or OFDMA signals associated with a standard selected from a group consisting of (i) wifi, (ii) wimax, and (iii) LTE, in which a plurality of sub-carriers in the plurality of signals and in the pluralities of output signals facilitate said macro-diversity in conjunction with the spatial multiplexing.

In one embodiment, the first plurality of output signals 4-*out*-1, 4-*out*-2, 4-*out*-3 transmitted wirelessly are associated with a first spatial location 4-*loc*-1, and the second plurality of output signals 4-*out*-4, 4-*out*-5, 4-*out*-*n* transmitted wirelessly are associated with a second spatial location 4-*loc*-2, such that a first client 5-*cl*-1 device associated with the first spatial location 4-*loc*-1 is able to decode data streams associated with the spatial multiplexing using the first plurality of output signals 4-*out*-1, 4-*out*-2, 4-*out*-3, and a second client device 5-*cl*-2 associated with the second spatial location 4-*loc*-2 is able to decode data streams associated with the spatial multiplexing using the second plurality of output signals 4-*out*-4, 4-*out*-5, 4-*out*-*n*.

In one embodiment, the wire-based medium 2-WM is a coaxial cable deployed in-house, in which the first spatial location 4-*loc*-1 is a first room in-house, and the second spatial location 4-*loc*-2 is a second room in-house. In some embodiments, in-house can include a house, a building, or other structure that can include one or more rooms.

In one embodiment, the first plurality of output signals 4-*out*-1, 4-*out*-2, 4-*out*-3 and the second plurality of output signals 4-*out*-4, 4-*out*-5, 4-*out*-*n* are associated with LTE in a licensed band and are transmitted each at a power level of below 10 (ten) dBm and above −30 (minus thirty) dBm, which is low enough to not interfere with outdoor LTE transmissions in the licensed band, but is also high enough to be received by the client devices 5-*cl*-1, 5-*cl*-2 in the different rooms 4-*loc*-1, 4-*loc*-2 as facilitated by the wire-based medium 2-WM.

In one embodiment, the first plurality of output signals 4-*out*-1, 4-*out*-2, 4-*out*-3 and the second plurality of output signals 4-*out*-4, 4-*out*-5, 4-*out*-*n* are associated with IEEE 802.11 and wifi in unlicensed band and are received by the client devices 5-*cl*-1, 5-*cl*-2 in the different rooms 4-*loc*-1, 4-*loc*-2 as facilitated by the wire-based medium 2-WM, thereby improving in-house wifi communication.

In one embodiment, the wire-based medium 2-WM is selected from a group consisting of: (i) a coaxial cable, (ii) a twisted-pair cable, (iii) category-5 cable, and (iv) any cable capable of facilitating propagation of electromagnetic signals.

One embodiment is a system 1-BC, 2-WM, 3-*x*-1, 3-*x*-2, 3-*x*-3, 3-*x*-4, 3-*x*-5, 3-*x*-*n*, 3-*ant*-1, 3-*ant*-2, 3-*ant*-3, 3-*ant*-4, 3-*ant*-5, 3-*ant*-*n*, configured to re-use a plurality of streams associated with spatial multiplexing and transported over a wire-based medium, for example as illustrated in FIG. 3A.

Figure 3B:
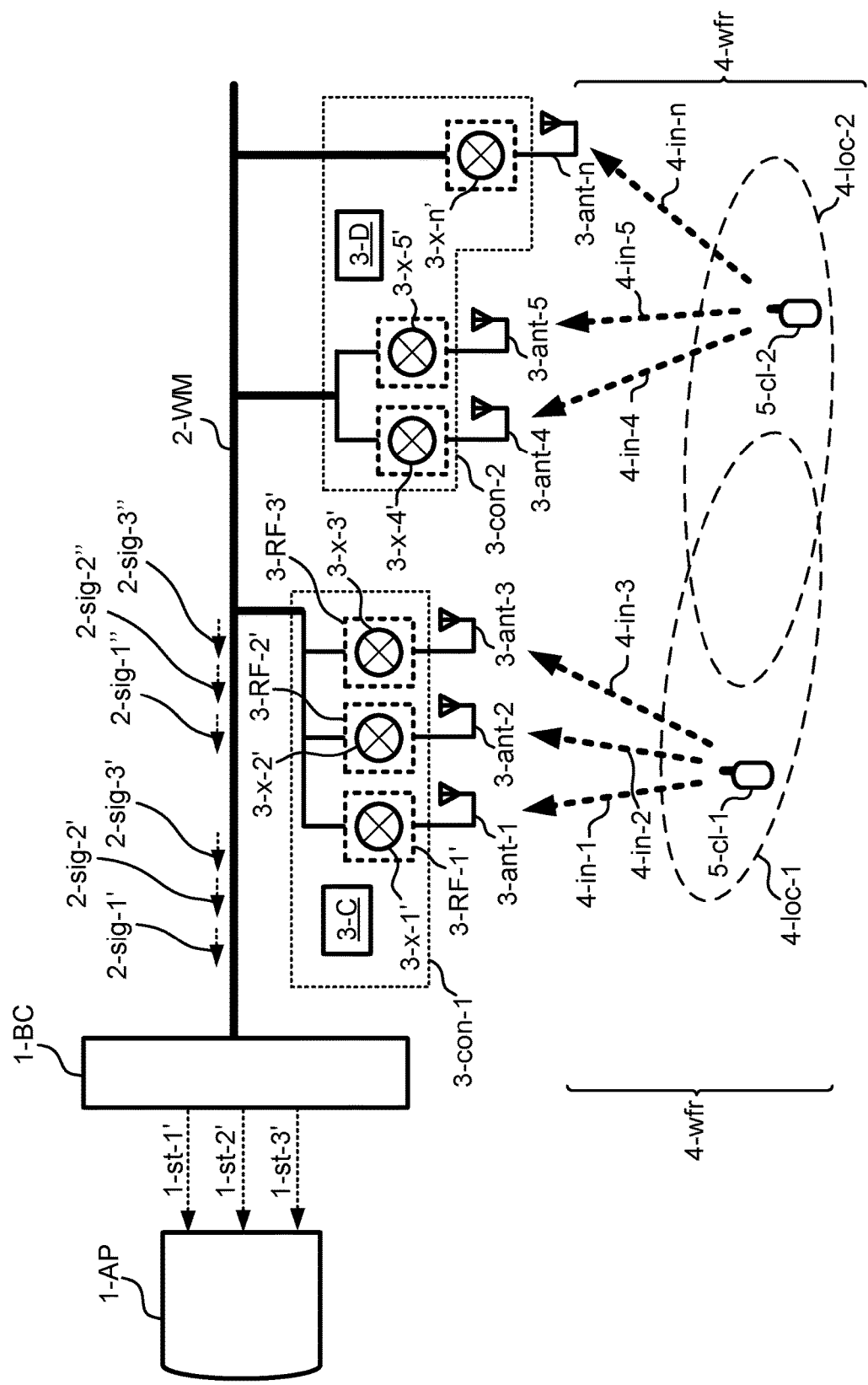
FIG. 3B illustrates one embodiment of a system operative to prevent a first wireless transmission from interfering with a second wireless transmission both transported over a wire-based medium.
Figure 9:
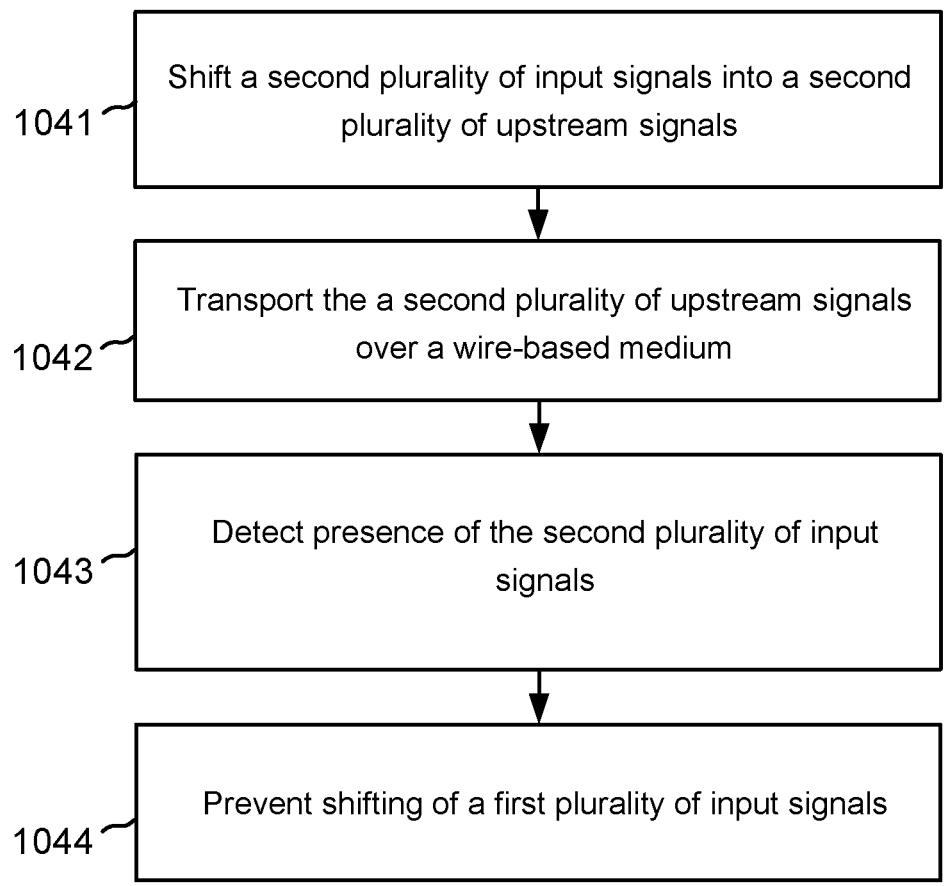
FIG. 9 illustrates one embodiment of a method for preventing a first wireless transmission from interfering with a second wireless transmission both transported over a wire-based medium.

The following paragraphs are associated with FIG. 3B, FIG. 9.

FIG. 9 illustrates one embodiment of a method for preventing a first wireless transmission from interfering with a second wireless transmission both transported over a wire-based medium. In step 1041, shifting, by a second plurality of mixers 3-*x*-4', 3-*x*-5', 3-*x*-*n*', respectively, a second plurality of input signals 4-*in*-4, 4-*in*-5, 4-*in*-*n*, each occupying a single wireless frequency range 4-*wfr*, respectively into a second plurality of upstream signals 2-*sig*-1", 2-*sig*-2", 2-*sig*-3" occupying respectively a plurality of different frequency ranges 2-*fr*-1, 2-*fr*-2, 2-*fr*-3 (FIG. 1B), in which the second plurality of input signals 4-*in*-4, 4-*in*-5, 4-*in*-*n* are received wirelessly from a second client device 5-*cl*-2 respectively via a second plurality of antennas 3-*ant*-4, 3-*ant*-5, 3-*ant*-*n*. In step 1042, transporting the second plurality of upstream signals 2-*sig*-1", 2-*sig*-2", 2-*sig*-3" via a wire-based medium 2-WM to a base converter 1-BC operative to convert the second plurality of upstream signals 2-*sig*-1", 2-*sig*-2", 2-*sig*-3" respectively into a plurality of receive streams 1-*st*-1', 1-*st*-2', 1-*st*-3'. In step 1043, detecting, by a detector 3-D associated with the second plurality of mixers 3-*x*-4', 3-*x*-5', 3-*x*-*n*', a presence of the second plurality of input signals 4-*in*-4, 4-*in*-5, 4-*in*-*n*. In step 1044, preventing, by a controller 3-C associated with a first plurality of mixers 3-*x*-1', 3-*x*-2', 3-*x*-3', based on said detection, from shifting, by the first plurality of mixers 3-*x*-1', 3-*x*-2', 3-*x*-3', respectively, a first plurality of input signals 4-*in*-1, 4-*in*-2, 4-*in*-3, each occupying the single wireless frequency range 4-*wfr*, respectively into a first plurality of upstream signals 2-*sig*-1', 2-*sig*-2', 2-*sig*-3' occupying respectively the plurality of different frequency ranges 2-*fr*-1, 2-*fr*-2, 2-*fr*-3 (FIG. 1B), in which the first plurality of input signals 4-*in*-1, 4-*in*-2, 4-*in*-3 are received wirelessly from a first client device 5-*cl*-1 respectively via a first plurality of antennas 3-*ant*-1, 3-*ant*-2, 3-*ant*-3, thereby, as a result of said prevention, avoiding a presence of the first plurality of upstream signals 2-*sig*-1', 2-*sig*-2', 2-*sig*-3' in the wire-based medium 2-WM, which would otherwise interfere with the second plurality of upstream signals 2-*sig*-1", 2-*sig*-2", 2-*sig*-3" in the wire-based medium 2-WM, as both pluralities of upstream signals share the plurality of different frequency ranges 2-*fr*-1, 2-*fr*-2, 2-*fr*-3, thereby, as a result of said avoidance, allowing an access point 1-AP to successfully decode the plurality of receive streams 1-*st*-1', 1-*st*-2', 1-*st*-3'.

In one embodiment, the first client device 5-*cl*-1 and the second client device 5-*cl*-2 are wifi client devices operating in conjunction with a carrier-sense-multiple-access (CSMA) mechanism; and the first client device 5-*cl*-1 is located in a first location 4-*loc*-1 and the second client device 5-*cl*-2 is located in a second location 4-*loc*-2, such that as a result of the different locations 4-*loc*-1, 4-*loc*-2, the second plurality of upstream signals 2-*sig*-1", 2-*sig*-2", 2-*sig*-3" are not received by the first client device 5-*cl*-1, thereby adversely affecting the CSMA mechanism in the first client device 5-*cl*-1 and causing said reception of the first plurality of input signals 4-*in*-1, 4-*in*-2, 4-*in*-3 from the first client device.

In one embodiment, the CSMA mechanism is associated with a wireless communication standard in unlicensed band, such as IEEE 802.11, in which the upstream signals 2-*sig*-1", 2-*sig*-2", 2-*sig*-3" that are not received by the first client device 5-*cl*-1 are associated with the second client device 5-*cl*-2 being a hidden station relative to the first client device.

In one embodiment, the wire-based medium 2-WM is a coaxial cable deployed in-house; and the first location 4-*loc*-1 is a first room in-house, and the second location 4-*loc*-2 is a second room in-house, thereby causing said second client device 5-*cl*-2 being a hidden station relative to the first client device 4-*loc*-2.

One embodiment is a system 1-AP, 1-BC, 2-WM, 3-*x*-1', 3-*x*-2', 3-*x*-3', 3-*x*-4', 3-*x*-5', 3-*x*-*n*', 3-*ant*-1, 3-*ant*-2, 3-*ant*-3, 3-*ant*-4, 3-*ant*-5, 3-*ant*-*n*, 3-C, 3-D, configured to prevent a first wireless transmission from interfering with a second wireless transmission both transported over a wire-based medium, for example as illustrated in FIG. 3B.

Figure 4A:
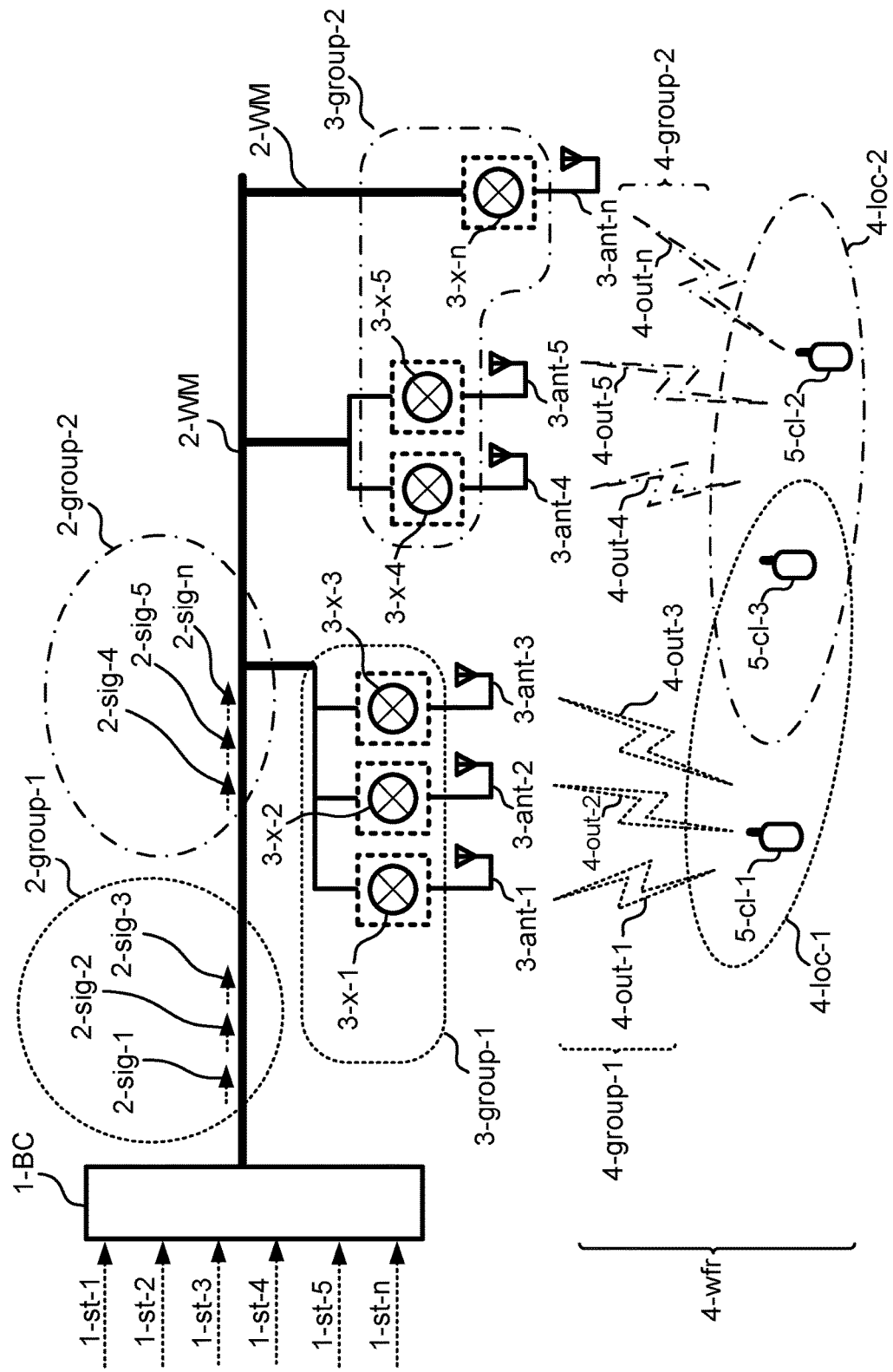
FIG. 4A illustrates one embodiment of a system operative to cover wirelessly multiple spatial locations via a wire-based medium using grouping of streams associated with spatial multiplexing.
Figure 10:
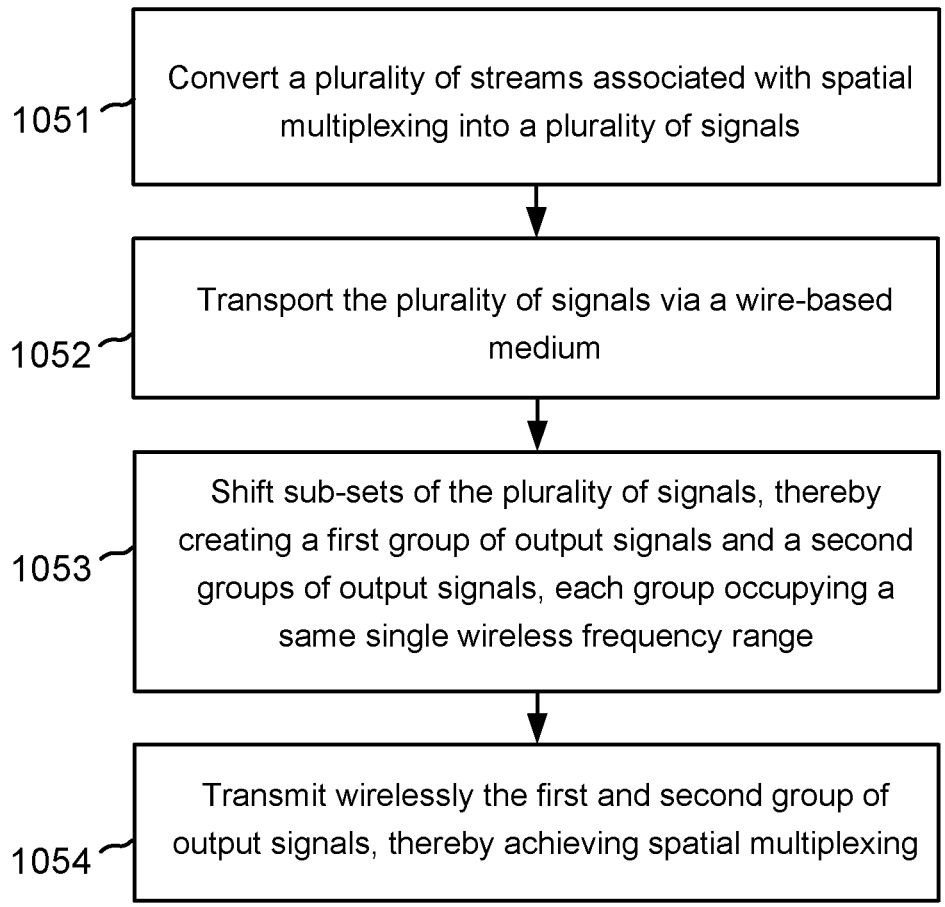
FIG. 10 illustrates one embodiment of a method for covering wirelessly multiple spatial locations via a wire-based medium using grouping of streams associated with spatial multiplexing.

The following paragraphs are associated with FIG. 4A, FIG. 10.

FIG. 10 illustrates one embodiment of a method for covering wirelessly multiple spatial locations via a wire-based medium using grouping of streams associated with spatial multiplexing. In step 1051, converting, by a base converter 1-BC, a plurality of streams 1-*st*-1, 1-*st*-2, 1-*st*-3, 1-*st*-4, 1-*st*-5, 1-*st*-*n* respectively into a plurality of signals 2-*sig*-1, 2-*sig*-2, 2-*sig*-3, 2-*sig*-4, 2-*sig*-5, 2-*sig*-*n* occupying respectively a plurality of different frequency ranges 2-*fr*-1, 2-*fr*-2, 2-*fr*-3, 2-*fr*-4, 2-*fr*-5, 2-*fr*-*n*, in which the plurality of streams are associated with spatial multiplexing. In step 1052, transporting, by the base converter 1-BC, a first sub-set 2-*sig*-1, 2-*sig*-2, 2-*sig*-3 (2-*group*-1) of the plurality of signals via a wire-based medium 2-WM respectively to a first group of mixers 3-*x*-1, 3-*x*-2, 3-*x*-3 (3-*group*-1), and a second sub-set 2-*sig*-4, 2-*sig*-5, 2-*sig*-*n* (2-*group*-2) of the plurality of signals via the wire-based medium 2-WM respectively to a second group of mixers 3-*x*-4, 3-*x*-5, 3-*x*-*n* (3-*group*-2). In step 1053, shifting, by each of the first group of mixers 3-*x*-1, 3-*x*-2, 3-*x*-3 (3-*group*-1), the respective one of the signals from the respective frequency range to a single wireless frequency range 4-*wfr* (i.e., 3-*x*-1 is shifting 2-*sig*-1 from 2-*fr*-1 to 4-*wfr*, 3-*x*-2 is shifting 2-*sig*-2 from 2-*fr*-2 to 4-*wfr*, and 3-*x*-3 is shifting 2-*sig*-3 from 2-*fr*-3 to 4-*wfr*), thereby creating, respectively, a first group of output signals 4-*out*-1, 4-*out*-2, 4-*out*-3 (4-*group*-1) each occupying the single wireless frequency range 4-*wfr* and corresponding to the respective stream (i.e. 4-*out*-1 corresponding to 1-*st*-1, 4-*out*-2 corresponding to 1-*st*-2, and 4-*out*-3 corresponding to 1-*st*-3), and shifting, by each of the second group of mixers 3-*x*-4, 3-*x*-5, 3-*x*-*n* (3-*group*-2), the respective one of the signals from the respective frequency range to the single wireless frequency range 4-*wfr* (i.e., 3-*x*-4 is shifting 2-*sig*-4 from 4-*fr*-1 to 4-*wfr*, 3-*x*-5 is shifting 2-*sig*-5 from 2-*fr*-5 to 4-*wfr*, and 3-*x*-*n* is shifting 2-*sig*-*n* from 2-*fr*-*n* to 4-*wfr*), thereby creating, respectively, a second group of output signals 4-*out*-4, 4-*out*-5, 4-*out*-*n* (4-*group*-2) each occupying the single wireless frequency range 4-*wfr* and corresponding to the respective stream (i.e. 4-*out*-4 corresponding to 1-*st*-5, 4-*out*-5 corresponding to 1-*st*-5, and 4-*out*-*n* corresponding to 1-*st*-*n*). In step 1054, transmitting wirelessly the first group of output signals 4-*out*-1, 4-*out*-2, 4-*out*-3 (4-*group*-1) via a first group of antennas 3-*ant*-1, 3-*ant*-2, 3-*ant*-3 thereby achieving spatial multiplexing in conjunction with the first group of output signals 4-*group*-1 all occupying the single wireless frequency range 4-*wfr*, and transmitting wirelessly the second group of output signals 4-*out*-4, 4-*out*-5, 4-*out*-*n* (4-*group*-2) via a second group of antennas 3-*ant*-4, 3-*ant*-5, 3-*ant*-*n* thereby achieving spatial multiplexing in conjunction with the second group of output signals 4-*group*-2 all occupying the single wireless frequency range 4-*wfr*, wherein the first group of output signals 4-*group*-1 transmitted wirelessly are associated with a first spatial location 4-*loc*-1 and the second group of output signals 4-*group*-2 transmitted wirelessly are associated with a second spatial location 4-*loc*-2.

In one embodiment, a first client device 5-*cl*-1 associated with the first spatial location 4-*loc*-1 decodes at least a first number of data streams associated with the spatial multiplexing in conjunction with the first group of output signals 4-*group*-1; and a second client device 5-*cl*-3 associated with both the first spatial location 4-*loc*-1 and the second spatial location 4-*loc*-2 decodes a second number of data streams associated with the spatial multiplexing in conjunction with the first group of output signals 4-*group*-1 and the second group of output signals 4-*group*-2, in which the second number is greater than the first number, thereby facilitating higher data rates for the second client device 5-*cl*-3 as compared to the first client device 5-*cl*-1.

In one embodiment, a first client device 5-*cl*-1 associated with the first spatial location 4-*loc*-1 decodes data streams associated with the spatial multiplexing in conjunction with the first group of output signals 4-*group*-1; and a second client device 5-*cl*-2 associated with the second spatial location 4-*loc*-2 decodes data streams associated with the spatial multiplexing in conjunction with the second group of output signals 4-*group*-2, for example as illustrated in FIG. 4A.

The following paragraphs are associated with FIG. 4A, FIG. 4B, FIG. 4C, FIG. 4D.

In one embodiment, the wire-based medium 2-WM has a transfer function 2-*TF*-1, 2-*TF*-2, in conjunction with the plurality of signals 2-*sig*-1, 2-*sig*-2, 2-*sig*-3, 2-*sig*-4, 2-*sig*-5, 2-*sig*-n and the respective plurality of different frequency ranges 2-*fr*-1, 2-*fr*-2, 2-*fr*-3, 2-*fr*-4, 2-*fr*-5, 2-*fr*-n, that varies along different locations along the wire-based medium 2-WM, such that the wire-based medium has a first transfer function 2-*TF*-1 in conjunction with a first location 2-*loc*-1 along the wire-based medium, and a second transfer function 2-*TF*-2 in conjunction with a second location 2-*loc*-2 along the wire-based medium; the first location 2-*loc*-1 along the wire-based medium 2-WM is associated with the first group of mixers 3-*x*-1, 3-*x*-2, 3-*x*-3 (3-*group*-1), and the second location 2-*loc*-2 along the wire-based medium is associated with the second group of mixers 3-*x*-4, 3-*x*-5, 3-*x*-n (3-*group*-2); and the first transfer function 2-*TF*-1 has a first fading 2-*fd*-1 located within the frequency range 2-*fr*-3 associated with one of the signals 2-*sig*-3 transported to the first group of mixers 3-*x*-1, 3-*x*-2, 3-*x*-3 (3-*group*-1), such as to adversely affect the signal 2-*sig*-3 and the respective output signal 4-*out*-3, in which the method for covering wirelessly multiple spatial locations via a wire-based medium using grouping of streams associated with spatial multiplexing further comprises:

detecting, by an access point 1-AP (not illustrated in FIG. 4A) generating said plurality of streams 1-*st*-1, 1-*st*-2, 1-*st*-3, 1-*st*-4, 1-*st*-5, 1-*st*-n, a sub-optimal communication condition in conjunction with a first client device 5-*cl*-1 receiving the output signal 4-*out*-3 affected by the first fading 2-*fd*-1; and changing, by the access point 1-AP, in conjunction with the base converter 1-BC and the appropriate mixer 3-*x*-3 in the first group of mixers 3-*group*-1, the frequency range 2-*fr*-3 associated with the signal 2-*sig*-3 adversely affected by the first fading 2-*fd*-1, to a different frequency range 2-*fr*-5, such that the signal 2-*sig*-3 adversely affected by the first fading 2-*fd*-1 is now associated with the different frequency range 2-*fr*-5 (this new association is depicted in FIG. 4D), and is therefore no longer adversely affected by the first fading 2-*fd*-1, thereby resolving the sub-optimal communication condition in conjunction with a first client device 5-*cl*-1.

One embodiment further comprises: using the frequency range 2-*fr*-3 previously associated with the signal 2-*sig*-3 that was adversely affected by the first fading 2-*fd*-1 for the transporting of one of the signals 2-*sig*-5 to the second group of mixers 3-*group*-2, in which the frequency range 2-*fr*-3 previously associated with the signal 2-*sig*-3 that was adversely affected by the first fading 2-*fd*-1 is clear from fading in conjunction with the second transfer function 2-*TF*-2 associated with the second location 2-*loc*-2 along the wire-based medium and associated with the second group of mixers 3-*group*-2.

One embodiment is a system 1-BC, 2-WM, 3-*x*-1, 3-*x*-2, 3-*x*-3, 3-*x*-4, 3-*x*-5, 3-*x*-n, 3-*ant*-1, 3-*ant*-2, 3-*ant*-3, 3-*ant*-4, 3-*ant*-5, 3-*ant*-n, configured to cover wirelessly multiple spatial locations via a wire-based medium using grouping of streams associated with spatial multiplexing, for example as illustrated in FIG. 4A.

Figure 5:
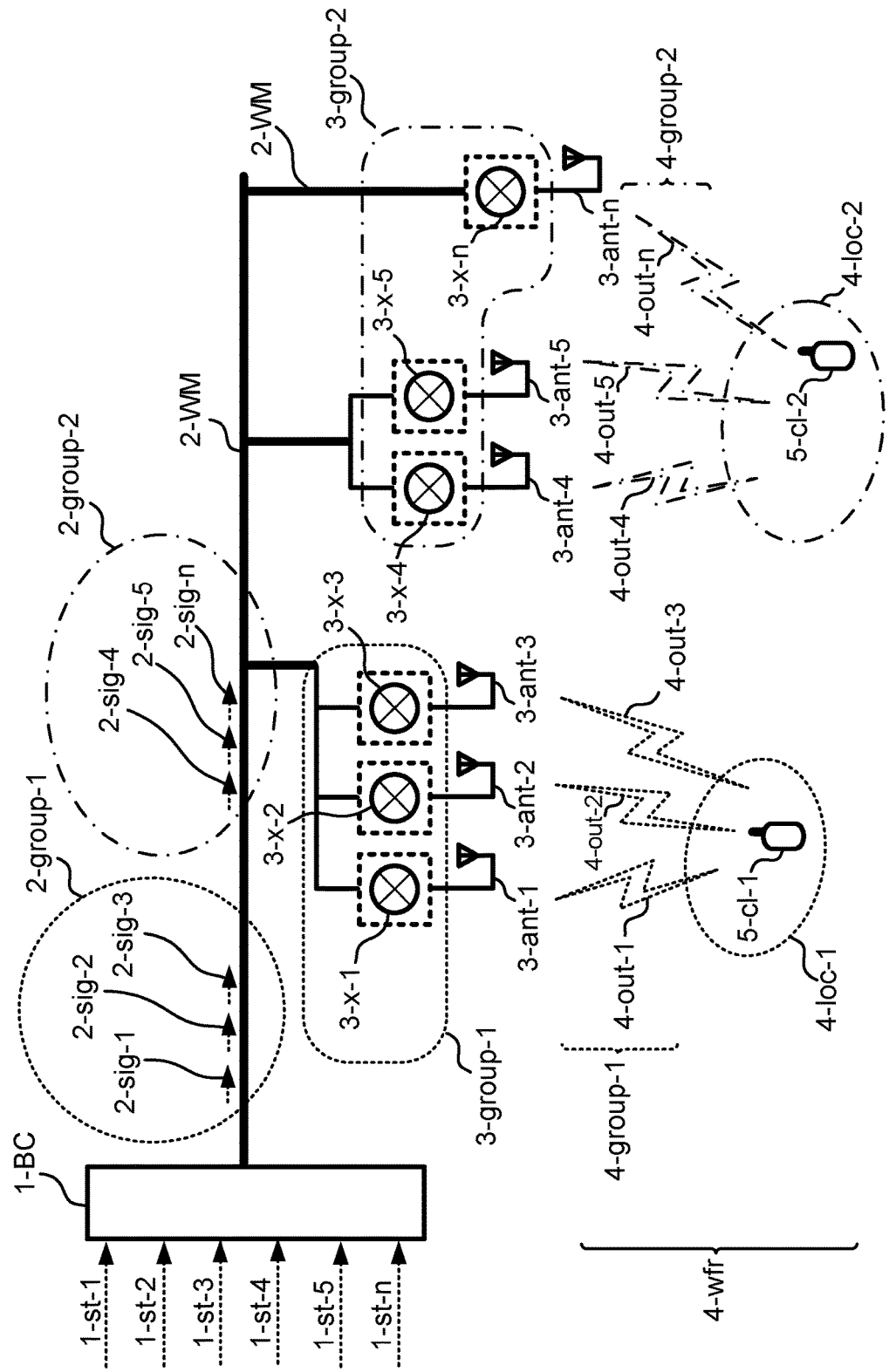
FIG. 5 illustrates one embodiment of a system operative to achieve spatial-division-multiple-access via a wire-based medium by grouping of streams in conjunction with a plurality of spatial locations.
Figure 11:
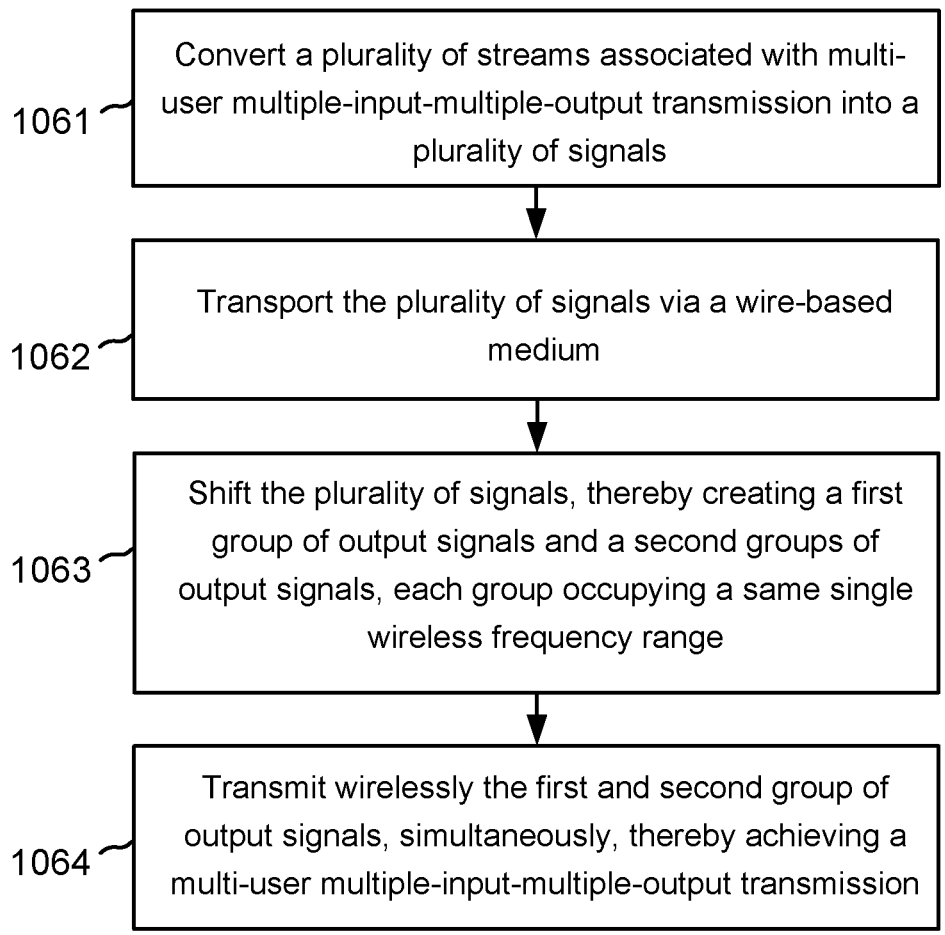
FIG. 11 illustrates one embodiment of a method for achieving spatial-division-multiple-access via a wire-based medium by grouping of streams in conjunction with a plurality of spatial locations.

The following paragraphs are associated with FIG. 5, FIG. 11.

FIG. 11 illustrates one embodiment of a method for achieving spatial-division-multiple-access via a wire-based medium by grouping of streams in conjunction with a plurality of spatial locations. In step 1061, converting, by a base converter 1-BC, a plurality of streams 1-*st*-1, 1-*st*-2, 1-*st*-3, 1-*st*-4, 1-*st*-5, 1-*st*-n respectively into a plurality of signals 2-*sig*-1, 2-*sig*-2, 2-*sig*-3, 2-*sig*-4, 2-*sig*-5, 2-*sig*-n occupying respectively a plurality of different frequency ranges 2-*fr*-1, 2-*fr*-2, 2-*fr*-3, 2-*fr*-4, 2-*fr*-5, 2-*fr*-n, in which the plurality of streams are associated with a multi-user multiple-input-multiple-output transmission. In step 1062, transporting, by the base converter 1-BC, a first sub-set 2-*sig*-1, 2-*sig*-2, 2-*sig*-3 (2-*group*-1) of the plurality of signals via a wire-based medium 2-WM respectively to a first group of mixers 3-*x*-1, 3-*x*-2, 3-*x*-3 (3-*group*-1), and a second sub-set 2-*sig*-4, 2-*sig*-5, 2-*sig*-n (2-*group*-2) of the plurality of signals via the wire-based medium 2-WM respectively to a second group of mixers 3-*x*-4, 3-*x*-5, 3-*x*-n (3-*group*-2). In step 1063, shifting, by each of the first group of mixers 3-*x*-1, 3-*x*-2, 3-*x*-3 (3-*group*-1), the respective one of the signals from the respective frequency range to a single wireless frequency range 4-*wfr* (i.e., 3-*x*-1 is shifting 2-*sig*-1 from 2-*fr*-1 to 4-*wfr*, 3-*x*-2 is shifting 2-*sig*-2 from 2-*fr*-2 to 4-*wfr*, and 3-*x*-3 is shifting 2-*sig*-3 from 2-*fr*-3 to 4-*wfr*), thereby creating, respectively, a first group of output signals 4-*out*-1, 4-*out*-2, 4-*out*-3 (4-*group*-1) each occupying the single wireless frequency range 4-*wfr* and corresponding to the respective stream (i.e. 4-*out*-1 corresponding to 1-*st*-1, 4-*out*-2 corresponding to 1-*st*-2, and 4-*out*-3 corresponding to 1-*st*-3), and shifting, by each of the second group of mixers 3-*x*-4, 3-*x*-5, 3-*x*-n (3-*group*-2), the respective one of the signals from the respective frequency range to the single wireless frequency range 4-*wfr* (i.e., 3-*x*-4 is shifting 2-*sig*-4 from 2-*fr*-4 to 4-*wfr*, 3-*x*-5 is shifting 2-*sig*-5 from 2-*fr*-5 to 4-*wfr*, and 3-*x*-n is shifting 2-*sig*-n from 2-*fr*-n to 4-*wfr*), thereby creating, respectively, a second group of output signals 4-*out*-4, 4-*out*-5, 4-*out*-n (4-*group*-2) each occupying the single wireless frequency range 4-*wfr* and corresponding to the respective stream (i.e. 4-*out*-4 corresponding to 1-*st*-5, 4-*out*-5 corresponding to 1-*st*-5, and 4-*out*-n corresponding to 1-*st*-n). In step 1064, transmitting, as a first transmission, wirelessly the first group of output signals 4-*group*-1 via a first group of antennas 3-*ant*-1, 3-*ant*-2, 3-*ant*-3 thereby achieving spatial multiplexing in conjunction with the first group of output signals 4-*group*-1 all occupying the single wireless frequency range 4-*wfr*, and transmitting, as a second transmission, wirelessly the second group of output signals 4-*group*-2 via a second group of antennas 3-*ant*-4, 3-*ant*-5, 3-*ant*-n thereby achieving spatial multiplexing in conjunction with the second group 4-*group*-2 of output signals all occupying the single wireless frequency range 4-*wfr*, and thereby facilitating a multi-user multiple-input-multiple-output transmission, in which the two transmissions are done simultaneously or concurrently over the single wireless frequency range 4-*wfr*, such that a first client device 5-*cl*-1 receives the first transmission simultaneously or substantially simultaneously to a second client device 5-*cl*-2 receiving the second transmission.

In one embodiment, the first group of output signals 4-*group*-1 transmitted wirelessly is associated with a first spatial location 4-*loc*-1 also associated with the first client 5-*cl*-1, and the second group of output signals 4-*group*-2 transmitted wirelessly is associated with a second spatial location 4-*loc*-2 also associated with the second client device 5-*cl*-2, such that the first group of output signals 4-*group*-1 is received in the second spatial location 4-*loc*-2 by the second client device 5-*cl*-2 at a power level that is at least 10 (ten) decibel below a power level at which the second group of output signals 4-*group*-2 is received in the second spatial location 4-*loc*-2 by the second client device 5-*cl*-2; and the second group of output signals 4-*group*-2 is received in the first spatial location 4-*loc*-1 by the first client device 5-*cl*-1 at a power level that is at least 10 (ten) decibel below a power level at which the first group of output signals 4-*group*-1 is received in the first spatial location 4-*loc*-1 by the first client device 5-*cl*-1, thereby further facilitating the multi-user multiple-input-multiple-output transmission without a need to perform a sounding procedure.

In one embodiment, the multi-user multiple-input-multiple-output transmission is achieved in conjunction with a sounding procedure done with the first client device 5-*cl*-1 and the second client device 5-*cl*-2, such that the second transmission does not interfere with the first transmission and vice versa.

In one embodiment, the multi-user multiple-input-multiple-output transmission is associated with IEEE 802.11ac.

One embodiment is a system 1-BC, 2-WM, 3-*x*-1, 3-*x*-2, 3-*x*-3, 3-*x*-4, 3-*x*-5, 3-*x*-*n*, 3-*ant*-1, 3-*ant*-2, 3-*ant*-3, 3-*ant*-4, 3-*ant*-5, 3-*ant*-*n*, configured to achieve spatial-division-multiple-access via a wire-based medium by grouping of streams in conjunction with a plurality of spatial locations, for example as illustrated in FIG. 5.

Figure 6A:
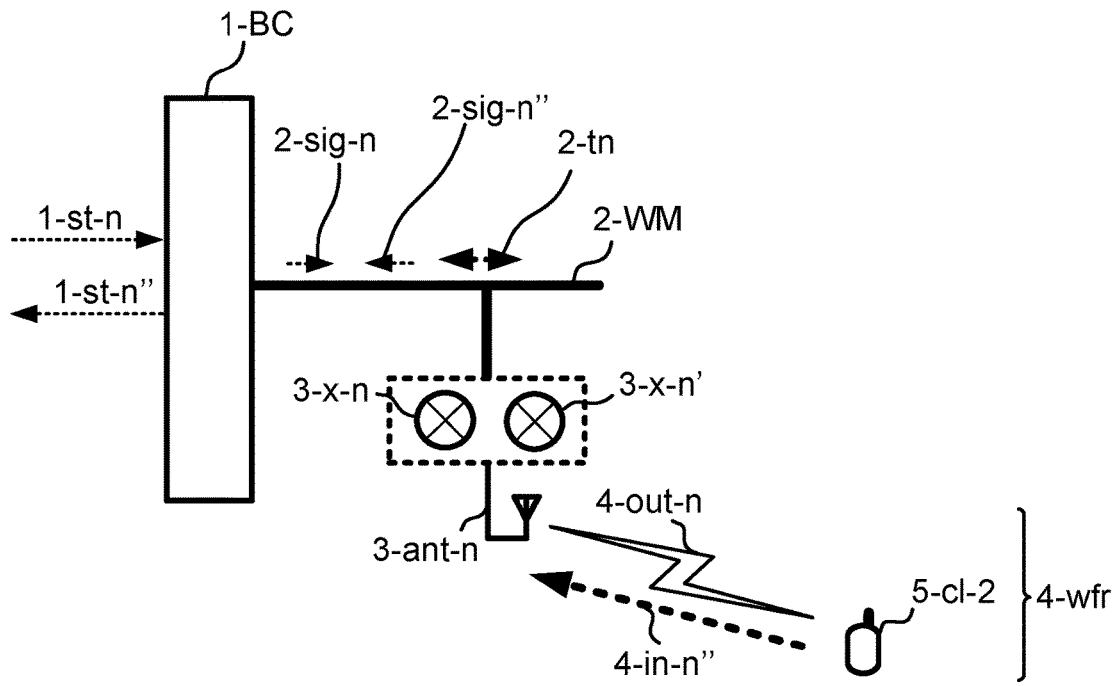
FIG. 6A illustrates one embodiment of a system operative to use wireless frame aggregation to mitigate wire-based interferences.
Figure 6B:
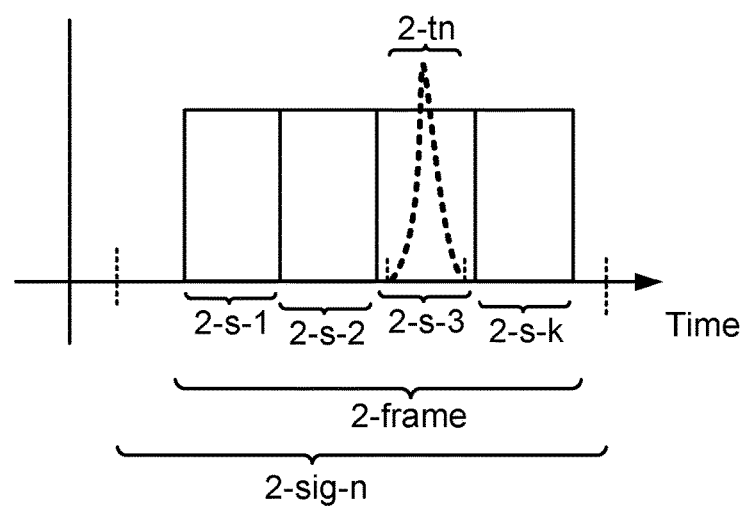
FIG. 6B illustrates one embodiment of a transient interference appearing in an aggregated data frame and in conjunction with the system operative to use wireless frame aggregation to mitigate wire-based interferences.
Figure 12:
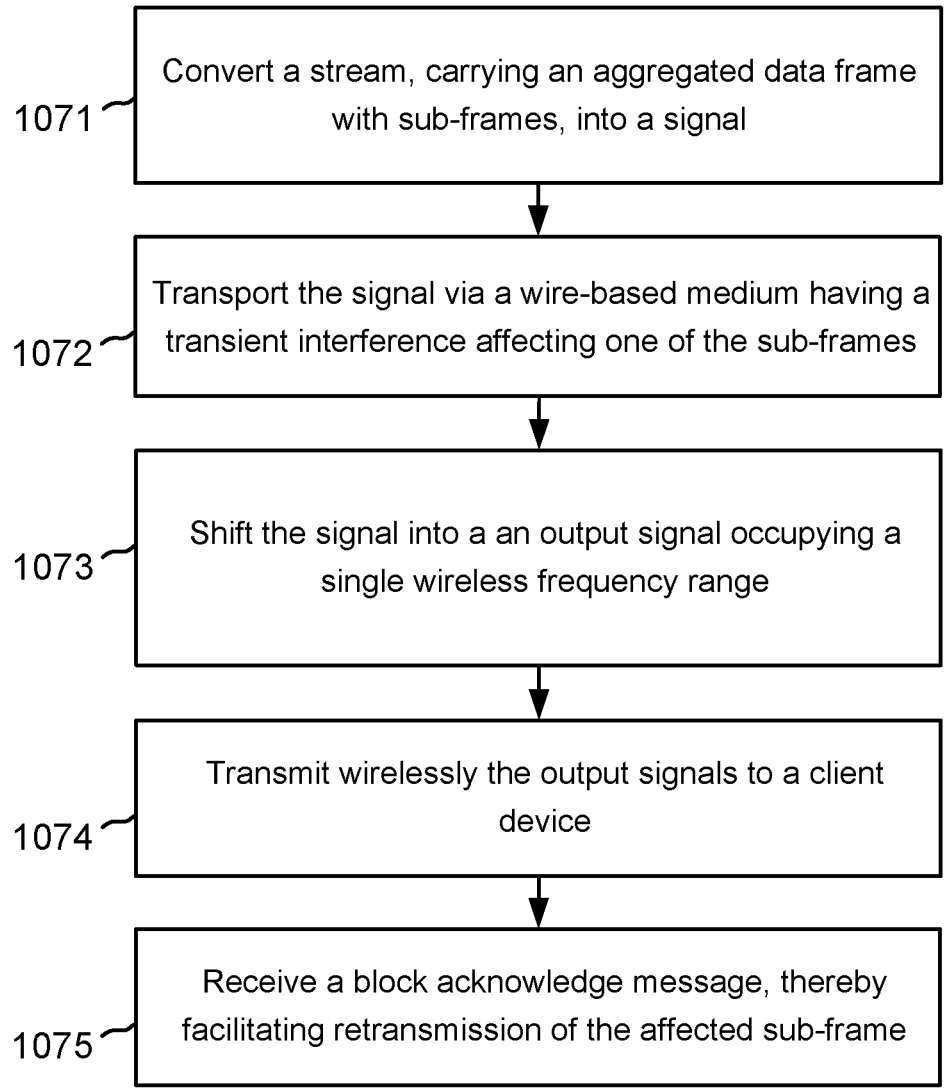
FIG. 12 illustrates one embodiment of a method for using wireless frame aggregation to mitigate wire-based interferences.

The following paragraphs are associated with FIG. 6A, FIG. 6B, FIG. 12.

FIG. 12 illustrates one embodiment of a method for using wireless frame aggregation to mitigate wire-based interferences. In step 1071, converting, by a base converter 1-BC, at least one stream 1-*st*-*n* respectively into at least one signal 2-*sig*-*n* occupying respectively at least one frequency range 2-*fr*-*n*, in which the stream is conveying an aggregated data frame 2-*frame* comprising a plurality of sub-frames 2-*s*-1, 2-*s*-2, 2-*s*-3, 2-*s*-*k*. In step 1072, transporting, by the base converter 1-BC, the signal 2-*sig*-*n* via a wire-based medium 2-WM respectively to at least one mixer 3-*x*-*n*, in which a transient interference 2-*tn* associated with the wire-based medium 2-WM affects at least one sub-frame 2-*s*-3 in the aggregated data frame 2-*frame* conveyed by the signal 2-*sig*-*n*, but not all of the sub-frames in the aggregated data frame. In step 1073, shifting, by the mixer 3-*x*-*n*, the signal 2-*sig*-*n* from the respective frequency 2-*fr*-*n* range to a single wireless frequency range 4-*wfr*, thereby creating, respectively, at least one output signal 4-*out*-*n* occupying the single wireless frequency range 4-*wfr* and corresponding to the respective stream 1-*st*-*n*, in which the sub-frame 2-*s*-3 affected by the transient interference 2-*tn* is present in the output signal 4-*out*-*n*. In step 1074, transmitting wirelessly the output signal 4-*out*-*n*, respectively via at least one antenna 3-*ant*-*n* to a client device 5-*cl*-2. In step 1075, receiving 1-*st*-*n*", 2-*sig*-*n*", from the client device 5-*cl*-2, a block acknowledge message 4-*in*-*n*" comprising an indication of which of the sub-frames 2-*s*-3 were affected by the transient interference 2-*tn*, thereby facilitating retransmission of the affected sub-frames 2-*s*-3.

In one embodiment, the wire-based medium 2-WM is a coaxial cable deployed in-house.

In one embodiment, the frequency 2-*fr*-1 is located below 1.5 GHz, at a frequency zone that is, at least momentarily, not occupied by in-house coaxial signals such as DOCSIS signals, MoCA signals, and cable TV signals.

In one embodiment, the transient interference 2-*tn* is associated with ingress noise occurring in conjunction with the coaxial cable deployed in-house.

In some embodiments, in-house can include a house, a building, or other structure that can include one or more rooms.

In one embodiment, the frame aggregation and block acknowledge are associated with IEEE 802.11n or IEEE 802.11ac.

One embodiment is a system 1-AP, 1-BC, 2-WM, 3-*x*-*n*, 3-*x*-*n*', 3-*ant*-*n*, configured to use wireless frame aggregation to mitigate wire-based interferences.

The following paragraphs are associated with FIG. 1A, FIG. 1B, FIG. 1C, FIG. 13.

Figure 13:
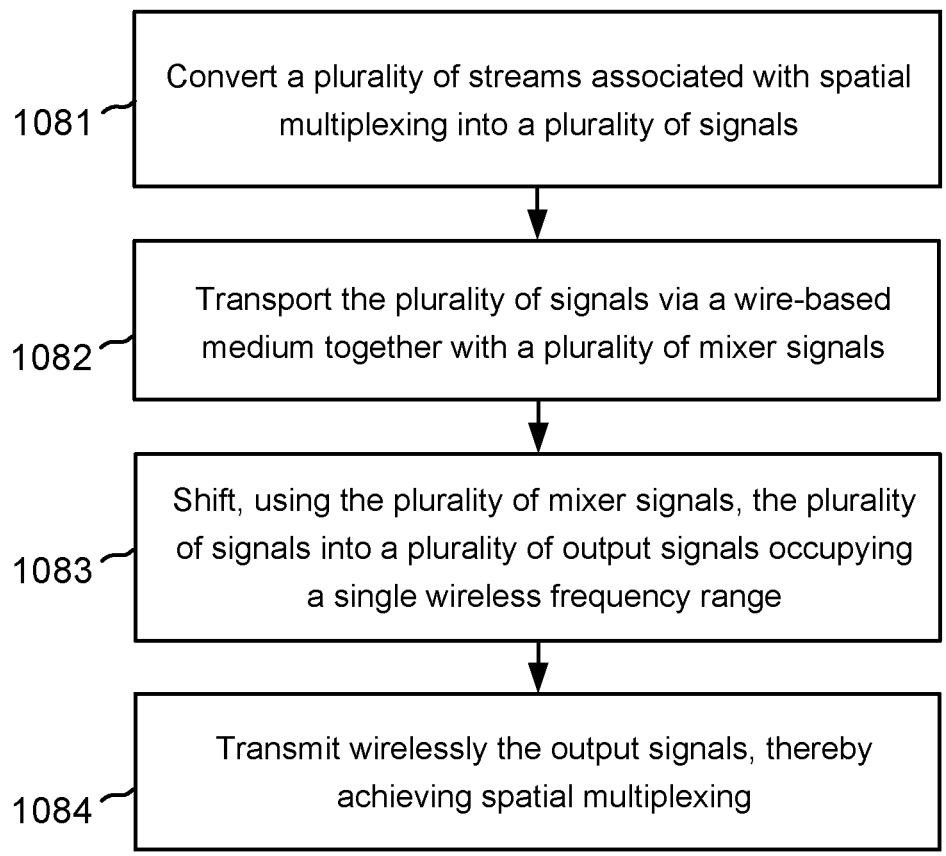
FIG. 13 illustrates one embodiment of a method for transporting a plurality of streams associated with spatial multiplexing over a wire-based medium together with corresponding mixer signals.

FIG. 13 illustrates one embodiment of a method for transporting a plurality of streams associated with spatial multiplexing over a wire-based medium together with corresponding mixer signals. In step 1081, converting, by a base converter 1-BC, a plurality of streams 1-*st*-1, 1-*st*-2, 1-*st*-3, 1-*st*-4, 1-*st*-5, 1-*st*-*n* respectively into a plurality of signals 2-*sig*-1, 2-*sig*-2, 2-*sig*-3, 2-*sig*-4, 2-*sig*-5, 2-*sig*-*n* occupying respectively a plurality of different frequency ranges 2-*fr*-1, 2-*fr*-2, 2-*fr*-3, 2-*fr*-4, 2-*fr*-5, 2-*fr*-*n*, in which the plurality of streams are associated with spatial multiplexing. In step 1082, transporting, by the base converter 1-BC, the plurality of signals 2-*sig*-1, 2-*sig*-2, 2-*sig*-3, 2-*sig*-4, 2-*sig*-5, 2-*sig*-*n* together with a plurality of mixer signals 2-*clk*-1, 2-*clk*-2, 2-*clk*-3, 2-*clk*-4, 2-*clk*-5, 2-*clk*-*n* (see FIG. 1C), associated respectively with the plurality of signals, via a wire-based medium 2-WM respectively to a plurality of mixers 3-*x*-1, 3-*x*-2, 3-*x*-3, 3-*x*-4, 3-*x*-5, 3-*x*-*n*. In step 1083, shifting, by each of the of mixers 3-*x*-1, 3-*x*-2, 3-*x*-3, 3-*x*-4, 3-*x*-5, 3-*x*-*n*, using the respective mixer signal 2-*clk*-1, 2-*clk*-2, 2-*clk*-3, 2-*clk*-4, 2-*clk*-5, 2-*clk*-*n*, the respective one of the signals from the respective frequency range to a single wireless frequency range 4-*wfr* (i.e., 3-*x*-1 is shifting 2-*sig*-1 from 2-*fr*-1 to 4-*wfr* using 2-*clk*-1 as an input clock to 3-*x*-1, 3-*x*-2 is shifting 2-*sig*-2 from 2-*fr*-2 to 4-*wfr* using 2-*clk*-2 as an input clock to 3-*x*-2, etc.), thereby creating, respectively, a plurality of output signals 4-*out*-1, 4-*out*-2, 4-*out*-3, 4-*out*4, 4-*out*-5, 4-*out*-*n* each occupying the single wireless frequency range 4-*wfr* and corresponding to the respective stream. In step 1084, transmitting wirelessly the plurality of output signals 4-*out*-1, 4-*out*-2, 4-*out*-3, 4-*out*4, 4-*out*-5, 4-*out*-*n* via a plurality of antennas 3-*ant*-1, 3-*ant*-2, 3-*ant*-3, 3-*ant*-4, 3-*ant*-5, 3-*ant*-*n*, thereby achieving spatial multiplexing in conjunction with the plurality of output signals 4-*out*-1, 4-*out*-2, 4-*out*-3, 4-*out*4, 4-*out*-5, 4-*out*-*n* all occupying the single wireless frequency range 4-*wfr*.

In one embodiment, the plurality of signals 2-*sig*-1, 2-*sig*-2, 2-*sig*-3, 2-*sig*-4, 2-*sig*-5, 2-*sig*-*n* and the plurality of output signals 4-*out*-1, 4-*out*-2, 4-*out*-3, 4-*out*4, 4-*out*-5, 4-*out*-*n* are OFDM or OFDMA signals associated with a standard selected from a group consisting of (i) wifi, (ii) wimax, and (iii) LTE.

In one embodiment, the wire-based medium 2-WM is a coaxial cable deployed in-house. In some embodiments, in-house can include a house, a building, or other structure that can include one or more rooms.

In one embodiment, the plurality of different frequency ranges 2-*fr*-1, 2-*fr*-2, 2-*fr*-3, 2-*fr*-4, 2-*fr*-5, 2-*fr*-n are located below 1.5 GHz, at frequency zones that are, at least momentarily, not occupied by in-house coaxial signals such as DOCSIS signals, MoCA signals, and cable TV signals.

In one embodiment, the wire-based medium 2-WM is selected from a group consisting of: (i) a coaxial cable, (ii) a twisted-pair cable, (iii) category-5 cable, and (iv) any cable capable of facilitating propagation of electromagnetic signals.

One embodiment is a system 1-BC, 2-WM, 3-*x*-1, 3-*x*-2, 3-*x*-3, 3-*x*-4, 3-*x*-5, 3-*x*-n, 3-*ant*-1, 3-*ant*-2, 3-*ant*-3, 3-*ant*-4, 3-*ant*-5, 3-*ant*-n, configured to transport a plurality of streams associated with spatial multiplexing over a wire-based medium together with corresponding mixer signals.

Figure 14A:
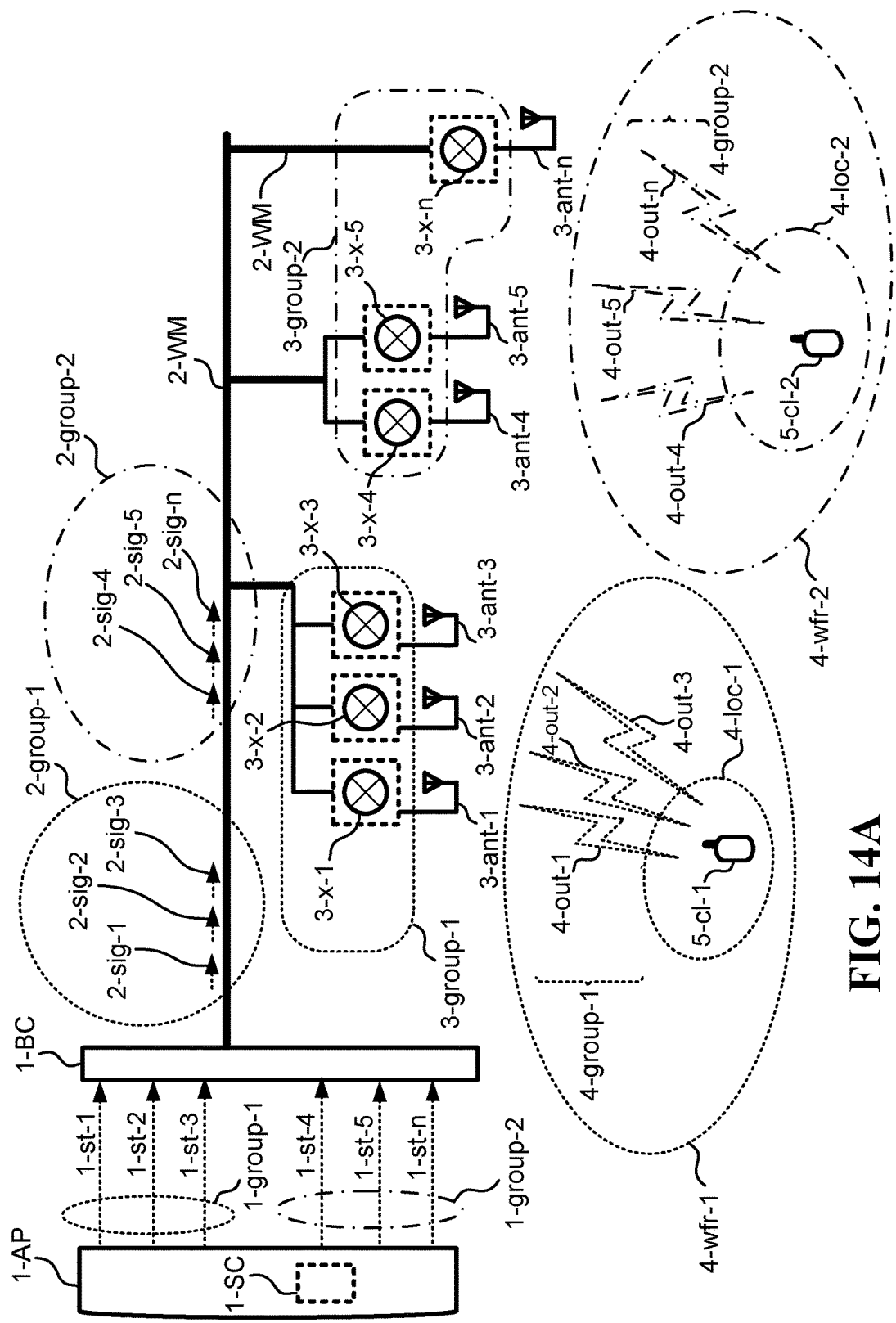
FIG. 14A illustrates one embodiment of a system operative to generate simultaneously two multiple-input-multiple-output (MIMO) transmissions using two separate wireless frequency ranges.
Figure 14B:
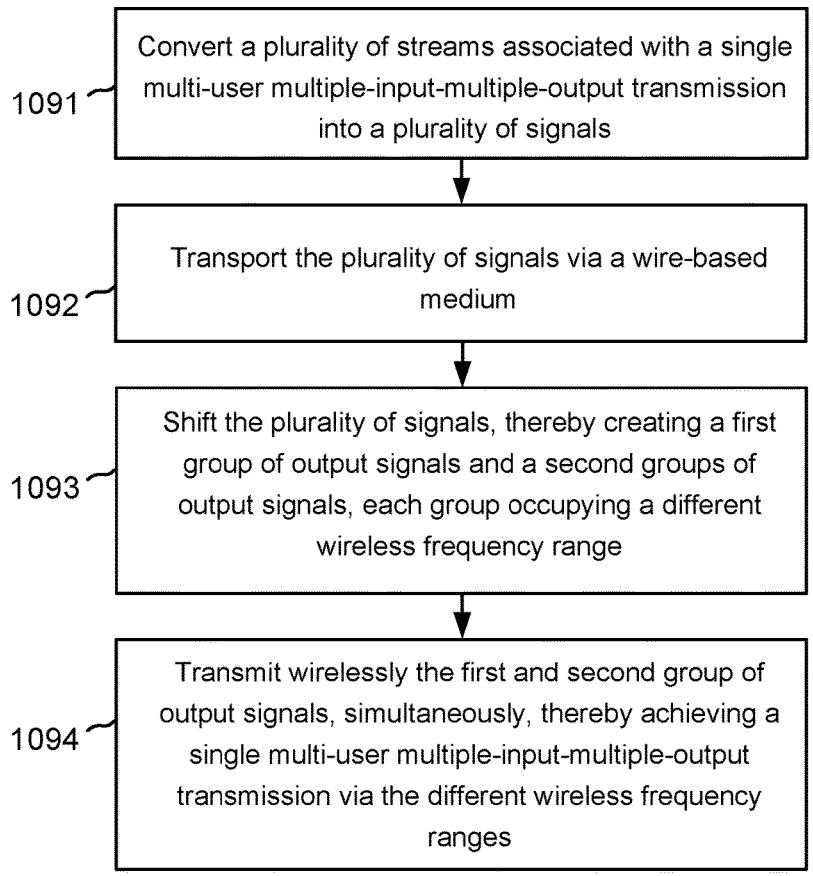
FIG. 14B illustrates one embodiment of a method for generating simultaneously two multiple-input-multiple-output (MIMO) transmissions using two separate wireless frequency ranges.
Figure 14C:
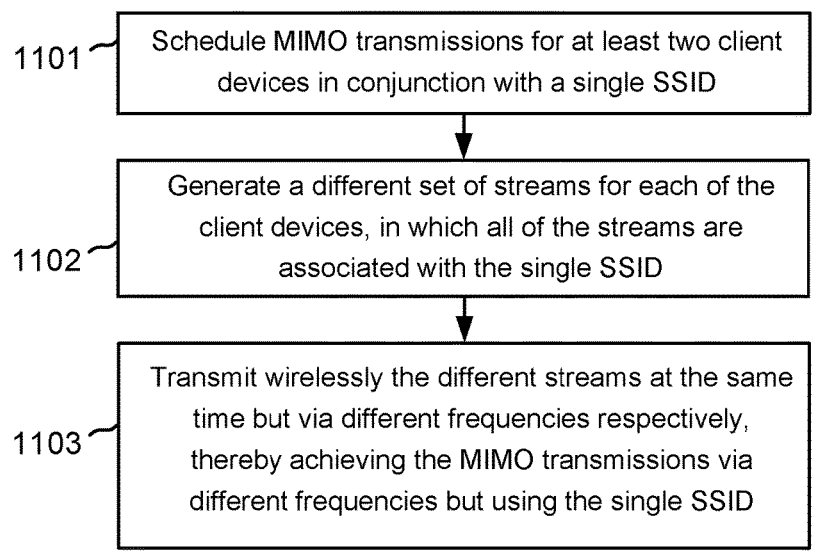
FIG. 14C illustrates one embodiment of a method for generating simultaneously two multiple-input-multiple-output (MIMO) transmissions associated with a single service-set-identifier (SSID) but using two separate wireless frequency ranges.

The following paragraphs are associated with FIG. 14A, FIG. 14B, and FIG. 14C.

FIG. 14A illustrates one embodiment of a system operative to generate simultaneously two multiple-input-multiple-output (MIMO) transmissions using two separate wireless frequency ranges. The system includes an access point 1-AP comprising a single scheduling component 1-SC, in which the single scheduling component is configured to schedule at least a first MIMO transmission and a second MIMO transmission to occur simultaneously over a predetermined time period, and in which the access point is configured to generate, based on said schedule, during the predetermined time period, a first set 1-*group*-1 of streams 1-*st*-1, 1-*st*-2, 1-*st*-3 associated with the first MIMO transmission and a second set 1-*group*-2 of streams 1-*st*-4, 1-*st*-5, 1-*st*-n associated with the second MIMO transmission. The system further includes a first group 3-*group*-1 of mixers 3-*x*-1, 3-*x*-2, 3-*x*-3 associated with a first group of antennas 3-*ant*-1, 3-*ant*-2, 3-*ant*-3 and a second group 3-*group*-2 of mixers 3-*x*-4, 3-*x*-5, 3-*x*-n associated with a second group of antennas 3-*ant*-4, 3-*ant*-5, 3-*ant*-n.

In one embodiment, the first group 3-*group*-1 of mixers 3-*x*-1, 3-*x*-2, 3-*x*-3 is configured to transmit, via the first group of antennas ant-1, 3-*ant*-2, 3-*ant*-3, at a first wireless frequency range 4-*wfr*-1 and during the predetermined time period, a first group 4-*group*-1 of output signals 4-*out*-1, 4-*out*-2, 4-*out*-3 associated respectively with the first set 1-*group*-1 of streams 1-*st*-1, 1-*st*-2, 1-*st*-3, thereby achieving the first MIMO transmission in conjunction with the first wireless frequency range 4-*wfr*-1, and the second group 3-*group*-2 of mixers 3-*x*-4, 3-*x*-5, 3-*x*-n is configured to transmit, via the second group of antennas 3-*ant*-4, 3-*ant*-5, 3-*ant*-n, at a second wireless frequency range 4-*wfr*-2 and during the same predetermined time period, a second group 4-*group*-2 of output signals 4-*out*-4, 4-*out*-5, 4-*out*-n associated respectively with the second set 1-*group*-2 of streams 1-*st*-4, 1-*st*-5, 1-*st*-n, thereby achieving the second MIMO transmission in conjunction with the second wireless frequency range 4-*wfr*-2.

In one embodiment, the first wireless frequency range 4-*wfr*-1 and the second wireless frequency range 4-*wfr*-2 are two separate wireless frequency ranges that prevent, at least partially, electromagnetic interferences between the first MIMO transmission and second MIMO transmission all occurring simultaneously.

In one embodiment, the system further includes: a wire-based medium 2-WM, and a base converter 1-BC. The base converter 1-BC is configured to: convert the first set 1-*group*-1 of streams 1-*st*-1, 1-*st*-2, 1-*st*-3 into a first plurality 2-*group*-1 of signals 2-*sig*-1, 2-*sig*-2, 2-*sig*-3 occupying respectively a first plurality of different frequency ranges, and convert the second set 1-*group*-2 of streams 1-*st*-4, 1-*st*-5, 1-*st*-n into a second plurality 2-*group*-2 of signals 2-*sig*-4, 2-*sig*-5, 2-*sig*-n occupying respectively a second plurality of different frequency ranges that are different than the first plurality of different frequency ranges. The base converter 1-BC is further configured to: transport the first plurality of signals 2-*sig*-1, 2-*sig*-2, 2-*sig*-3 via the wire-based medium 2-WM to the first group of mixers 3-*x*-1, 3-*x*-2, 3-*x*-3, and transport the second plurality of signals 2-*sig*-4, 2-*sig*-5, 2-*sig*-n via the wire-based medium 2-WM to the second group of mixers 3-*x*-4, 3-*x*-5, 3-*x*-n. Each mixer 3-*x*-1, 3-*x*-2, 3-*x*-3 of the first group 3-*group*-1 of mixers is configured to: shift one 2-*sig*-1, 2-*sig*-2, 2-*sig*-3 of the first plurality 2-*group*-1 of signals from the respective frequency range to the first wireless frequency range 4-*wfr*-1, thereby facilitating said generation of the first group 4-*group*-1 of output signals 4-*out*-1, 4-*out*-2, 4-*out*-3 each occupying the first wireless frequency range 4-*wfr*-1, and each mixer 3-*x*-4, 3-*x*-5, 3-*x*-n of the second group 3-*group*-2 of mixers is configured to: shift one 2-*sig*-4, 2-*sig*-5, 2-*sig*-n of the second plurality 2-*group*-2 of signals from the respective frequency range to the second wireless frequency range 4-*wfr*-2, thereby facilitating said generation of the second group 4-*group*-2 of output signals 4-*out*-4, 4-*out*-5, 4-*out*-n each occupying the second wireless frequency range 4-*wfr*-2.

In one embodiment, the wire-based medium 2-WM is selected from a group consisting of: (i) a coax cable, (ii) a twisted-pair cable, (iii) category-5 cable, and (iv) any cable capable of facilitating propagation of electromagnetic signals.

In one embodiment, the wire-based medium 2-WM is placed in-house, the first group 3-*group*-1 of mixers 3-*x*-1, 3-*x*-2, 3-*x*-3 is placed in a first room 4-*loc*-1 in-house, such that the first MIMO transmission is situated in the first room and directed to a first client device 5-*cl*-1 located in the first room, and the second group 3-*group*-2 of mixers 3-*x*-4, 3-*x*-5, 3-*x*-n is placed in a second room 4-*loc*-2 in-house, such that the second MIMO transmission is situated in the second room and directed to a second client device 5-*cl*-2 located in the second room. In some embodiments, in-house can include a house, a building, or other structure that can include one or more rooms.

In one embodiment, the first wireless frequency range 4-*wfr*-1 and the second wireless frequency range 4-*wfr*-2 are two separate wireless frequency ranges that prevent, at least partially, electromagnetic interferences between the first MIMO transmission and second MIMO transmission all occurring simultaneously, in which said prevention is further facilitated by said location of the first client device 5-*cl*-1 and the first group 3-*group*-1 of mixers 3-*x*-1, 3-*x*-2, 3-*x*-3 in the first room 4-*loc*-1, and said location of the second client device 5-*cl*-2 and the second group 3-*group*-2 of mixers 3-*x*-4, 3-*x*-5, 3-*x*-n in the second room 4-*loc*-2.

In one embodiment, the access point 1-AP is a wifi access point supporting at least partly a standard associated with IEEE 802.11, such as IEEE 802.11n or IEEE 802.11ac, in which said scheduling of the first MIMO transmission and the second MIMO transmission is part of the standard in conjunction with a single multi-user multiple-input-multiple-output (MU-MIMO) transmission technique.

In one embodiment, said scheduling and generation of the first MIMO transmission and the second MIMO transmission are accomplished in the wifi access point 1-AP in conjunction with the single MU-MIMO transmission, in which the wifi access point is unaware of the first and second different frequency ranges 4-*wfr*-1, 4-*wfr*-2 which are not part of said standard when appearing together in a single MU-MIMO transmission, and which are introduced independently by the base converter.

In one embodiment, the access point 1-AP is an LTE access point or an LTE base-station supporting at least partly a standard associated with LTE, in which said scheduling of the first MIMO transmission and the second MIMO transmission is part of the standard.

FIG. 14B illustrates one embodiment of a method for generating simultaneously two multiple-input-multiple-output (MIMO) transmissions using two separate wireless frequency ranges. In step 1091, converting, by a base converter 1-BC, a plurality of streams 1-*st*-1, 1-*st*-2, 1-*st*-3, 1-*st*-4, 1-*st*-5, 1-*st*-*n* respectively into a plurality of signals 2-*sig*-1, 2-*sig*-2, 2-*sig*-3, 2-*sig*-4, 2-*sig*-5, 2-*sig*-*n* occupying respectively a plurality of different frequency ranges, in which the plurality of streams are associated with a single multi-user multiple-input-multiple-output (MU-MIMO) transmission operative to convey, simultaneously, at least two separate MIMO transmissions respectively to at least two separate client devices 5-*cl*-1, 5-*cl*-2. In step 1092, transporting, by the base converter 1-BC, a first sub-set 2-*group*-1 of the plurality of signals via a wire-based medium 2-WM respectively to a first group 3-*group*-1 of mixers 3-*x*-1, 3-*x*-2, 3-*x*-3, and a second sub-set 2-*group*-2 of the plurality of signals via the wire-based medium 2-WM respectively to a second group 3-*group*-2 of mixers 3-*x*-4, 3-*x*-5, 3-*x*-*n*. In step 1093, shifting, by each mixer 3-*x*-1, 3-*x*-2, 3-*x*-3 of the first group of mixers 3-*group*-1, the respective one of the signals 2-*sig*-1, 2-*sig*-2, 2-*sig*-3 from the respective frequency range to a first wireless frequency range 4-*wfr*-1, thereby creating, respectively, a first group 4-*group*-1 of output signals 4-*out*-1, 4-*out*-2, 4-*out*-3 each occupying the first wireless frequency range 4-*wfr*-1 and corresponding to the respective stream 1-*st*-1, 1-*st*-2, 1-*st*-3, and shifting, by each mixer 3-*x*-4, 3-*x*-5, 3-*x*-*n* of the second group of mixers 3-*group*-2, the respective one of the signals 2-*sig*-4, 2-*sig*-5, 2-*sig*-*n* from the respective frequency range to a second wireless frequency range 4-*wfr*-2, thereby creating, respectively, a second group 4-*group*-2 of output signals 4-*out*-4, 4-*out*-5, 4-*out*-*n* each occupying the second wireless frequency range 4-*wfr*-2 and corresponding to the respective stream 1-*st*-4, 1-*st*-5, 1-*st*-*n*. In step 1094, transmitting wirelessly, as a first MIMO transmission, the first group 4-*group*-1 of output signals 4-*out*-1, 4-*out*-2, 4-*out*-3 via a first group of antennas 3-*ant*-1, 3-*ant*-2, 3-*ant*-3 thereby achieving spatial multiplexing in conjunction with the first group 4-*group*-1 of output signals 4-*out*-1, 4-*out*-2, 4-*out*-3 all occupying the first wireless frequency range 4-*wfr*-1, and transmitting wirelessly, as a second MIMO transmission, the second group 4-*group*-2 of output signals 4-*out*-4, 4-*out*-5, 4-*out*-*n* via a second group of antennas 3-*ant*-4, 3-*ant*-5, 3-*ant*-*n* thereby achieving spatial multiplexing in conjunction with the second group 4-*group*-2 of output signals 4-*out*-4, 4-*out*-5, 4-*out*-*n* all occupying the second wireless frequency range 4-*wfr*-2, and thereby facilitating the single MU-MIMO transmission, in which the two MIMO transmissions are done simultaneously over, respectively, the first and second frequency ranges 4-*wfr*-1, 4-*wfr*-2, such that a first client device 5-*cl*-1 receives the first MIMO transmission simultaneously with a second client device 5-*cl*-2 receiving the second MIMO transmission.

In one embodiment, the plurality of streams 1-*st*-1, 1-*st*-2, 1-*st*-3, 1-*st*-4, 1-*st*-5, 1-*st*-*n* comprises: (i) a first sub-set 1-*group*-1 of the plurality of streams associated with the first subset 2-*group*-1 of the plurality of signals and the first MIMO transmission, and (ii) a second subset 1-*group*-2 of the plurality of streams associated with the second subset 2-*group*-2 of the plurality of signals and the second MIMO transmission, and further comprising: scheduling, by a single scheduling component 1-SC of an access point 1-AP, the first and second MIMO transmissions to occur simultaneously during a certain transmission period, and producing by the access point 1-AP, according to said scheduling, the first MIMO transmission together with the second MIMO transmission in conjunction with the certain transmission period, by generating, respectively, the first sub-set 1-*group*-1 and second sub-set 1-*group*-2 of the plurality of streams in conjunction with the certain transmission period.

In one embodiment, the first sub-set 1-*group*-1 of the plurality of streams is generated so as to achieve said spatial multiplexing in conjunction with the first client device 5-*cl*-1 using a MU-MIMO technique, and the second sub-set 1-*group*-2 of the plurality of streams is generated so as to achieve said spatial multiplexing in conjunction with the second client device 5-*cl*-2 using the MU-MIMO technique.

In one embodiment, the access point 1-AP, the single MU-MIMO transmission, and the scheduling component 1-SC, are all associated with a space-division multiple access (SDMA) transmission scheme, in which the first and second MIMO transmissions are intended, by the access point, to happen via one single wireless frequency range, but in which the base converter 1-BC in conjunction with the first 3-*group*-1 and second 3-*group*-2 groups of mixers, together cause the first transmission to happen in a different wireless frequency range 4-*wfr*-1 than the wireless frequency range 4-*wfr*-2 of the second transmission, thereby enabling a better transmission performance in conjunction with the single MU-MINO transmission.

In one embodiment, as a result of said causing the first MIMO transmission to happen in a different wireless frequency range 4-*wfr*-1 than the wireless frequency range 4-*wfr*-2 of the second MIMO transmission, the SDMA transmission scheme is used without a sounding procedure, and thereby further enabling a better transmission performance in conjunction with the MU-MIMO transmission.

FIG. 14C illustrates one embodiment of method for generating simultaneously two multiple-input-multiple-output (MIMO) transmissions associated with a single service-set-identifier (SSID) but using two separate wireless frequency ranges. In step 1101, scheduling, by a single scheduling component 1-SC (FIG. 14) belonging to an access point 1-AP, at least a first MIMO transmission intended for a first client device 5-*cl*-1 and a second MIMO transmission intended to a second client device 5-*cl*-2, to occur simultaneously over a predetermined time period and in conjunction with a single SSID. In step 1102, generating, by the access point 1-AP (FIG. 14), based on said schedule, during the predetermined time period, a first set 1-*group*-1 of streams 1-*st*-1, 1-*st*-2, 1-*st*-3 associated with the first MIMO transmission and a second set 1-*group*-2 of streams 1-*st*-4, 1-*st*-5, 1-*st*-*n* associated with the second MIMO transmission, in which all of said streams 1-*st*-1, 1-*st*-2, 1-*st*-3, 1-*st*-4, 1-*st*-5, 1-*st*-*n* are associated with said single SSID. In step 1103, transmitting, by a first group 3-*group*-1 (FIG. 14) of mixers 3-*x*-1, 3-*x*-2, 3-*x*-3, via a first group of antennas 3-*ant*-1, 3-*ant*-2, 3-*ant*-3, at a first wireless frequency range 4-*wfr*-1 and during the predetermined time period, a first group 4-*group*-1 of output signals 4-*out*-1, 4-*out*-2, 4-*out*-3 associated respectively with the first set 1-*group*-1 of streams 1-*st*-1, 1-*st*-2, 1-*st*-3, thereby achieving the first MIMO transmission in conjunction with the first wireless frequency range 4-*wfr*-1 and said single SSID, and transmitting, by a second group 3-*group*-2 (FIG. 14) of mixers 3-*x*-4, 3-*x*-5, 3-*x*-n, via a second group of antennas 3-*ant*-4, 3-*ant*-5, 3-*ant*-n, at a second wireless frequency range 4-*wfr*-2 and during the predetermined time period, a second group 4-*group*-2 of output signals 4-*out*-4, 4-*out*-5, 4-*out*-n associated respectively with the second set 1-*group*-2 of streams 1-*st*-4, 1-*st*-5, 1-*st*-n, thereby achieving the second MIMO transmission in conjunction with the second wireless frequency range 4-*wfr*-2 and said single SSID.

Figure 15A:
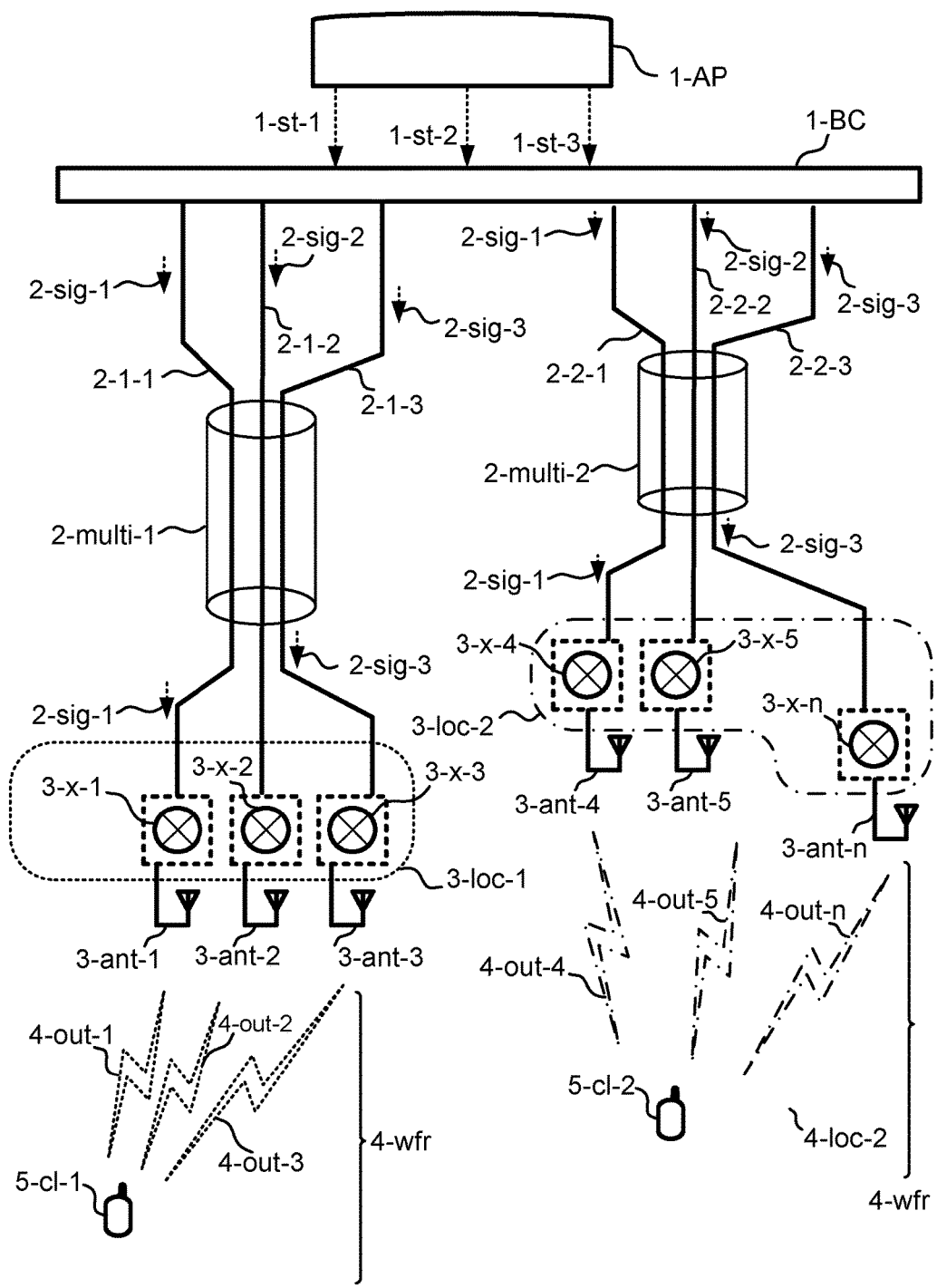
FIG. 15A illustrates one embodiment of a system operative to use spatial multiplexing in conjunction with a plurality of multi-conductor cables.
Figure 15B:
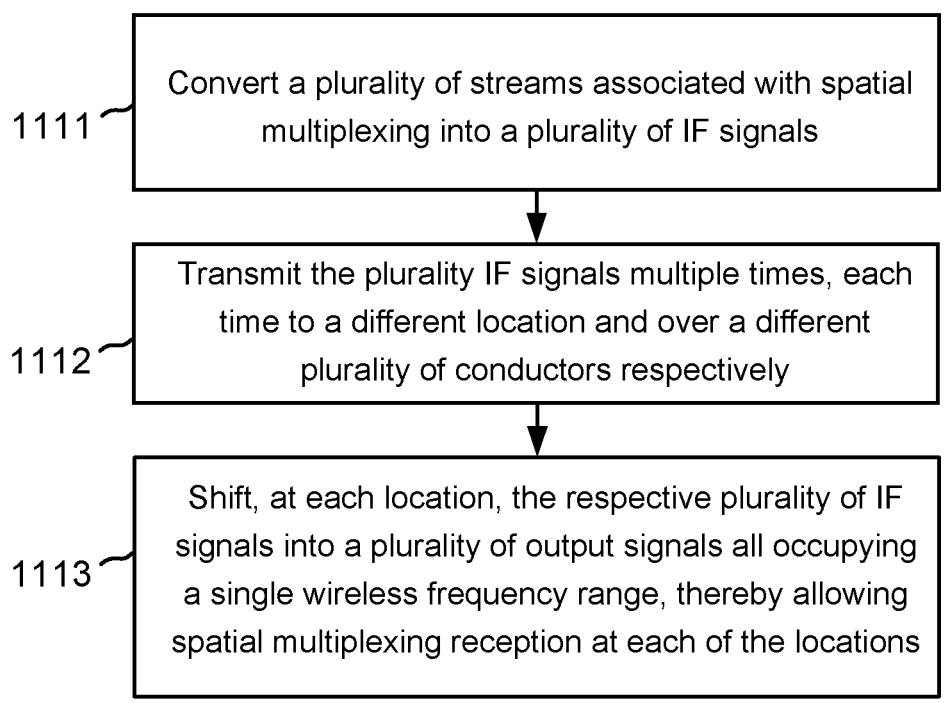
FIG. 15B illustrates one embodiment of a method for using spatial multiplexing in conjunction with a plurality of multi-conductor cables.

The following paragraphs are associated with FIGS. 15A and 15B.

FIG. 15A illustrates one embodiment of a system operative to use spatial multiplexing in conjunction with a plurality of multi-conductor cables. The system includes: an access point 1-AP operative to generate a plurality of streams 1-*st*-1, 1-*st*-2, 1-*st*-3 associated with spatial multiplexing, a base converter 1-BC operative to convert the plurality of streams 1-*st*-1, 1-*st*-2, 1-*st*-3 respectively into a plurality of intermediate frequency (IF) signals 2-*sig*-1, 2-*sig*-2, 2-*sig*-3, at least two multi-conductor cables 2-*multi*-1, 2-*multi*-2, in which each of the multi-conductor cables comprises a plurality of conductors (e.g., 2-*multi*-1 comprises of 2-1-1, 2-1-2, 2-1-3, and 2-*multi*-2 comprises of 2-2-1, 2-2-2, 2-2-3), and at least two pluralities of mixers (e.g., a first plurality 3-*x*-1, 3-*x*-2, 3-*x*-3 and a second plurality 3-*x*-4, 3-*x*-5, 3-*x*-n) associated respectively with the at least two multi-conductor cables 2-*multi*-1, 2-*multi*-2, in which each plurality of mixers is associated respectively with a plurality of antennas and is located at a specific location (e.g., 3-*x*-1, 3-*x*-2, 3-*x*-3 associated respectively with 3-*ant*-1, 3-*ant*-2, 3-*ant*-3 and located at 3-*loc*-1; and 3-*x*-4, 3-*x*-5, 3-*x*-n associated respectively with 3-*ant*-4, 3-*ant*-5, 3-*ant*-n and located at 3-*loc*-2).

In one embodiment, each of the multi-conductor cables is configured to transport the plurality of IF signals, via the respective plurality of conductors, to the respective plurality of mixers (e.g., 2-*multi*-1 transports 2-*sig*-1, 2-*sig*-2, 2-*sig*-3 respectively via 2-1-1, 2-1-2, 2-1-3 respectively to 3-*x*-1, 3-*x*-2, 3-*x*-3; and 2-*multi*-2 transports 2-*sig*-1, 2-*sig*-2, 2-*sig*-3 respectively via 2-2-1, 2-2-2, 2-2-3 respectively to 3-*x*-4, 3-*x*-5, 3-*x*-n), and each of the plurality of mixers is configure to shift the plurality of IF signals respectively into a plurality of output signals, and transmit the plurality of output signals via the respective plurality of antennas to a respective client device, in which the respective client device is operative to utilize said spatial multiplexing in conjunction with reception of the respective plurality of output signals (e.g., 3-*x*-1, 3-*x*-2, 3-*x*-3 respectively shift 2-*sig*-1, 2-*sig*-2, 2-*sig*-3 into respectively 4-*out*-1, 4-*out*-2, 4-*out*-3 that are transmitted respectively via 3-*ant*-1, 3-*ant*-2, 3-*ant*-3 to be utilized by client device 5-*cl*-1; and 3-*x*-4, 3-*x*-5, 3-*x*-n respectively shift 2-*sig*-1, 2-*sig*-2, 2-*sig*-3 into respectively 4-*out*-4, 4-*out*-5, 4-*out*-n that are transmitted respectively via 3-*ant*-4, 3-*ant*-5, 3-*ant*-n to be utilized by client device 5-*cl*-2).

In one embodiment, the plurality of streams 1-*st*-1, 1-*st*-2, 1-*st*-3 are input to the base converter 1-BC in a radio frequency form at frequency bands above 1.5 GHz, such as a 1.8 GHz band, a 1.9 GHz band, a 2.0 GHz band, a 2.3 GHz band, a 2.4 GHz band, a 2.5 GHz band, or a 5 GHz band, and said conversion of the plurality of streams 1-*st*-1, 1-*st*-2, 1-*st*-3 respectively into the plurality of IF signals 2-*sig*-1, 2-*sig*-2, 2-*sig*-3 is performed respectively by a plurality of mixers 1-*xs* in the base converter 1-BC operating as down-converters.

In one embodiment, the plurality of streams 1-*st*-1, 1-*st*-2, 1-*st*-3 are input to the base converter 1-BC in a digital form, and said conversion of the plurality of streams 1-*st*-1, 1-*st*-2, 1-*st*-3 respectively into the plurality of IF signals 2-*sig*-1, 2-*sig*-2, 2-*sig*-3 is a modulation process, such as OFDM modulation process.

In one embodiment, the plurality of streams 1-*st*-1, 1-*st*-2, 1-*st*-3 are input to the base converter 1-BC in a base-band form, and said conversion of the plurality of streams 1-*st*-1, 1-*st*-2, 1-*st*-3 respectively into the plurality of IF signals 2-*sig*-1, 2-*sig*-2, 2-*sig*-3 is performed respectively by a plurality of mixers 1-*xs* in the base converter 1-BC operating as up-converters.

FIG. 15B illustrates one embodiment of a method for using spatial multiplexing in conjunction with a plurality of multi-conductor cables. In step 1111, converting a plurality of streams 1-*st*-1, 1-*st*-2, 1-*st*-3 associated with spatial multiplexing into a plurality of intermediary frequency (IF) signals 2-*sig*-1, 2-*sig*-2, 2-*sig*-3. In step 1112, transmitting the plurality of IF signals 2-*sig*-1, 2-*sig*-2, 2-*sig*-3 at least twice: a first time 2-*sig*-1, 2-*sig*-2, 2-*sig*-3 respectively over a plurality of conductors 2-1-1, 2-1-2, 2-1-3 belonging to a first multi-conductor cable 2-*multi*-1 reaching a first location 3-*loc*-1, and a second time 2-*sig*-1, 2-*sig*-2, 2-*sig*-3 respectively over a plurality of conductors 2-2-1, 2-2-2, 2-2-3 belonging to a second multi-conductor cable 2-*multi*-2 reaching a second location 3-*loc*-2. In step 1113, shifting, at the first location 3-*loc*-1, the plurality of IF signals 2-*sig*-1, 2-*sig*-2, 2-*sig*-3 respectively into a first plurality of output signals 4-*out*-1, 4-*out*-2, 4-*out*-3 each occupying a single wireless frequency range 4-*wfr*, and transmitting the first plurality of output signals 4-*out*-1, 4-*out*-2, 4-*out*-3 respectively over a first plurality of antennas 3-*ant*-1, 3-*ant*-2, 3-*ant*-3, thereby allowing a first client device 5-*cl*-1 associated with the first location to utilize said spatial multiplexing in conjunction with the first plurality of output signals 4-*out*-1, 4-*out*-2, 4-*out*-3, and shifting, at the second location 3-*loc*-2, the plurality of IF signals 2-*sig*-1, 2-*sig*-2, 2-*sig*-3 respectively into a second plurality of output signals 4-*out*-4, 4-*out*-5, 4-*out*-n each occupying the single wireless frequency range 4-*wfr*, and transmitting the second plurality of output signals 4-*out*-4, 4-*out*-5, 4-*out*-n respectively over a second plurality of antennas 3-*ant*-4, 3-*ant*-5, 3-*ant*-n, thereby allowing a second client device 5-*cl*-2 associated with the second location to utilize said spatial multiplexing in conjunction with the second plurality of output signals 4-*out*-4, 4-*out*-5, 4-*out*-n.

In one embodiment, the first and second multi-conductor cables 2-*multi*-1, 2-*multi*-2 are multi-paired cables.

In one embodiment, the multi-paired cables 2-*multi*-1, 2-*multi*-2 are category 5 cables (CAT5).

In one embodiment, the plurality of streams 1-*st*-1, 1-*st*-2, 1-*st*-3 are formed together from a plurality of independent data streams 1-*ds*-1, 1-*ds*-2 as part of a conversion process associated with the spatial multiplexing, in which said utilization by the first client device 5-*cl*-1 comprises the first client device decoding the plurality of independent data streams 1-*ds*-1, 1-*ds*-2 from the first plurality of output signals 4-*out*-1, 4-*out*-2, 4-*out*-3 associated with the plurality of streams 1-*st*-1, 1-*st*-2, 1-*st*-3.

In one embodiment, said utilization by the second client device 5-*cl*-2 comprises the second client device decoding the plurality of independent data streams 1-*ds*-1, 1-*ds*-2 from the second plurality of output signals 4-*out*-4, 4-*out*-5, 4-*out*-n associated with the plurality of streams 1-*st*-1, 1-*st*-2, 1-*st*-3.

In one embodiment, said formation of the plurality of streams 1-*st*-1, 1-*st*-2, 1-*st*-3 comprises generating each of the streams from a linear combination of at least two of the independent data streams 1-*ds*-1, 1-*ds*-2, in accordance with said spatial multiplexing.

In one embodiment, the plurality of streams 1-*st*-1, 1-*st*-2, 1-*st*-3 are generated by an access point 1-AP.

In one embodiment, the access point 1-AP is a wifi access point supporting at least partly a standard associated with IEEE 802.11, such as IEEE 802.11n or IEEE 802.11ac, in which the spatial multiplexing in conjunction with plurality of streams 1-*st*-1, 1-*st*-2, 1-*st*-3 is part of the standard.

In one embodiment, each of the plurality of IF signals has a bandwidth that is either 20 MHz, 40 MHz, 80 MHz, or 160 MHz.

In one embodiment, each of the plurality of IF signals has a center frequency located below 1 GHz.

In one embodiment, the single wireless frequency range is located in either a 2.4 GHz band or a 5 GHz band.

In one embodiment, the access point 1-AP is a LTE access point or a LTE base-station supporting at least partly a standard associated with LTE, in which the spatial multiplexing in conjunction with plurality of streams 1-*st*-1, 1-*st*-2, 1-*st*-3 is part of the standard.

In one embodiment, the first location 3-*loc*-1 is associated with a first room.

In one embodiment, the second location 3-*loc*-2 is associated with a second room.

In one embodiment, the first client device 5-*cl*-1 is located in the first room and the second client device 5-*cl*-2 is located in the second room, in which the first client device 5-*cl*-1 is unable to utilize the second plurality of output signals 4-*out*-4, 4-*out*-5, 4-*out*-*n* being too weak to be decoded in the first room, and the second client 5-*cl*-2 device is unable to utilize the first plurality of output signals 4-*out*-1, 4-*out*-2, 4-*out*-3 being too weak to be decoded in the second room.

Figure 16A:
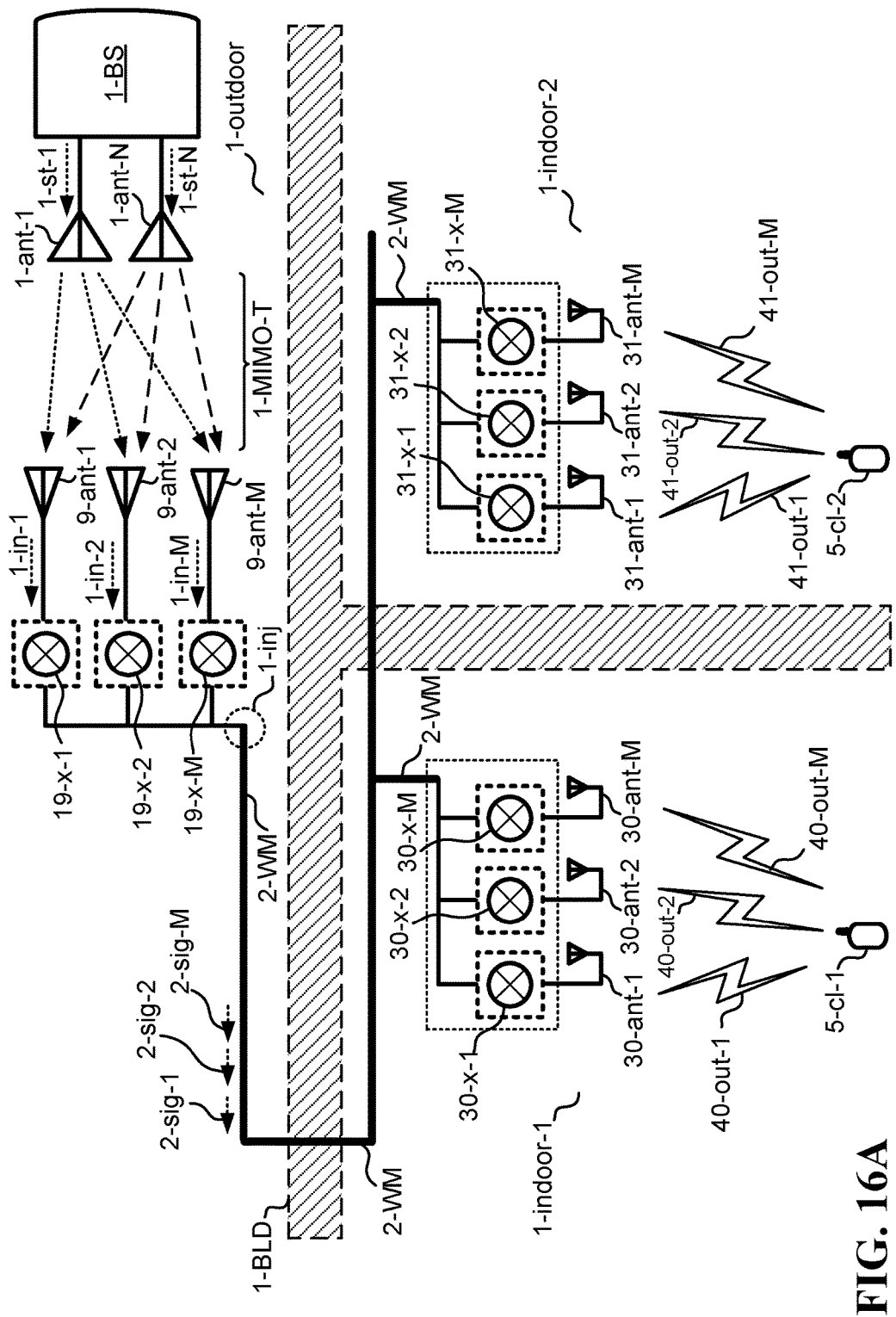
FIG. 16A illustrates one embodiment of a system operative to duplicated indoor several times a plurality of streams associated with spatial multiplexing and obtained outdoor.
Figure 16B:
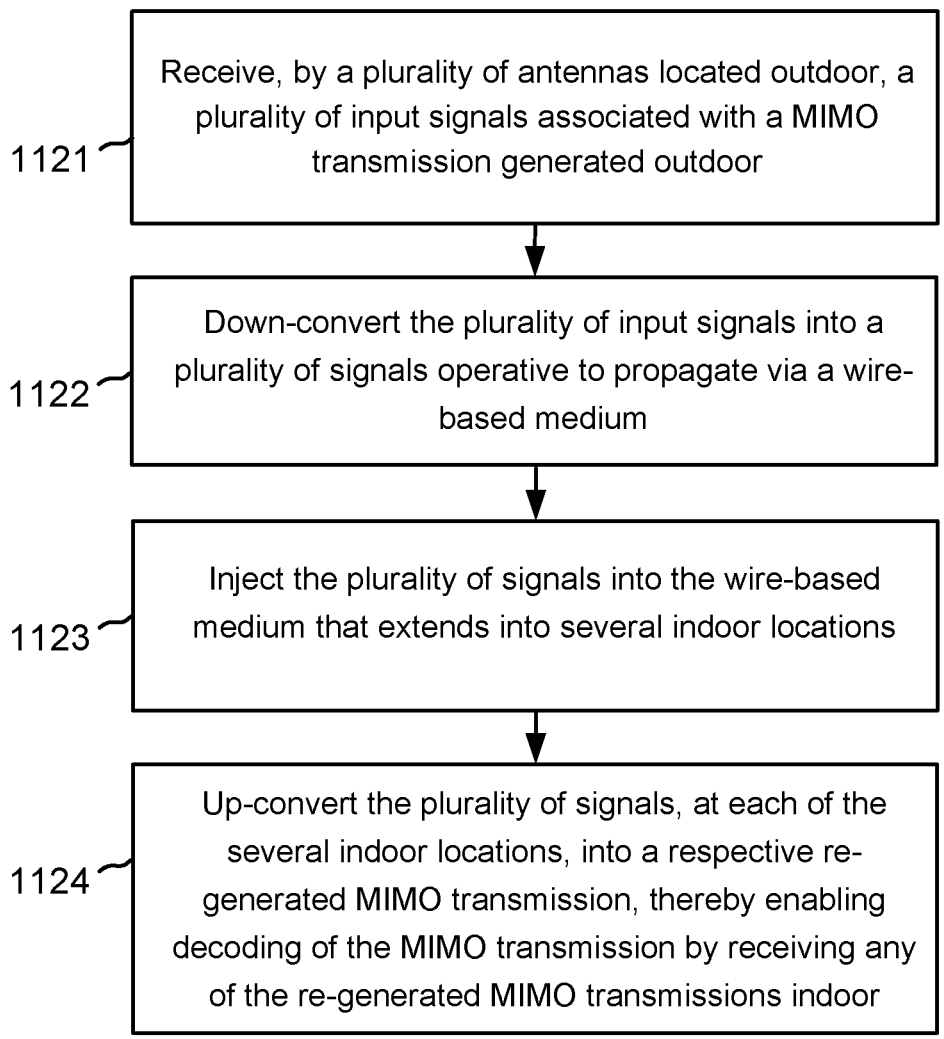
FIG. 16B illustrates one embodiment of a method for propagating multiple-input-multiple-output (MIMO) signals from an outdoor environment to an indoor environment.

The following paragraphs are associated with FIGS. 16A and 16B.

FIG. 16A illustrates one embodiment of a system operative to duplicated indoor, several times, a plurality of streams associated with spatial multiplexing, in which the plurality of streams are obtained outdoor. The system includes: at least N outdoor converters 19-*x*-1, 19-*x*-2, 19-*x*-M (e.g., 3 converters are illustrated, in which N=2) associated respectively with at least N outdoor antennas 9-*ant*-1, 9-*ant*-2, 9-*ant*-M, in which the outdoor converters and the associated outdoor antennas are located outside 1-*outdoor* a building 1-BLD. The system further includes several pluralities of at least N indoor converters in each plurality, in which each of the pluralities of indoor converters is located in a different room 1-*indoor*-1, 1-*indoor*-2 inside the building 1-BLD and is associated respectively with a plurality of indoor antennas (e.g., plurality 30-*x*-1, 30-*x*-2, 30-*x*-M located in room 1-*indoor*-1 and associated with plurality 30-*ant*-1, 30-*ant*-2, 30-*ant*-M respectively, and plurality 31-*x*-1, 31-*x*-2, 31-*x*-M located in room 1-*indoor*-2 and associated with plurality 31-*ant*-1, 31-*ant*-2, 31-*ant*-M respectively). The system further comprises a wire-based medium 2-WM extending from outside 1-*outdoor* the building 1-BLD and into each of the different rooms indoor-1, 1-*indoor*-2 inside the building, in which the outdoor converters and the several pluralities of indoor converters are all connected electronically to the wire-based medium 2-WM.

In one embodiment, the at least N outdoor antennas 9-*ant*-1, 9-*ant*-2, 9-*ant*-M are configured to receive respectively at least N input signals 1-*in*-1, 1-*in*-2, 1-*in*-M induced by a transmission of a wireless frame, in which the wireless frame is a multiple-input-multiple-output (MIMO) transmission 1-MIMO-T generated by an outdoor base-station 1-BS using exactly N streams 1-*st*-1, 1-*st*-N (e.g., N=2) associated with spatial multiplexing, and in which the MIMO transmission 1-MIMO-T, together with the associated input signals received 1-*in*-1, 1-*in*-2, 1-*in*-M, all occupy a single first wireless frequency range.

In one embodiment, the at least N outdoor converters 19-*x*-1, 19-*x*-2, 19-*x*-M are configured to convert respectively the at least N input signals 1-*in*-1, 1-*in*-2, 1-*in*-M into a representation thereof 2-*sig*-1, 2-*sig*-2, 2-*sig*-M that is communicable over the wire-based medium 2-WM.

In one embodiment, the system is configured to communicate the representation 2-*sig*-1, 2-*sig*-2, 2-*sig*-M of the input signals 1-*in*-1, 1-*in*-2, 1-*in*-M over the wire-based medium 2-WM to each of the pluralities of indoor converters (e.g., to plurality 30-*x*-1, 30-*x*-2, 30-*x*-M, and to plurality 31-*x*-1, 31-*x*-2, 31-*x*-M), and each of the pluralities of indoor converters is configured to receive via the wire-based medium said representation (e.g., 30-*x*-1, 30-*x*-2, 30-*x*-M receives 2-*sig*-1, 2-*sig*-2, 2-*sig*-M respectively, and 31-*x*-1, 31-*x*-2, 31-*x*-M receives 2-*sig*-1, 2-*sig*-2, 2-*sig*-M respectively), and to re-generate, in the respective room 1-*indoor*-1, 1-*indoor*-2, from said representation 2-*sig*-1, 2-*sig*-2, 2-*sig*-M, a copy of the at least N input signals 1-*in*-1, 1-*in*-2, 1-*in*-M, thereby re-generating several copies of the at least N input signals in a form of several copies of at least N output signals respectively (e.g., a first copy in a form of output signals 40-*out*-1, 40-*out*-2, 40-*out*-M, and a second copy in a form of output signals 41-*out*-1, 41-*out*-2, 41-*out*-M), in which each copy of the at least N output signals is transmitted in the respective room 1-*indoor*-1, 1-*indoor*-2 via the respective indoor antennas (e.g., 40-*out*-1, 40-*out*-2, 40-*out*-M via 30-*ant*-1, 30-*ant*-2, 30-*ant*-M respectively, and 41-*out*-1, 41-*out*-2, 41-*out*-M via 31-*ant*-1, 31-*ant*-2, 31-*ant*-M respectively) using a single second wireless frequency range, thereby enabling decoding of the wireless frame in conjunction with the exactly N streams 1-*st*-1, 1-*st*-N by a MIMO-enabled client device 5-*cl*-1, 5-*cl*-2 located in any of the rooms 1-*indoor*-1, 1-*indoor*-2 and having wireless access to at least one of said copies of the output signals.

In one embodiment, all of the outdoor converters 19-*x*-1, 19-*x*-2, 19-*x*-M are outdoor mixers, all of the indoor converters 30-*x*-1, 30-*x*-2, 30-*x*-M, 31-*x*-1, 31-*x*-2, 31-*x*-M are indoor mixers, and said conversion is a frequency down-conversion, in which the representation 2-*sig*-1, 2-*sig*-2, 2-*sig*-M are signals having a lower frequency than the single first wireless frequency, and said re-generation is a frequency up-conversion.

In one embodiment, all of the outdoor converters 19-*x*-1, 19-*x*-2, 19-*x*-M are analog-to-digital converters, all of the indoor converters 30-*x*-1, 30-*x*-2, 30-*x*-M, 31-*x*-1, 31-*x*-2, 31-*x*-M are digital-to-analog converters, and said conversion is a signal sampling, in which the representation 2-*sig*-1, 2-*sig*-2, 2-*sig*-M are digital samples, and said re-generation is a signal reconstruction.

FIG. 16B illustrates one embodiment of a method for propagating multiple-input-multiple-output (MIMO) signals from an outdoor environment to an indoor environment. In step 1121, receiving, by a plurality of outdoor antennas 9-*ant*-1, 9-*ant*-2, 9-*ant*-M located outdoor 1-*outdoor*, respectively, a plurality of input signals 1-*in*-1, 1-*in*-2, 1-*in*-M induced by a transmission of a wireless frame, in which the wireless frame is a multiple-input-multiple-output (MIMO) transmission 1-MIMO-T generated by an outdoor base-station 1-BS using a plurality of streams 1-*st*-1, 1-*st*-N associated with spatial multiplexing, and in which the MIMO transmission 1-MIMO-T, together with the associated plurality of input signals received 1-*in*-1, 1-*in*-2, 1-*in*-M, all occupy a single first wireless frequency range. In step 1122, down-converting, using a plurality of outdoor converters 19-*x*-1, 19-*x*-2, 19-*x*-M associated respectively with the plurality of outdoor antennas 9-*ant*-1, 9-*ant*-2, 9-*ant*-M, the plurality of input signals 1-*in*-1, 1-*in*-2, 1-*in*-M respectively into a plurality of signals 2-*sig*-1, 2-*sig*-2, 2-*sig*-M occupying a plurality of different frequency ranges, in which each of the different frequency ranges is lower in frequency than the single wireless frequency range. In step 1123, injecting, by the plurality of outdoor converters 19-*x*-1, 19-*x*-2, 19-*x*-M, at an outdoor injection point 1-*inj*, respectively, the plurality of signals 2-*sig*-1, 2-*sig*-2, 2-*sig*-M into a wire-based medium 2-WM extending from the outdoor injection point 1-*inj* into several indoor locations 1-*indoor*-1, 1-*indoor*-2, thereby resulting in a propagation of the plurality of signals 2-*sig*-1, 2-*sig*-2, 2-*sig*-M from the outdoor injection point 1-*inj* into each of said several indoor locations 1-*indoor*-1, 1-*indoor*-2. In step 1124, up-converting, at each of the several indoor locations 1-*indoor*-1, 1-*indoor*-2, the plurality of signals 2-*sig*-1, 2-*sig*-2, 2-*sig*-M respectively into a plurality of output signals (e.g., respectively into 40-*out*-1, 40-*out*-2, 40-*out*-M at indoor location 1-*indoor*-1, and respectively into 41-*out*-1, 41-*out*-2, 41-*out*-M at indoor location 1-*indoor*-2), in which each of the up-conversions is done using a different plurality of indoor converters located at one of the several indoor locations and connected electronically to the wire-based medium (e.g., the up-conversion into 40-*out*-1, 40-*out*-2, 40-*out*-M is done respectively by 30-*x*-1, 30-*x*-2, 30-*x*-M, and the up-conversion into 41-*out*-1, 41-*out*-2, 41-*out*-M is done respectively by 31-*x*-1, 31-*x*-2, 31-*x*-M), so as to wirelessly generate, respectively via several pluralities of indoor antennas (e.g., plurality 30-*ant*-1, 30-*ant*-2, 30-*ant*-M, and plurality 31-*ant*-1, 31-*ant*-2, 31-*ant*-M), several pluralities of the output signals (e.g., plurality 40-*out*-1, 40-*out*-2, 40-*out*-M, and plurality 41-*out*-1, 41-*out*-2, 41-*out*-M) respectively at the several indoor locations 1-*indoor*-1, 1-*indoor*-2, in which the several pluralities of output signals all occupy a single second wireless frequency range, thereby re-generating the MIMO transmission 1-MIMO-T several times at the several indoor locations 1-*indoor*-1, 1-*indoor*-2 respectively, and enabling decoding of the wireless frame by a MIMO-enabled client device 5-*cl*-1, 5-*cl*-2 having access to any one of the several pluralities of output signals.

In one embodiment, the plurality of streams 1-*st*-1, 1-*st*-N include exactly N streams (e.g., N=2 is illustrated as a non-limiting example) as set by the outdoor base station 1-BS, the plurality of outdoor converters 19-*x*-1, 19-*x*-2, 19-*x*-M comprises at least N converters (e.g., 3 converters are illustrated as a non-limiting example, but since N=2 in this example, there must me a minimum of two converters, but there could also be any number of converters above two), the plurality of signals 2-*sig*-1, 2-*sig*-2, 2-*sig*-M comprises at least N signals (e.g., 3 signals are illustrated as a non-limiting example, but since N=2 in this example, there must me a minimum of two signals, but there could also be any number of signals above two), each of the several pluralities of indoor converters (e.g., plurality 30-*x*-1, 30-*x*-2, 30-*x*-M, and plurality 31-*x*-1, 31-*x*-2, 31-*x*-M) comprises at least N converters, and each of the several pluralities of output signals (e.g., plurality 40-*out*-1, 40-*out*-2, 40-*out*-M, and plurality 41-*out*-1, 41-*out*-2, 41-*out*-M) comprises at least N output signals, thereby facilitating said decoding of the wireless frame that was constructed using the N streams 1-*st*-1, 1-*st*-N.

In one embodiment, the plurality of outdoor antennas 9-*ant*-1, 9-*ant*-2, 9-*ant*-M and outdoor converters 19-*x*-1, 19-*x*-2, 19-*x*-M are located on a roof of a building 1-BLD, and each of the several pluralities of indoor converters is located in a different room 1-*indoor*-1, 1-*indoor*-2 in the building (e.g., plurality 30-*x*-1, 30-*x*-2, 30-*x*-M located in room 1-*indoor*-1, and plurality 31-*x*-1, 31-*x*-2, 31-*x*-M located in room 1-*indoor*-2), so as to enable decoding of the wireless frame by a MIMO-enabled client device 5-*cl*-1, 5-*cl*-2 located in any of the rooms 1-*indoor*-1, 1-*indoor*-2.

In one embodiment, the wire-based medium 2-WM is a coaxial cable.

In one embodiment, the coaxial cable is a cable used to facilitate reception of direct-broadcast satellite television, and the plurality of outdoor converters 19-*x*-1, 19-*x*-2, 19-*x*-M and outdoor antennas 9-*ant*-1, 9-*ant*-2, 9-*ant*-M are co-located with a satellite dish on a roof.

In one embodiment, the wireless frame is associated with 4G (fourth-generation) long-term evolution (LTE) wireless standard.

In one embodiment, the wireless frame is associated with 5G (fifth-generation) wireless standard.

In one embodiment, the single first wireless frequency range is a frequency range located in a frequency band selected from a group of bands consisting of: (i) 3.4-3.6 GHz, (ii) 4.5-6 GHz, (iii) 27.5-29.5 GHz, and (iv) 60-70 GHz.

In one embodiment, the single second wireless frequency range is a frequency range located in a frequency band selected from a group of bands consisting of: (i) 3.4-3.6 GHz, (ii) 4.5-6 GHz, (iii) 27.5-29.5 GHz, and (iv) 60-70 GHz.

In one embodiment, each of the different frequency ranges of the signals are contained below 1.5 GHz, and therefore propagate successfully over the wire-based medium.

Figure 17A:
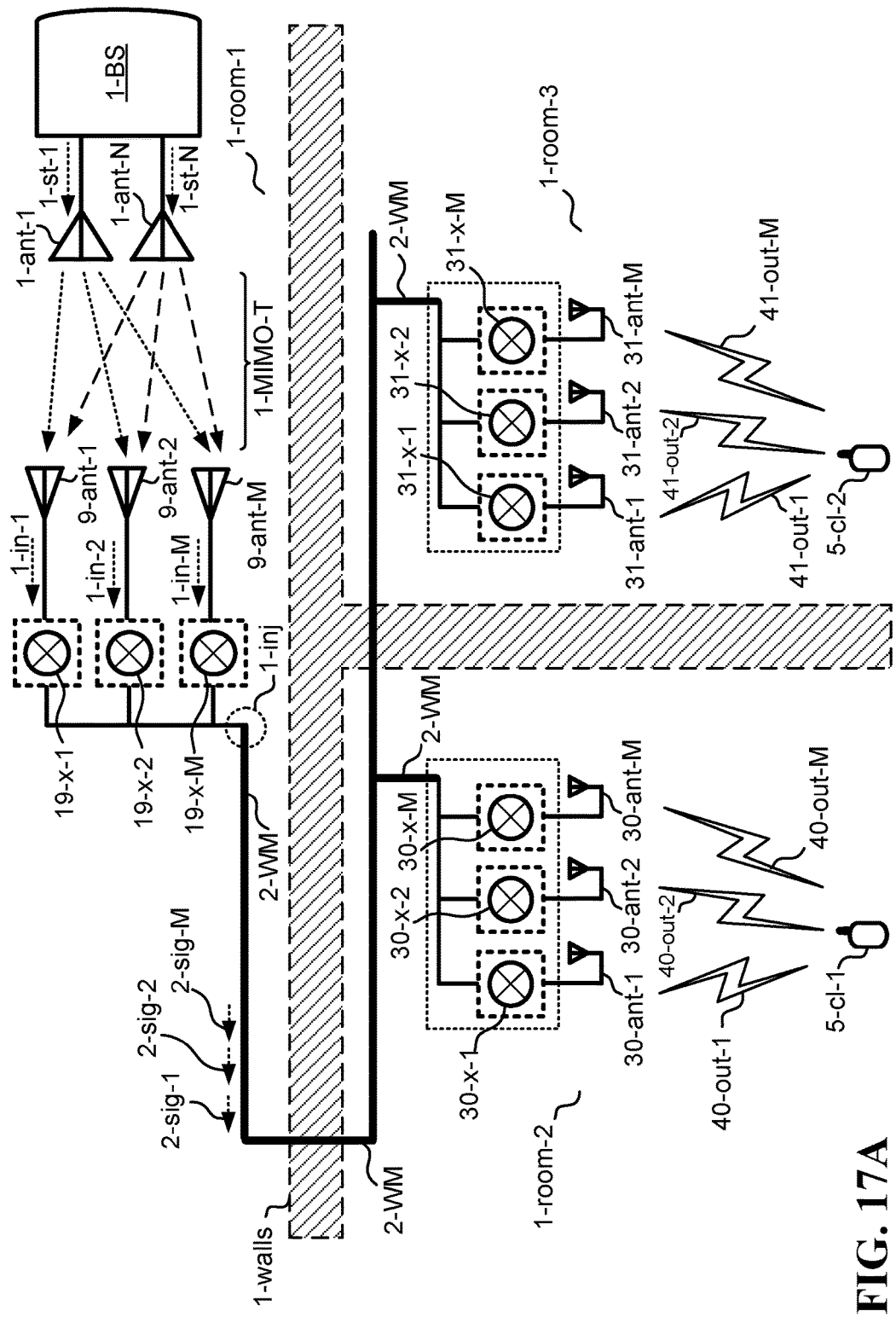
FIG. 17A illustrates one embodiment of a system operative to duplicated indoor several times a plurality of streams associated with spatial multiplexing and obtained in a specific room.
Figure 17B:
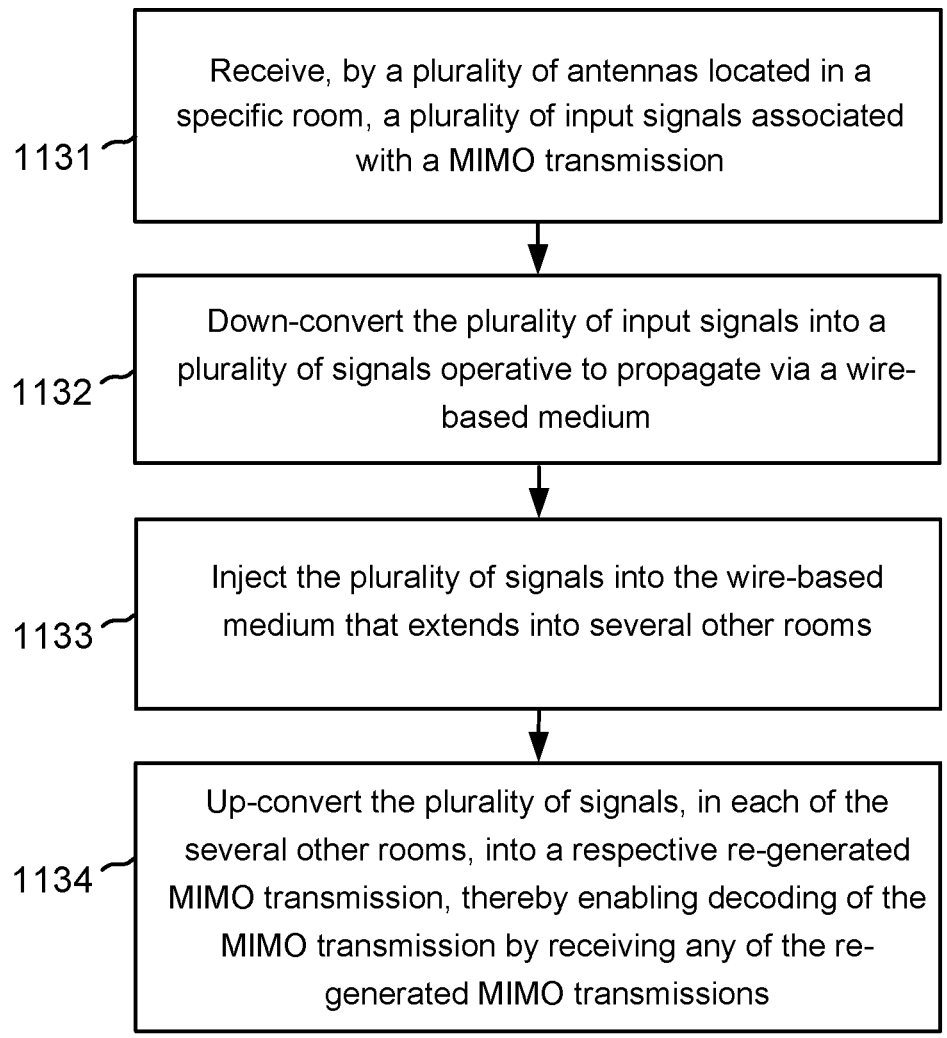
FIG. 17B illustrates one embodiment of a method for propagating multiple-input-multiple-output (MIMO) signals between rooms.

The following paragraphs are associated with FIGS. 17A and 17B.

FIG. 17A illustrates one embodiment of a system operative to duplicated indoor several times a plurality of streams associated with spatial multiplexing and obtained in a specific room. The system includes at least N receiving converters 19-*x*-1, 19-*x*-2, 19-*x*-M (e.g., 3 converters are illustrated, in which N=2) associated respectively with at least N receiving antennas 9-*ant*-1, 9-*ant*-2, 9-*ant*-M, in which the receiving converters and the associated receiving antennas are located in a specific room 1-*room*-1. The system further includes several pluralities of at least N indoor converters in each plurality, in which each of the pluralities of indoor converters is located in a different room 1-*room*-2, 1-*room*-3 and is associated respectively with a plurality of indoor antennas (e.g., plurality 30-*x*-1, 30-*x*-2, 30-*x*-M located in room 1-*room*-2 and associated with plurality 30-*ant*-1, 30-*ant*-2, 30-*ant*-M respectively, and plurality 31-*x*-1, 31-*x*-2, 31-*x*-M located in room 1-*room*-3 and associated with plurality 31-*ant*-1, 31-*ant*-2, 31-*ant*-M respectively). The system further includes a wire-based medium 2-WM extending from the first room 1-*room*-1 and into each of the different rooms 1-*room*-2, 1-*room*-3, in which the receiving converters and the several pluralities of indoor converters are all connected electronically to the wire-based medium 2-WM.

In one embodiment, the at least N receiving antennas 9-*ant*-1, 9-*ant*-2, 9-*ant*-M are configured to receive respectively at least N input signals 1-*in*-1, 1-*in*-2, 1-*in*-M induced by a transmission of a wireless frame, in which the wireless frame is a multiple-input-multiple-output (MIMO) transmission 1-MIMO-T generated by a base-station 1-BS using exactly N streams 1-*st*-1, 1-*st*-N (e.g., N=2) associated with spatial multiplexing, and in which the MIMO transmission 1-MIMO-T, together with the associated input signals received 1-*in*-1, 1-*in*-2, 1-*in*-M, all occupy a single first wireless frequency range. The at least N receiving converters 19-*x*-1, 19-*x*-2, 19-*x*-M are configured to convert respectively the at least N input signals 1-*in*-1, 1-*in*-2, 1-*in*-M into a representation thereof 2-*sig*-1, 2-*sig*-2, 2-*sig*-M that is communicable over the wire-based medium 2-WM. The system is configured to communicate the representation 2-*sig*-1, 2-*sig*-2, 2-*sig*-M of the input signals 1-*in*-1, 1-*in*-2, 1-*in*-M over the wire-based medium 2-WM to each of the pluralities of indoor converters (e.g., to plurality 30-*x*-1, 30-*x*-2, 30-*x*-M, and to plurality 31-*x*-1, 31-*x*-2, 31-*x*-M). Each of the pluralities of indoor converters is configured to receive via the wire-based medium said representation (e.g., 30-*x*-1, 30-*x*-2, 30-*x*-M receives 2-*sig*-1, 2-*sig*-2, 2-*sig*-M respectively, and 31-*x*-1, 31-*x*-2, 31-*x*-M receives 2-*sig*-1, 2-*sig*-2, 2-*sig*-M respectively), and to re-generate, in the respective room 1-*room*-2, 1-*room*-3, from said representation 2-*sig*-1, 2-*sig*-2, 2-*sig*-M, a copy of the at least N input signals 1-*in*-1, 1-*in*-2, 1-*in*-M, thereby re-generating several copies of the at least N input signals in a form of several copies of at least N output signals respectively (e.g., a first copy in a form of output signals 40-*out*-1, 40-*out*-2, 40-*out*-M, and a second copy in a form of output signals 41-*out*-1, 41-*out*-2, 41-*out*-M), in which each copy of the at least N output signals is transmitted in the respective room 1-*room*-2, 1-*room*-3 via the respective indoor antennas (e.g., 40-*out*-1, 40-*out*-2, 40-*out*-M via 30-*ant*-1, 30-*ant*-2, 30-*ant*-M respectively, and 41-*out*-1, 41-*out*-2, 41-*out*-M via 31-*ant*-1, 31-*ant*-2, 31-*ant*-M respectively) using a single second wireless frequency range, thereby enabling decoding of the wireless frame in conjunction with the exactly N streams 1-*st*-1, 1-*st*-N by a MIMO-enabled client device 5-*cl*-1, 5-*cl*-2 located in any of the rooms 1-*room*-2, 1-*room*-3 and having wireless access to at least one of said copies of the output signals.

In one embodiment, all of the receiving converters 19-*x*-1, 19-*x*-2, 19-*x*-M are receiving mixers, all of the indoor converters 30-*x*-1, 30-*x*-2, 30-*x*-M, 31-*x*-1, 31-*x*-2, 31-*x*-M are indoor mixers, said conversion is a frequency down-conversion, in which the representation 2-*sig*-1, 2-*sig*-2, 2-*sig*-M are signals having a lower frequency than the single first wireless frequency, and said re-generation is a frequency up-conversion.

In one embodiment, all of the receiving converters 19-*x*-1, 19-*x*-2, 19-*x*-M are analog-to-digital converters, all of the indoor converters 30-*x*-1, 30-*x*-2, 30-*x*-M, 31-*x*-1, 31-*x*-2, 31-*x*-M are digital-to-analog converters, said conversion is a signal sampling, in which the representation 2-*sig*-1, 2-*sig*-2, 2-*sig*-M are digital samples, and said re-generation is a signal reconstruction.

In one embodiment, the base station 1-BS is located in the specific room 1-*room*-1.

In one embodiment, the base station 1-BS is located outdoor.

FIG. 17B illustrates one embodiment of a method for propagating multiple-input-multiple-output (MIMO) signals between rooms. In step 1131, receiving, by a plurality of receiving antennas 9-*ant*-1, 9-*ant*-2, 9-*ant*-M located in a specific room 1-*room*-1, respectively, a plurality of input signals 1-*in*-1, 1-*in*-2, 1-*in*-M induced by a transmission of a wireless frame, in which the wireless frame is a multiple-input-multiple-output (MIMO) transmission 1-MIMO-T generated by a base-station 1-BS using a plurality of streams 1-*st*-1, 1-*st*-N associated with spatial multiplexing, and in which the MIMO transmission 1-MIMO-T, together with the associated plurality of input signals received 1-*in*-1, 1-*in*-2, 1-*in*-M, all occupy a single first wireless frequency range. In step 1132, down-converting, using a plurality of receiving converters 19-*x*-1, 19-*x*-2, 19-*x*-M associated respectively with the plurality of receiving antennas 9-*ant*-1, 9-*ant*-2, 9-*ant*-M, the plurality of input signals 1-*in*-1, 1-*in*-2, 1-*in*-M respectively into a plurality of signals 2-*sig*-1, 2-*sig*-2, 2-*sig*-M occupying a plurality of different frequency ranges, in which each of the different frequency ranges is lower in frequency than the single wireless frequency range. In step 1133, injecting, by the plurality of receiving converters 19-*x*-1, 19-*x*-2, 19-*x*-M, at an injection point 1-*inj* located in the first room 1-*room*-1, respectively, the plurality of signals 2-*sig*-1, 2-*sig*-2, 2-*sig*-M into a wire-based medium 2-WM extending from the injection point 1-*inj* into several different rooms 1-*room*-2, 1-*room*-3, thereby resulting in a propagation of the plurality of signals 2-*sig*-1, 2-*sig*-2, 2-*sig*-M from the injection point 1-*inj* into each of said several different rooms 1-*room*-2, 1-*room*-3. In step 1134, up-converting, in each of the several different rooms 1-*room*-2, 1-*room*-3, the plurality of signals 2-*sig*-1, 2-*sig*-2, 2-*sig*-M respectively into a plurality of output signals (e.g., respectively into 40-*out*-1, 40-*out*-2, 40-*out*-M in room 1-*room*-2, and respectively into 41-*out*-1, 41-*out*-2, 41-*out*-M in room 1-*room*-3), in which each of the up-conversions is done using a different plurality of indoor converters located in one of the several different rooms and connected electronically to the wire-based medium (e.g., the up-conversion into 40-*out*-1, 40-*out*-2, 40-*out*-M is done respectively by 30-*x*-1, 30-*x*-2, 30-*x*-M, and the up-conversion into 41-*out*-1, 41-*out*-2, 41-*out*-M is done respectively by 31-*x*-1, 31-*x*-2, 31-*x*-M), so as to wirelessly generate, respectively via several pluralities of indoor antennas (e.g., plurality 30-*ant*-1, 30-*ant*-2, 30-*ant*-M, and plurality 31-*ant*-1, 31-*ant*-2, 31-*ant*-M), several pluralities of the output signals (e.g., plurality 40-*out*-1, 40-*out*-2, 40-*out*-M, and plurality 41-*out*-1, 41-*out*-2, 41-*out*-M) respectively in the several different rooms 1-*room*-2, 1-*room*-3, in which the several pluralities of output signals all occupy a single second wireless frequency range, thereby re-generating the MIMO transmission 1-MIMO-T several times in the several different rooms 1-*room*-2, 1-*room*-3 respectively, and enabling decoding of the wireless frame by a MIMO-enabled client device 5-*cl*-1, 5-*cl*-2 having access to any one of the several pluralities of output signals.

In one embodiment, the plurality of streams 1-*st*-1, 1-*st*-N include exactly N streams (e.g., N=2 is illustrated as a non-limiting example) as set by the base station 1-BS. The plurality of receiving converters 19-*x*-1, 19-*x*-2, 19-*x*-M comprises at least N converters (e.g., 3 converters are illustrated as a non-limiting example, but since N=2 in this example, there must me a minimum of two converters, but there could also be any number of converters above two). The plurality of signals 2-*sig*-1, 2-*sig*-2, 2-*sig*-M comprises at least N signals (e.g., 3 signals are illustrated as a non-limiting example, but since N=2 in this example, there must me a minimum of two signals, but there could also be any number of signals above two). Each of the several pluralities of indoor converters (e.g., plurality 30-*x*-1, 30-*x*-2, 30-*x*-M, and plurality 31-*x*-1, 31-*x*-2, 31-*x*-M) comprises at least N converters, and each of the several pluralities of output signals (e.g., plurality 40-*out*-1, 40-*out*-2, 40-*out*-M, and plurality 41-*out*-1, 41-*out*-2, 41-*out*-M) comprises at least N output signals, thereby facilitating said decoding of the wireless frame that was constructed using the N streams 1-*st*-1, 1-*st*-N.

In one embodiment, the wire-based medium 2-WM is a coaxial cable.

In one embodiment, the coaxial cable is a cable used to facilitate reception of direct-broadcast satellite television.

In one embodiment, the wireless frame is associated with 4G (fourth-generation) long-term evolution (LTE) wireless standard.

In one embodiment, the wireless frame is associated with 5G (fifth-generation) wireless standard.

In one embodiment, the single first wireless frequency range is a frequency range located in a frequency band selected from a group of bands consisting of: (i) 3.4-3.6 GHz, (ii) 4.5-6 GHz, (iii) 27.5-29.5 GHz, and (iv) 60-70 GHz.

In one embodiment, the single second wireless frequency range is a frequency range located in a frequency band selected from a group of bands consisting of: (i) 3.4-3.6 GHz, (ii) 4.5-6 GHz, (iii) 27.5-29.5 GHz, and (iv) 60-70 GHz.

In one embodiment, each of the different frequency ranges of the signals are contained below 1.5 GHz, and therefore propagate successfully over the wire-based medium.

In one embodiment, the base station 1-BS is located in the specific room 1-*room*-1, and the base station is a pico base station operative to provide wireless service indoor.

Figure 18A:
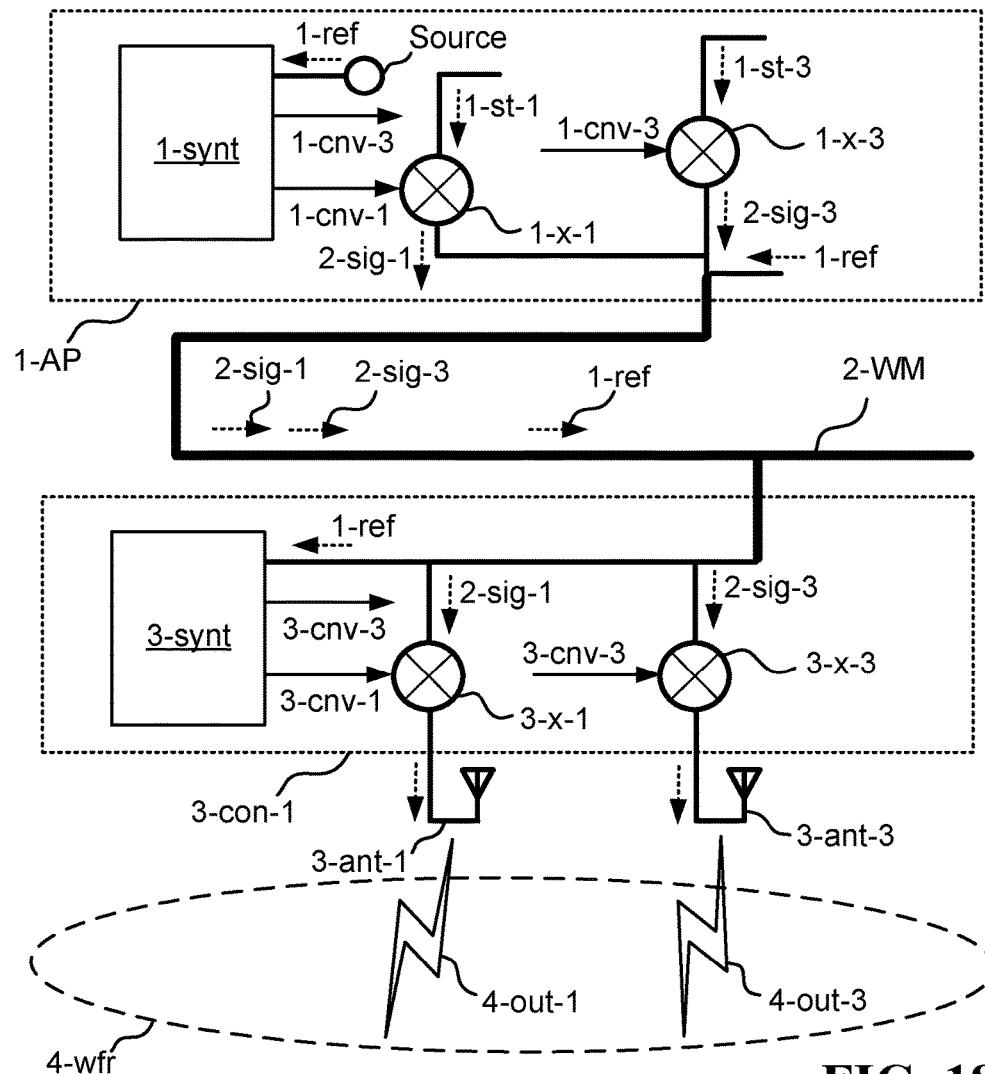
FIG. 18A illustrates one embodiment of a system operative to replicate an exact frequency match among a plurality of signals associated with spatial multiplexing.
Figure 18B:
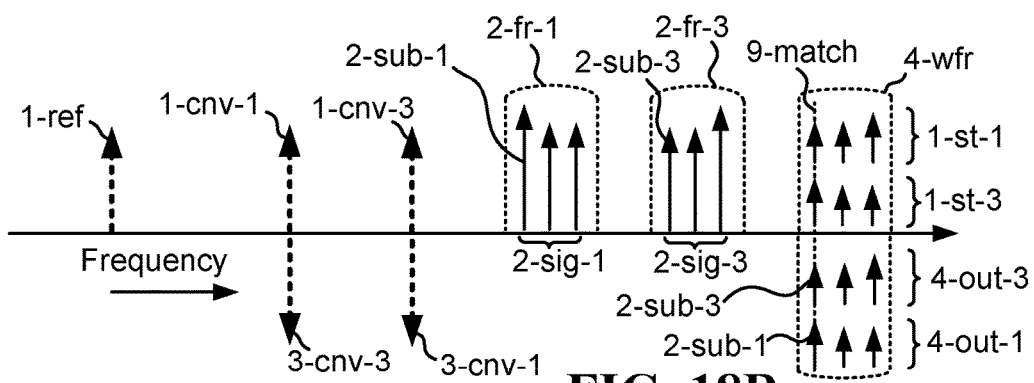
FIG. 18B illustrates one embodiment of various signals in a system operative to replicate an exact frequency match among a plurality of signals associated with spatial multiplexing.
Figure 18C:
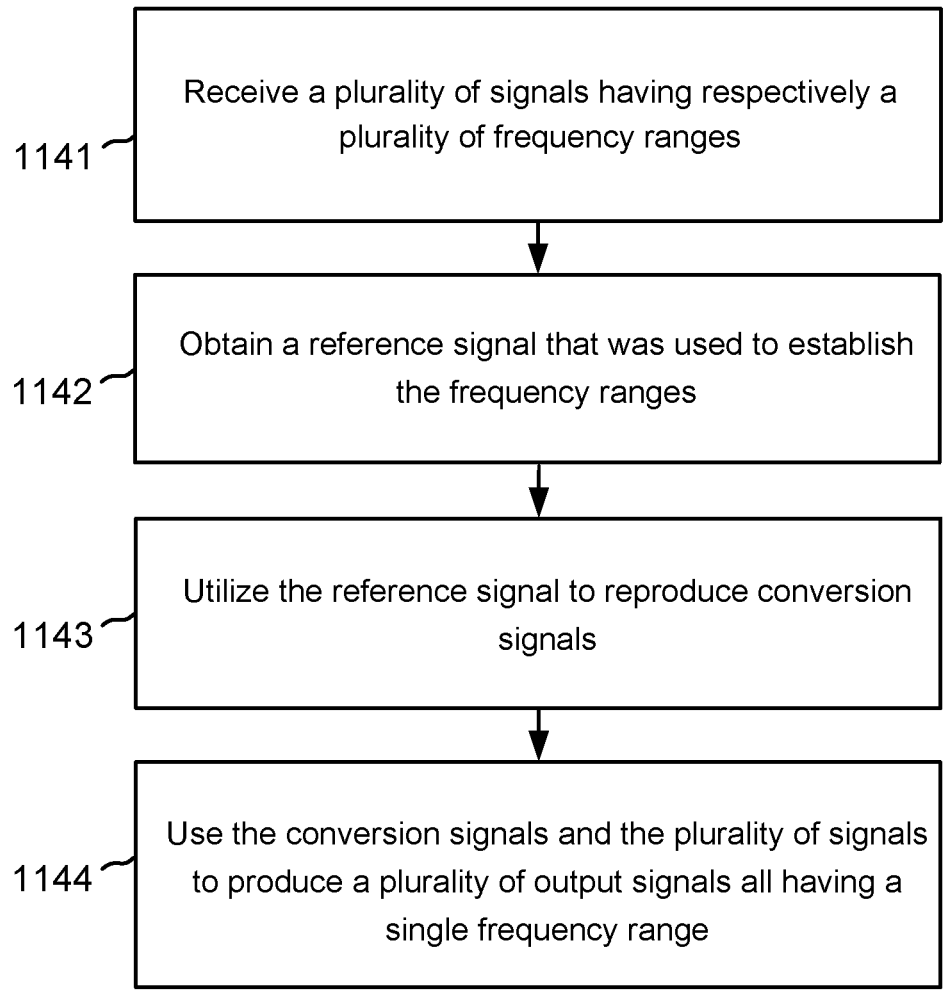
FIG. 18C illustrates one embodiment of a method for replicating an exact frequency match among a plurality of signals associated with spatial multiplexing.

The following paragraphs are associated with FIG. 18A, FIG. 18B, and FIG. 18C.

FIG. 18C illustrates one embodiment of a method for replicating an exact frequency match among a plurality of signals associated with spatial multiplexing. The method includes: In step 1141, receiving, in a converter 3-*con*-1 (FIG. 18A), a plurality of signals 2-*sig*-1, 2-*sig*-3 (FIG. 18A) occupying respectively a plurality of different frequency ranges 2-*fr*-1, 2-*fr*-3 (FIG. 18B), in which each of the signals 2-*sig*-1, 2-*sig*-3 is an orthogonal frequency division multiplexing (OFDM) signal comprising a plurality of sub-carriers (e.g., in FIG. 18B, signal 2-*sig*-1 comprises sub-carriers 2-*sub*-1, and signal 2-*sig*-3 comprises sub-carriers 2-*sub*-3), and in which the plurality of signals 2-*sig*-1, 2-*sig*-3 are associated respectively with a plurality of streams 1-*st*-1, 1-*st*-3 all occupying a single frequency range 4-*wfr* and generated in conjunction with spatial multiplexing. In step 1142, obtaining, in the converter 3-*con*-1, a reference signal 1-*ref* associated with a plurality of original conversion signals 1-*cnv*-1, 1-*cnv*-3, in which the original conversion signals were used originally outside the converter 3-*con*-1 to establish respectively said plurality of different frequency ranges 2-*fr*-1, 2-*fr*-3. In step 1143, utilizing the reference signal 1-*ref*, in the converter 3-*con*-1, to reproduce 3-*synt* the original plurality of conversion signals 1-*cnv*-1, 1-*cnv*-3 in a form of a respective plurality of replica conversion signals 3-*cnv*-1, 3-*cnv*-3. In step 1144, using, in the converter 3-*conv*-1, the plurality of replica conversion signals 3-*cnv*-1, 3-*cnv*-3 to respectively convert 3-*x*-1, 3-*x*-3 the plurality of signals 2-*sig*-1, 2-*sig*-3 into a plurality of output signals 4-*out*-1, 4-*out*-3 all occupying the single frequency range 4-*wfr*, thereby causing the plurality of sub-carriers of any of the output signals 4-*out*-1, 4-*out*-3 to now exactly match 9-*match* in frequency the respective plurality of sub-carriers of any of the other output signals (e.g., the frequency of sub-carrier 2-*sub*-1 of output signal 4-*out*-1 now exactly matches the frequency of sub-carrier 2-*sub*-3 of output signal 4-*out*-3), thereby now enabling wireless transmission and successful decoding of the plurality of output signals 4-*out*-1, 4-*out*-3, or a derivative hereof, in conjunction with the spatial multiplexing.

In one embodiment, said reception of the plurality of signals 2-*sig*-1, 2-*sig*-3 and the reference signal 1-*ref* is done via a wire-based medium 2-WM interconnecting the converter 3-*con*-1 with an access point 1-AP, in which the access point is the source of the plurality of signals 2-*sig*-1, 2-*sig*-3 and the reference signal 1-*ref*.

In one embodiment, the method further includes: converting 1-*synt*, by the access point 1-AP, the reference signal 1-*ref* into the plurality of original conversion signals 1-*cnv*-1, 1-*cnv*-3; using, by the access point 1-AP, the plurality of original conversion signals 1-*cnv*-1, 1-*cnv*-3 to convert 1-*x*-1, 1-*x*-3 the plurality of streams 1-*st*-1, 1-*st*-3 into the plurality of signals 2-*sig*-1, 2-*sig*-3, thereby constituting said establishing of the plurality of different frequency ranges 2-*fr*-1, 2-*fr*-3; and transmitting, by the access point 1-AP, the signals 2-*sig*-1, 2-*sig*-3 and the reference signal 1-*ref*, via the wire-based medium 2-WM, to the converter 3-*con*-1.

In one embodiment, said conversion 1-*synt*, by the access point 1-AP, of the reference signal 1-*ref* into the plurality original conversion signals 1-*cnv*-1, 1-*cnv*-3, is done by a first frequency synthesizer 1-*synt* using the reference signal 1-*ref* as an input to the first frequency synthesizer.

In one embodiment, said conversion 1-*synt*, by the access point 1-AP, of the plurality of streams 1-*st*-1, 1-*st*-3 into the plurality of signals 2-*sig*-1, 2-*sig*-3, is done with a plurality mixers 1-*x*-1, 1-*x*-3 respectively, using the plurality of original conversion signals 1-*cnv*-1, 1-*cnv*-3 as inputs to the plurality of mixers respectively.

In one embodiment: (i) said conversion 1-*synt*, by the access point 1-AP, of the reference signal 1-*ref* into the plurality of original conversion signals 1-*cnv*-1, 1-*cnv*-3, and (ii) said reproduction 3-*synt* of the plurality of replica conversion signals 3-*cnv*-1, 3-*cnv*-3 using the reference signal 1-*ref* in the converter 3-*con*-1, are essentially two identical processes utilizing the same reference signal 1-*ref*.

In one embodiment, said exact match 9-*match* is a match in which each of the sub-carriers (e.g., 2-*sub*-1) has the same frequency of the corresponding sub-carrier (e.g., 2-*sub*-3) to within an accuracy of better than 0.1 part-per-million (one tenth PPM), as a direct result of using said essentially two identical processes utilizing the same reference frequency 1-*ref*.

In one embodiment, said reproduction 3-*synt* of the plurality of replica conversion signals 3-*cnv*-1, 3-*cnv*-3, using the reference signal 1-*ref* in the converter 3-*con*-1, is done by a second frequency synthesizer 3-*synt* in the converter 3-*con*-1 using the reference signal 1-*ref* as an input to the second frequency synthesizer 3-*synt*.

In one embodiment, said conversion 3-*x*-1, 3-*x*-3, in the converter 3-*con*-1, of the plurality of signals 2-*sig*-1, 2-*sig*-3 into the plurality of output signals 4-*out*-1, 4-*out*-3 all occupying a single frequency range 4-*wfr*, is done respectively by a plurality of mixers 3-*x*-1, 3-*x*-3 in the converter 3-*con*-1 and using the plurality of replica conversion signals 3-*cnv*-1, 3-*cnv*-3 as an input to the plurality of mixers 3-*x*-1, 3-*x*-3 respectively.

In one embodiment, said exact match 9-*match* is a match in which each of the sub-carriers (e.g., 2-*sub*-1) has the same frequency of the corresponding sub-carrier (e.g., 2-*sub*-3) to within an accuracy of better than 1 part-per-million (one PPM).

In one embodiment, said exact match 9-*match* is a match in which each of the sub-carriers (e.g., 2-*sub*-1) has the same frequency of the corresponding sub-carrier (e.g., 2-*sub*-3) to within an accuracy of better than 0.1 part-per-million (one tenth PPM), as a direct result of said utilization of the reference signal 1-*ref*, in the converter 3-*con*-1, to reproduce 3-*synt*, 3-*cnv*-1, 3-*cnv*-3 the original plurality of conversion signals 1-*cnv*-1, 1-*cnv*-3.

In one embodiment, the single frequency range 4-*wfr* is a wireless frequency range (e.g., 2.4 GHz, or 3.5 GHz, or 5 GHz), in which the plurality of output signals 4-*out*-1, 4-*out*-3 are wireless output signals and are directly transmitted via a plurality of antennas 3-*ant*-1, 3-*ant*-3 respectively.

In one embodiment, the single frequency range 4-*wfr* is a base-band frequency range, in which the plurality of output signals 4-*out*-1, 4-*out*-3 are base-band output signals that are converted into a wireless frequency range and are then transmitted via a plurality of antennas respectively 3-*ant*-1, 3-*ant*-3.

Figure 19A:
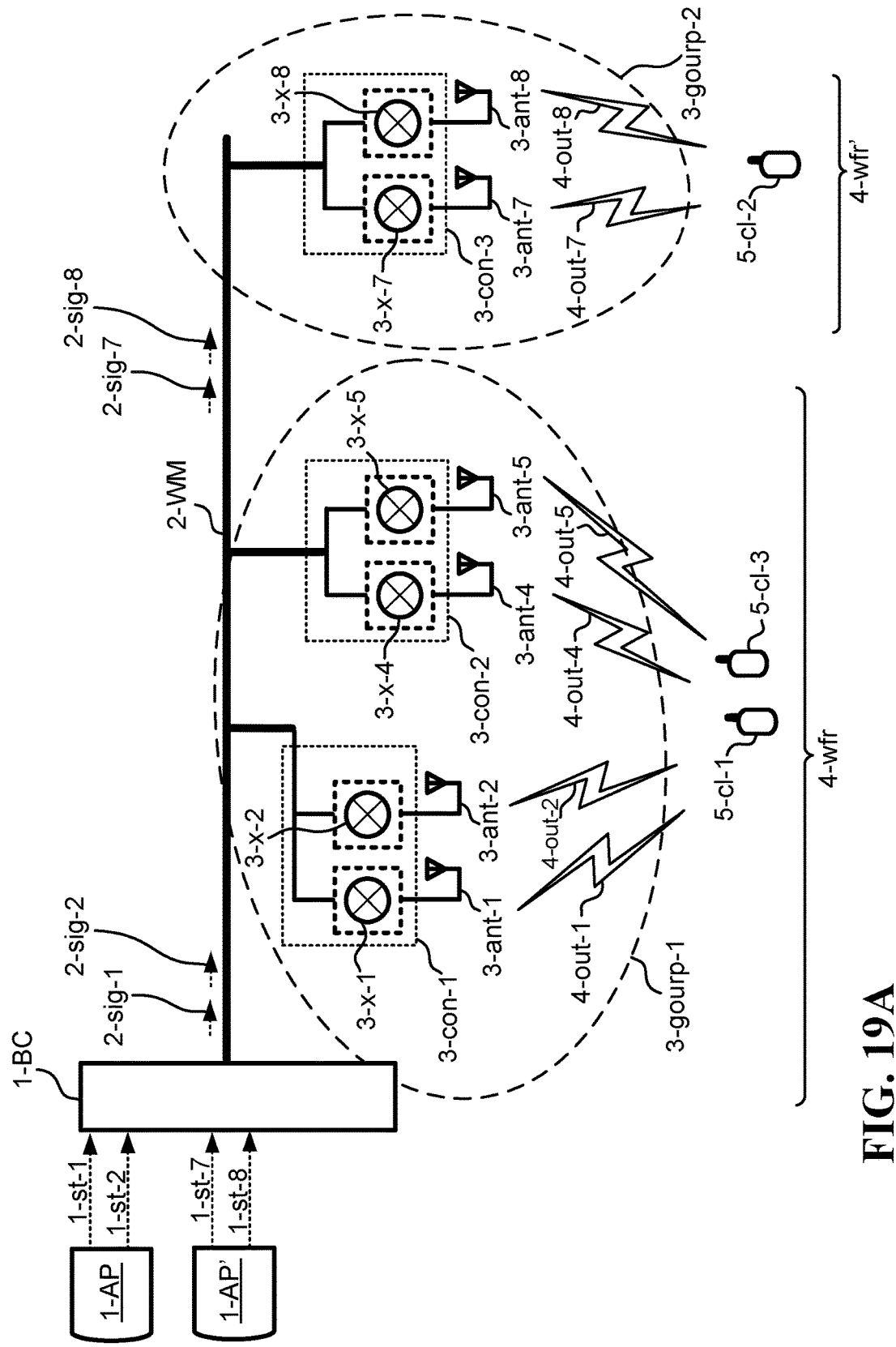
FIG. 19A illustrates one embodiment of a system operative to direct transmissions over a wire-based medium.
Figure 19B:
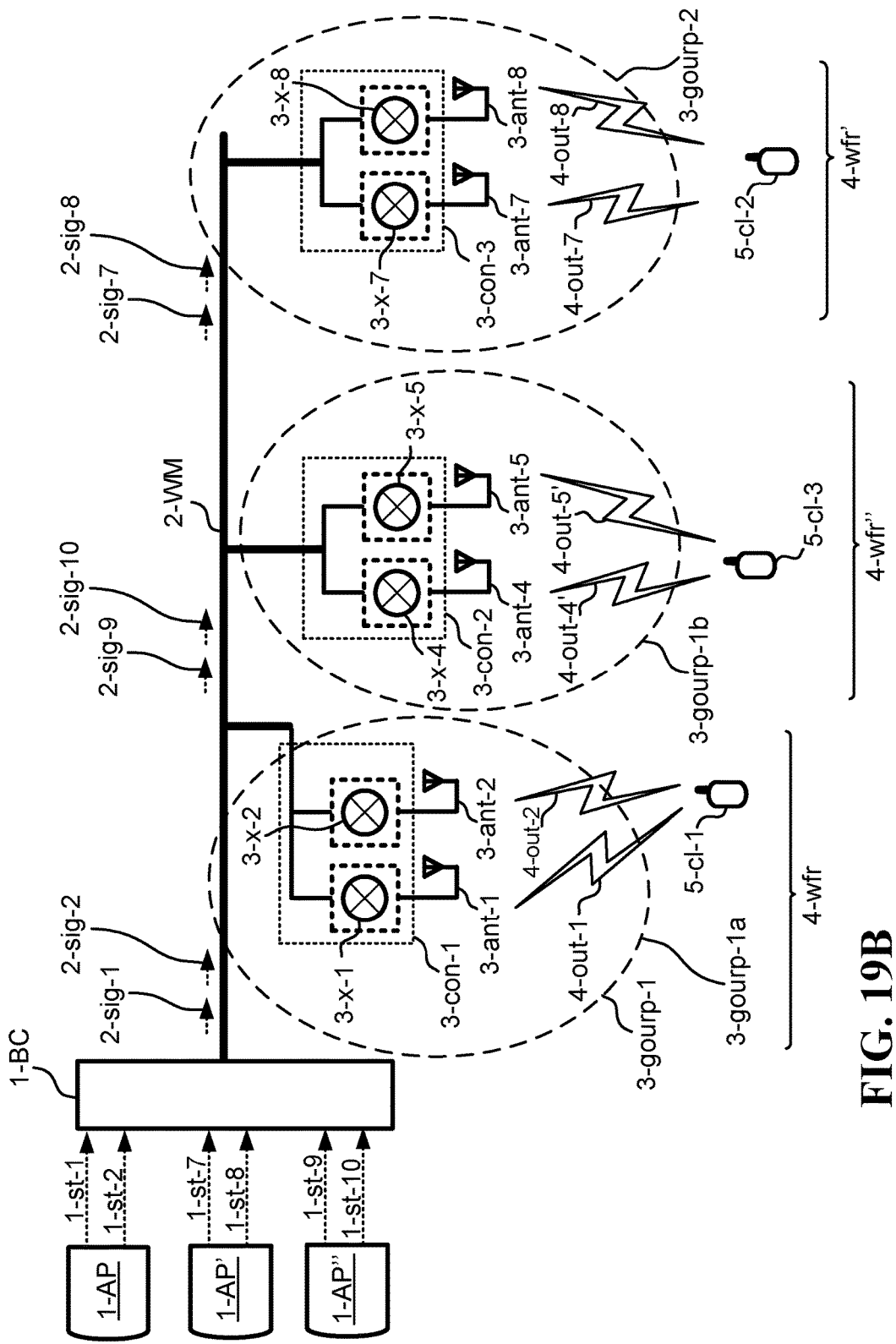
FIG. 19B illustrates one embodiment of a system operative to direct transmissions over a wire-based medium.
Figure 19C:
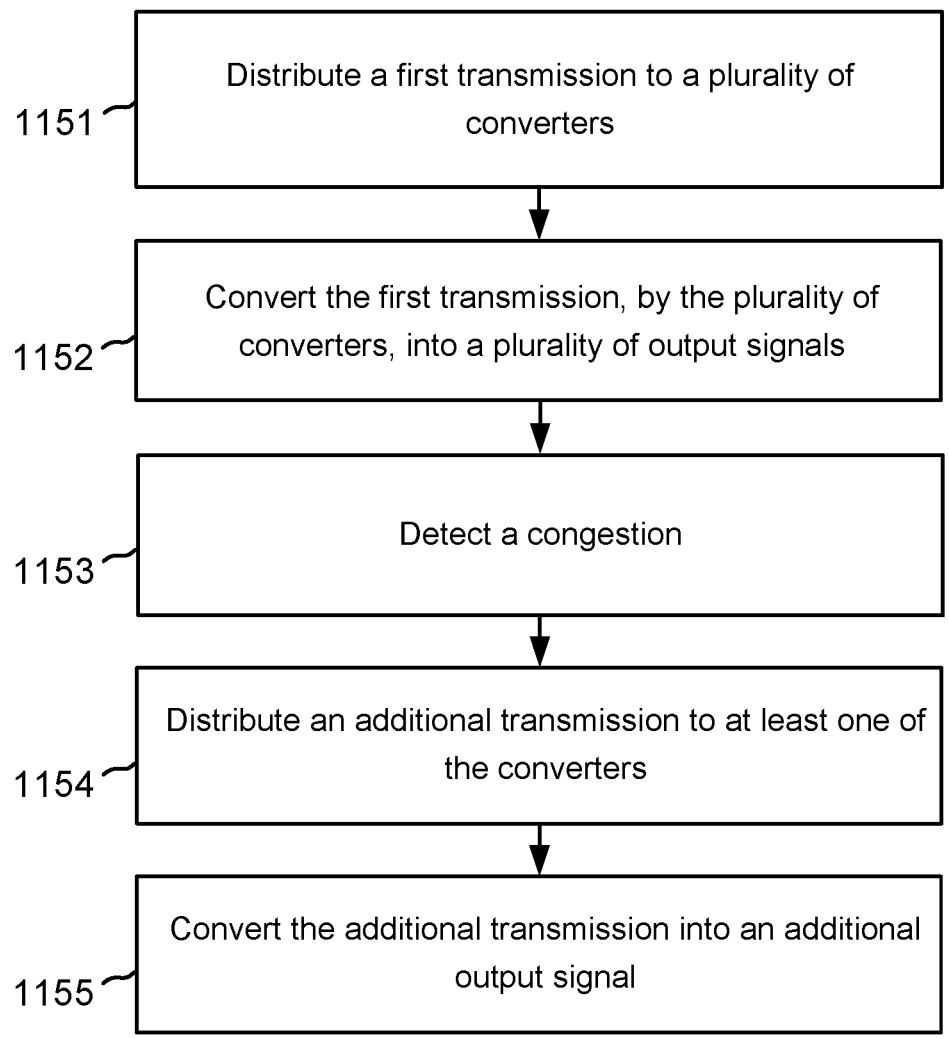
FIG. 19C illustrates one embodiment of a method for adapting a wireless communication system by reorganizing related transmissions over a wire-based medium.

The following paragraphs are associated with FIG. 19A, FIG. 19B, and FIG. 19C.

FIG. 19A and FIG. 19B illustrate a system operative to direct transmissions over a wire-based medium. The system includes: at least a first access point 1-AP operative to generate and receive transmissions in conjunction with wireless client devices; a plurality of converters 3-*con*-1, 3-*con*-2, 3-*con* 3 placed at a plurality of locations; and a wired-based medium 2-WM configured to connect electrically the first access point 1-AP with at least some or all of the plurality of converters 3-*con*-1, 3-*con*-2, 3-*con* 3.

In one embodiment, the system is configured to: group the plurality of converters 3-*con*-1, 3-*con*-2, 3-*con* 3 into at least two sub-groups 3-*group*-1, 3-*group*-2 (FIG. 19A) of the converters, in which each of the sub-groups comprises at least one of the converters (e.g., sub-group 3-*group*-1 contains the converters 3-*con*-1, 3-*con*-2, and sub-group 3-*group*-2 contains the converter 3-*con*-3); direct a first transmission, from the first access point 1-AP, via the wired-based medium 2-WM, in a form of at least a first signal 2-*sig*-1, 2-*sig*-2 (two signals are shown 2-*sig*-1, 2-*sig*-2, which are derived respectively from streams 1-*st*-1, 1-*st*-2 of the first transmission), so as to cause the first transmission to reach each of the converters in a first one of the sub-groups (e.g., 2-*sig*-1, 2-*sig*-2 reach converters 3-*con*-1, 3-*con*-2 of sub-group 3-*group*-1); receive the first transmission, by each of the converters 3-*con*-1, 3-*con*-2 in said first sub-group 3-*group*-1, via the wired-based medium 2-WM, in the form of the at least first signal 2-*sig*-1, 2-*sig*-2; and convert, by each of the converters 3-*con*-1, 3-*con*-2 in said first sub-group 3-*group*-1, the at least first signal 2-*sig*-1, 2-*sig*-2, thereby producing together a first wireless transmission 4-*out*-1, 4-*out*-2, 4-*out*-4, 4-*out*-5 to be received wirelessly by at least one wireless client device 5-*cl*-1, 5-*cl*-3 (FIG. 19A). For example, signal 2-*sig*-1 is converted by mixer 3-*x*-1 into output signal 4-*out*-1 and by mixer 3-*x*-4 into output signal 4-*out*-4, and signal 2-*sig*-2 is converted by mixer 3-*x*-2 into output signal 4-*out*-2 and by mixer 3-*x*-5 into output signal 4-*out*-5.

In one embodiment, the system further includes: a second access point 1-AP' (FIG. 19A), in which the wired-based medium 2-WM is configured to connect electrically the second access point 1-AP' with at least some or all of the plurality of converters 3-*con*-1, 3-*con*-2, 3-*con* 3; wherein the system is further configured to: direct a second transmission, from the second access point 1-AP', via the wired-based medium 2-WM, in a form of at least a second signal 2-*sig*-7, 2-*sig*-8 (two signals are shown 2-*sig*-7, 2-*sig*-8, which are derived respectively from streams 1-*st*-7, 1-*st*-8 of the second transmission), so as to cause the second transmission to reach each of the converters in a second one of the sub-groups (e.g., 2-*sig*-7, 2-*sig*-8 reach converter 3-*con*-3 of sub-group 3-*group*-2); receive the second transmission, by each of the converters 3-*con*-3 in said second sub-group 3-*group*-2, via the wired-based medium 2-WM, in the form of the at least second signal 2-*sig*-7, 2-*sig*-8; and convert, by each of the converters 3-*con*-3 in said second sub-group 3-*group*-2, the at least second signal 2-*sig*-7, 2-*sig*-8, into a second wireless transmission 4-*out*-7, 4-*out*-8 to be received wirelessly by at least one other wireless client device 5-*cl*-2. For example, signal 2-*sig*-7 is converted by mixer 3-*x*-7 into output signal 4-*out*-7, and signal 2-*sig*-8 is converted by mixer 3-*x*-8 into output signal 4-*out*-8.

In one embodiment, the first transmission is transmitted simultaneously with the second transmission.

In one embodiment, the first wireless transmission 4-*out*-1, 4-*out*-2, 4-*out*-4, 4-*out*-5 comprises a plurality of output signals 4-*out*-1, 4-*out*-2, 4-*out*-4, 4-*out*-5 transmitted wirelessly via a plurality of antennas respectively 3-*ant*-1, 3-*ant*-2, 3-*ant*-4, 3-*ant*-5, in which the plurality of output signals all occupy a single wireless frequency range 4-*wfr* (FIG. 19A).

In one embodiment, wherein the second wireless transmission 4-*out*-7, 4-*out*-8 comprises a plurality of output signals 4-*out*-7, 4-*out*-8 transmitted wirelessly via a plurality of antennas respectively 3-*ant*-7, 3-*ant*-8, in which the plurality of output signals all occupy a single different wireless frequency range 4-*wfr*' (FIG. 19A).

In one embodiment, the system further includes: an additional access point 1-AP" (FIG. 19B), in which the wired-based medium 2-WM is configured to connect electrically the additional access point 1-AP" with at least some or all of the plurality of converters 3-*con*-1, 3-*con*-2, 3-*con* 3; in which the system is further configured to: detect a congestion condition associated with the first transmission; group the converters 3-*con*-1, 3-*con*-2 in the first sub-group 3-*group*-1 (FIG. 19A) into at least two smaller groups 3-*group*-1a, 3-*group*-1b (FIG. 19B), in which each of the smaller groups comprises at least one of the converters from the first sub-group 3-*group*-1. For example, smaller group 3-*group*-1a comprises the converter 3-*con*-1, and smaller group 3-*group*-1b comprises the converter 3-*con*-2; direct the first transmission, from the first access point 1-AP, via the wired-based medium 2-WM, in the form of the at least first signal 2-*sig*-1, 2-*sig*-2, so as to cause the first transmission to reach each of the converters 3-*con*-1 in a first one of the smaller groups 3-*group*-1a; receive the first transmission, by each of the converters 3-*con*-1 in said first smaller group 3-*group*-1a, via the wired-based medium 2-WM, in the form of the at least first signal 2-*sig*-1, 2-*sig*-2; convert, by each of the converters 3-*con*-1 in said first smaller group 3-*group*-1a, the at least first signal 2-*sig*-1, 2-*sig*-2, into a first wireless transmission 4-*out*-1, 4-*out*-2 (FIG. 19B) to be received wirelessly by one of the client devices 5-*cl*-1 (FIG. 19B); direct an additional transmission, from the additional access point 1-AP", via the wired-based medium 2-WM, in a form of at least an additional signal 2-*sig*-9, 2-*sig*-10 (two signals are shown 2-*sig*-9, 2-*sig*-10, which are derived respectively from streams 1-*st*-9, 1-*st*-10 of the additional transmission), so as to cause the additional transmission to reach each of the converters 3-*con*-2 in a second one of the smaller groups 3-*group*-1b; receive the additional transmission, by each of the converters 3-*con*-2 in said second smaller group 3-*group*1b, via the wired-based medium 2-WM, in the form of the at least additional signal 2-*sig*-9, 2-*sig*-10; and convert, by each of the converters 3-*con*-2 in said second smaller group 3-*group*-1b, the at least additional signal 2-*sig*-9, 2-*sig*-10, into an additional wireless transmission 4-*out*-4', 4-*out*-5' (FIG. 19B) to be received wirelessly by another of the client devices 5-*cl*-3, thereby increasing a rate at which data is received by the client devices 5-*cl*-1, 5-*cl*-3 (FIG. 19B) and consequently resolving said congestion condition.

In one embodiment, the additional wireless transmission 4-*out*-4', 4-*out*-5' (FIG. 19B) comprises a plurality of additional output signals 4-*out*-4', 4-*out*-5' (FIG. 19B) transmitted wirelessly via a plurality of antennas respectively 3-*ant*-4, 3-*ant*-5, in which the plurality of additional output signals all occupy a single wireless frequency range 4-*wfr*'' (FIG. 19B).

In one embodiment, the wire-based medium 2-WM is a coaxial cable; the at least a first signal 2-*sig*-1, 2-*sig*-2 comprises two signals 2-*sig*-1 and 2-*sig*-2; the two signals 2-*sig*-1 and 2-*sig*-2 occupy different frequencies while transported over the wire-based medium 2-WM; and said conversion changes the two signals 2-*sig*-1, 2-*sig*-2 respectively into a first output signal and a second output signal 4-*out*-1, 4-*out*-2 occupying a single wireless frequency range 4-*wfr*.

In one embodiment, the at least additional signal 2-*sig*-9, 2-*sig*-10 comprises two additional signals 2-*sig*-9 and 2-*sig*-10; the two additional signals 2-*sig*-9 and 2-*sig*-10 occupy different frequencies in respect to each other and in respect to the two signals 2-*sig*-1, 2-*sig*-2, while transported over the wire-based medium 2-WM; and said conversion changes the two additional signals 2-*sig*-9, 2-*sig*-10 respectively into a first additional output signal and a second additional output signal 4-*out*-4', 4-*out*-5' occupying a single different wireless frequency range 4-*wfr*''.

In one embodiment, the wire-based medium 2-WM comprises a plurality of multi-conductor cables (e.g., 2-*multi*-1, FIG. 15A) comprising a plurality of conductors (e.g., 2-1-1, FIG. 15A); the at least a first signal 2-*sig*-1, 2-*sig*-2 comprises two signals 2-*sig*-1 and 2-*sig*-2; and the two signals 2-*sig*-1, 2-*sig*-2 occupy different conductors (e.g., 2-*sig*-1 occupies 2-1-1, and 2-*sig*-2 occupies 2-1-2, FIG. 15A) when transported over the wire-based medium 2-WM, in accordance with some embodiments associated with FIG. 15A.

In one embodiment, the at least a additional signal 2-*sig*-9, 2-*sig*-10 comprises two additional signals 2-*sig*-9 and 2-*sig*-10; and the two additional signals 2-*sig*-9, 2-*sig*-10 occupy different conductors (e.g., 2-*sig*-9 occupies 2-2-1, and 2-*sig*-10 occupies 2-2-2, FIG. 15A) when transported over the wire-based medium 2-WM.

In one embodiment, the multi-conductor cables are multi-paired cables, such as category 5 cables (CAT5).

In one embodiment, the first sub-group 3-*group*-1 comprises at least a first converter and a second converter 3-*con*-1, 3-*con*-2 respectively; the at least first signal is at least two multiple-input-multiple-output (MIMO) signals 2-*sig*-1, 2-*sig*-2 derived respectively from at least two streams 1-*st*-1, 1-*st*-2 associated with spatial multiplexing; each of the first and second converters 3-*con*-1, 3-*con*-2 receives the at least two multiple-input-multiple-output (MIMO) signals 2-*sig*-1, 2-*sig*-2; and the first wireless transmission 4-*out*-1, 4-*out*-2, 4-*out*-4, 4-*out*-5 is a MIMO transmission comprising a first wireless transmission instance 4-*out*-1, 4-*out*-2 converted by the first converter 3-*con*-1 from the two MIMO signals 2-*sig*-1, 2-*sig*-2 and transmitted via antennas 3-*ant*-1, 3-*ant*-2 in the first sub-group 3-*group*-1, and a second wireless transmission instance 4-*out*-4, 4-*out*-5 converted by the second converter 3-*con*-2 from the same two MIMO signals 2-*sig*-1, 2-*sig*-2 and transmitted via antennas 3-*ant*-4, 3-*ant*-5 in the first sub-group 3-*group*-1.

In one embodiment, the first access point 1-AP is a wifi access point supporting at least partly a standard associated with IEEE 802.11, such as IEEE 802.11n or IEEE 802.11ac, in which said spatial multiplexing in conjunction with the two MIMO signals 2-*sig*-1, 2-*sig*-2 is part of said standard.

FIG. 19C illustrates one embodiment of a method for adapting a wireless communication system by reorganizing related transmissions over a wire-based medium. The method includes: In step 1151, distributing (FIG. 19A), to a plurality of converters 3-*con*-1, 3-*con*-2, via a wire-based medium 2-WM, a first transmission in a form of a first signal 2-*sig*-1, 2-*sig*-2. In step 1152, converting (FIG. 19A), by each of the plurality of converters 3-*con*-1, 3-*con*-2, the first signal 2-*sig*-1, 2-*sig*-2 into an output signal (e.g., 2-*sig*-1, 2-*sig*-2 is converted by 3-*con*-1 into 4-*out*-1, 4-*out*-2, and the same 2-*sig*-1, 2-*sig*-2 is converted by 3-*con*-2 into 4-*out*-4, 4-*out*-5), thereby producing respectively a plurality of output signals 4-*out*-1, 4-*out*-2, 4-*out*-4, 4-*out*-5 all occupying a single wireless frequency range 4-*wfr*. In step 1153, detecting a congestion condition associated with the first transmission. In step 1154, distributing (FIG. 19B), as a result of said detection, to at least one of the converters in the plurality (e.g., to converter 3-*con*-2), via the wire-based medium 2-WM, an additional transmission in a form of an additional signal 2-*sig*-9, 2-*sig*-10. In step 1155, converting (FIG. 19B), by said at least one of the converters 3-*con*-2, the additional signal 2-*sig*-9, 2-*sig*-10 into an additional output signal 4-*out*-4', 4-*out*-5' occupying a single different wireless frequency range 4-*wfr*'', thereby allowing the additional transmission to coexist with the first transmission, and consequently resolving said congestion condition detected.

The following paragraphs are associated with FIG. 20A, FIG. 20B, FIG. 20C, and FIG. 20D.

Figure 20A:
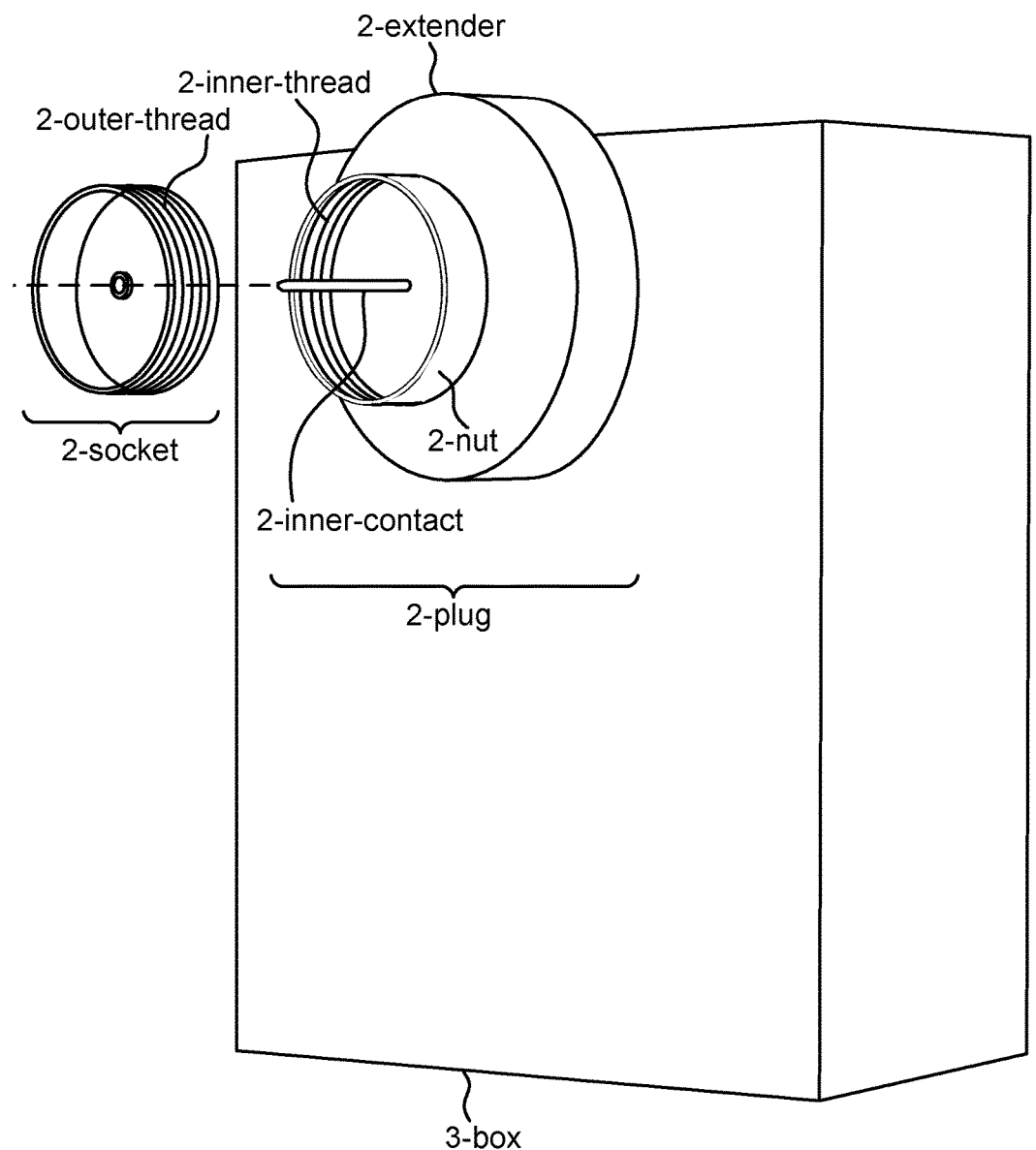
FIG. 20A illustrates one embodiment of a system operative to be easily fastened to a wall-mounted socket having an outer thread.
Figure 20B:
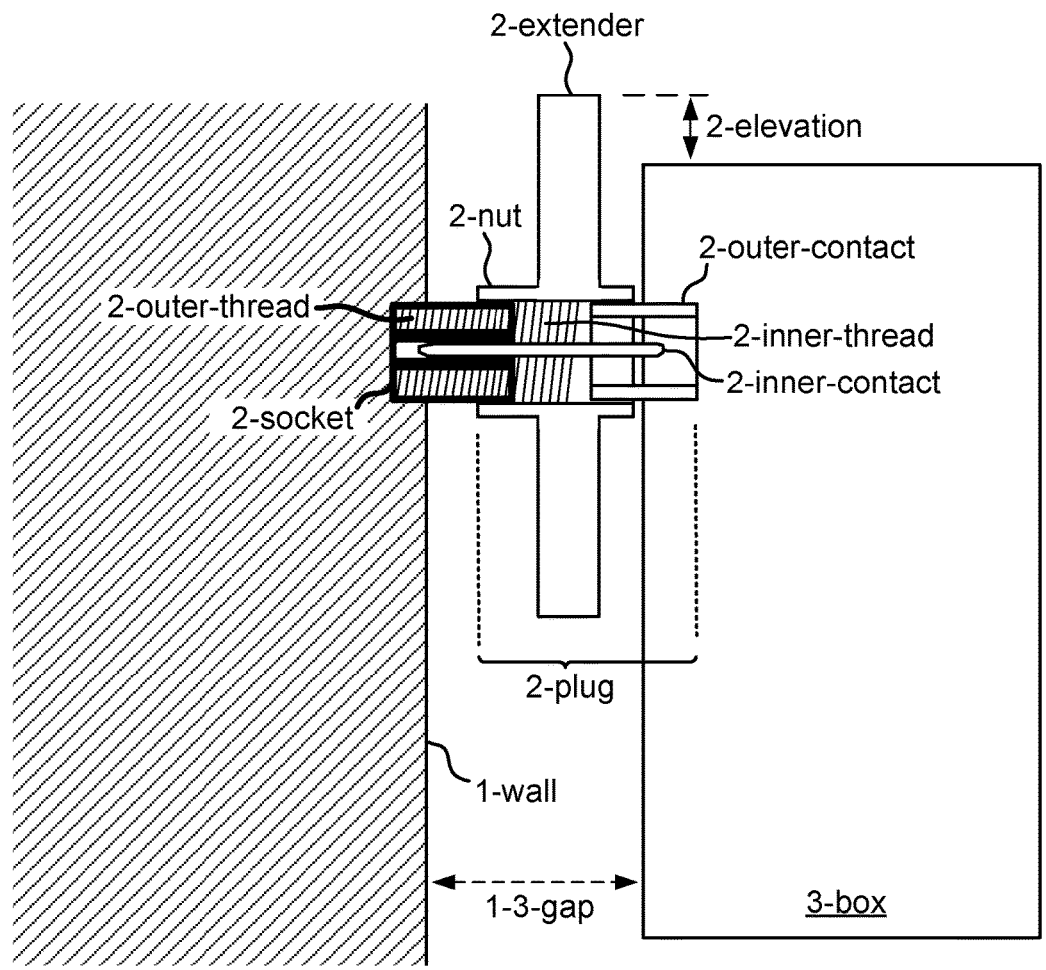
FIG. 20B illustrates one embodiment of a system operative to be easily fastened to a wall-mounted socket having an outer thread.
Figure 20C:
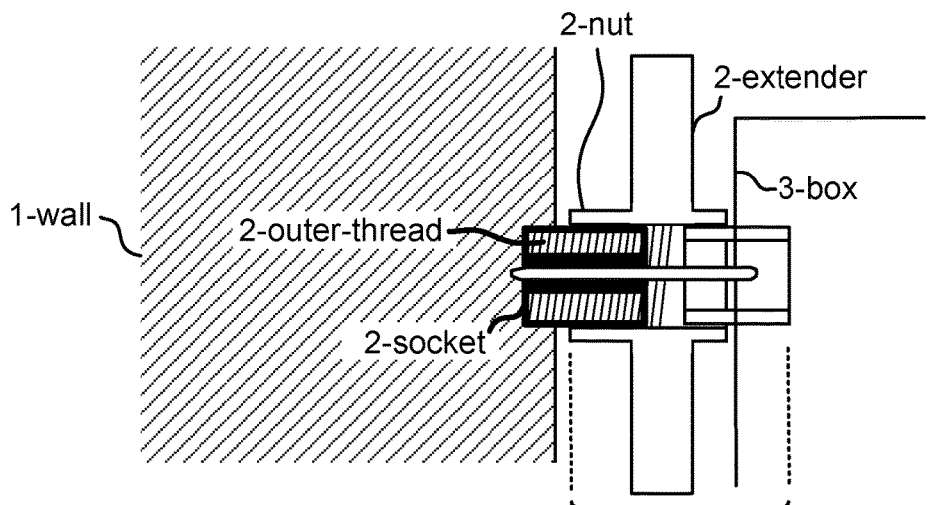
FIG. 20C illustrates one embodiment of a system operative to be easily fastened to a wall-mounted socket having an outer thread.

FIG. 20A, FIG. 20B, and FIG. 20C illustrates one embodiment of a system operative to be easily fastened to a wall-mounted socket having an outer thread. The system includes: a coaxial plug 2-*plug* comprising: (i) a rotating nut-like envelop 2-*nut* having an inner-thread 2-*inner-thread*, (ii) an outer contact 2-*outer-contact*, (iii) an inner contact 2-*inner-contact*, and (iv) an extender 2-*extender*, in which the extender 2-*extender* surrounds the rotating nut-like envelop 2-*nut* and is mechanically fixed to the rotating nut-like envelop 2-*nut*, and the rotating nut-like envelop 2-*nut* is connected to the outer contact 2-*outer-contact* in such a way that allows the rotating nut-like envelop 2-*nut* to freely rotate about the outer contact 2-*outer-contact*; and a box 3-*box* operative to house electronic components, in which the outer contact 2-*outer-contact* is mechanically fixed to the box 3-*box*, either directly or indirectly.

In one embodiment, the box 3-*box* is operative to be placed in contact with a wall-mounted coaxial socket 2-*socket* having an outer thread 2-*outer-tread*, such that the rotating nut-like envelop 2-*nut* engulfs the wall-mounted coaxial socket 2-*socket*, and such that the rotating nut-like envelop 2-*nut* is now sandwiched between the box 3-*box* and a wall 1-*wall* on which the wall-mounted coaxial socket 2-*socket* is mounted; and the extender 2-*extender* is operative to allows a user to mechanically access the rotating nut-like envelop 2-*nut*, now sandwiched between the box 3-*box* and the wall 1-*wall*, thereby further allowing the user to rotate the rotating nut-like envelop 2-*nut* about the wall-mounted coaxial socket 2-*socket* using the extender 2-*extender*, and thereby fastening, in a screw-like rotation movement involving the outer thread 2-*outer-tread* engaging the inner thread 2-*inner-thread*, the rotating nut-like envelop 2-*nut* into the wall-mounted coaxial socket 2-*socket*, in which said screw-like action mechanically fastens the box 3-*box* to the wall-mounted coaxial socket 2-*socket* and the wall 1-*wall*, and consequently facilitates a stable electrical contact between the outer contact 2-*outer-contact* and the wall-mounted coaxial socket 2-*socket*, and between the inner contact 2-*inner-contact* and the wall-mounted coaxial socket 2-*socket*.

In one embodiment, the coaxial plug 2-*plug* is a F-Type coaxial plug; and the wall-mounted coaxial socket 2-*socket* is a F-type coaxial socket acting as a mating bolt for said rotating nut-like envelop 2-*nut*.

In one embodiment, the coaxial plug 2-*plug* is the only contact of the system with the wall-mounted coaxial socket 2-*socket* and the wall 1-*wall*, hereby placing the entire weight of the system on said coaxial plug 2-*plug*.

In one embodiment, the entire weight of the system is more than 100 (one hundred) grams.

In one embodiment, the entire weight of the system is more than 500 (five hundred) grams.

In one embodiment, said stable electrical contact allows for electrical signals (e.g., 2-*sig*-1, 2-*sig*-2, 2-*sig*-3, FIG. 1A) to propagate from a coaxial cable (e.g., 2-WM, FIG. 1A) embedded in the wall 1-*wall* to the electronic components (e.g., 3-*x*-1, 3-*x*-2, 3-*x*-3, FIG. 1A) located in the box 3-*box* and vice versa.

In one embodiment, said extender 2-*extender* is configured to act as a wrench operative to grip and apply a twisting torque on the rotating nut-like envelop 2-*nut*, thereby facilitating said screw-like rotation movement.

In one embodiment, the rotating nut-like envelop 2-*nut*, when sandwiched between the box 3-*box* and the wall 1-*wll*, is hidden from the user, and thereby necessitating the use of the extender 2-*extender* to achieve said screw-like rotation movement.

In one embodiment, the extender 2-*extender* is elevated 2-*elevation* (FIG. 20B) above the box 3-*box*, thereby allowing said gripping when the rotating nut-like envelop 2-*nut* is sandwiched between the box 3-*box* and the wall 1-*wall*.

Figure 20D:
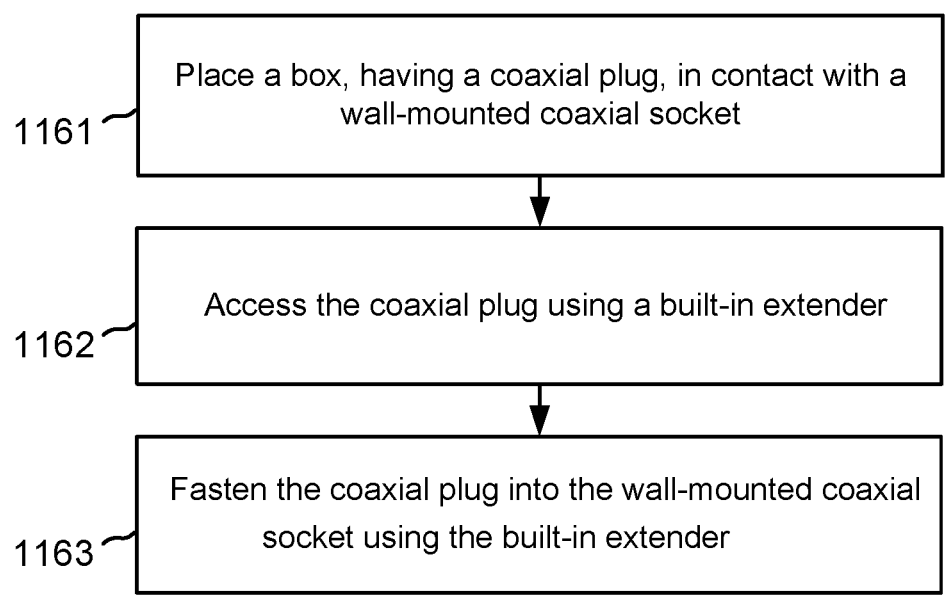
FIG. 20D illustrates one embodiment of a method for easily fastening a box to a wall-mounted socket.

FIG. 20D illustrates one embodiment of a method for easily fastening a box to a wall-mounted socket. The method includes: In step 1161, placing (FIG. 20B) a box 3-*box*, having a coaxial plug 2-*plug*, in contact with a wall-mounted coaxial socket 2-*socket*, so as to initially cause the coaxial plug 2-*plug* to engulf the wall-mounted coaxial socket 2-*socket*, thereby hiding said coaxial plug 2-*plug* between the box 3-*box* and a wall 1-*wall* on which the a wall-mounted coaxial socket 2-*socket* is mounted. In step 1162, accessing the coaxial plug 2-*plug*, now hidden between the box 3-*box* and the wall 1-*wall*, using a built-in extender 2-*extender*. In step 1163, fastening (FIG. 20C) the coaxial plug 2-*plug* into the wall-mounted coaxial socket 2-*socket* using the built-in extender 2-*extender* as a wrench.

The present invention should not be considered limited to the particular embodiments described above, but rather should be understood to cover all aspects of the invention as fairly set out in the present claims. Various modifications, equivalent processes, as well as numerous structures to which the present invention may be applicable, will be readily apparent to those skilled in the art to which the present invention is directed upon review of the present disclosure. The claims are intended to cover such modifications.

What is claimed is:

1. A system operative to use spatial multiplexing in conjunction with a coaxial cable deployed in-house, comprising:

a base converter;

a coaxial cable deployed in-house, said coaxial cable reaching into a certain room located in-house; and a plurality of antennas located in the certain room;

wherein the system is configured to:

convert, in the base converter, a plurality of streams associated with spatial multiplexing, respectively, into a plurality of signals occupying, respectively, a plurality of different frequencies;

transport the plurality of signals, in conjunction with the plurality of different frequencies, via the coaxial cable, into the certain room, thereby enabling a presence of the plurality of signals in the certain room;

shift the plurality of signals into, respectively, a plurality of output signals, in which all said output signals occupy a single wireless frequency, and in which said shift is achieved by up-converting each one of the signals, which are now present in the certain room, from the corresponding one of the different frequencies into the single wireless frequency; and transmit wirelessly, using only the single wireless frequency, the plurality of output signals, respectively, via the plurality of antennas located in the certain room, all said antennas operating in conjunction with the single wireless frequency, thereby achieving spatial multiplexing in the certain room and in conjunction with the coaxial cable;

wherein the plurality of different frequencies are located below 1.5 GHz, at frequency zones that are, at least momentarily, not occupied by in-house coaxial signals including DOCSIS signals, MoCA signals, and cable TV signals; and wherein the plurality of streams are input to the base converter, from an access point, in a radio frequency form at frequency bands above 1.5 GHz; and said conversion of the plurality of streams, respectively, into the plurality of signals is performed, respectively, by a plurality of mixers in the base converter, the mixers operating as down-converters.

2. The system of claim 1, further comprising an access point operative to generate the plurality of streams from at least a single data stream.

3. The system of claim 2, wherein the access point is co-located together with the base converter.

4. The system of claim 3, wherein the access point and the base converter are co-located in a second room, and the coaxial cable is operative to communicatively connect together at least the second room and the certain room.

5. The system of claim 2, wherein the access point is a WiFi access point supporting at least partly a standard associated with IEEE 802.11, and the spatial multiplexing in conjunction with the plurality of streams is part of the standard.

6. The system of claim 5, wherein the standard includes IEEE 802.11n, IEEE 802.11ac, or IEEE 802.11ax, or a combination of any of the foregoing.

7. The system of claim 5, wherein the plurality of output signals all occupying the single wireless frequency are associated with the standard.

8. The system of claim 7, wherein the single wireless frequency is a single channel associated with the standard, and the single channel is associated with an unlicensed ISM band selected from a group of unlicensed bands consisting of: (i) a 2.4 GHz band and (ii) a 5 GHz band.

9. The system of claim 7, wherein the plurality of output signals are received by a client device in the certain room as facilitated by the coaxial cable, thereby improving in-house WiFi communication.

10. The system of claim 2, wherein the access point is an LTE or a 5G access point or an LTE or a 5G base station, the LTE or 5G access point or the LTE or 5G base station supporting at least partly a standard associated with LTE or 5G, respectively, in which the spatial multiplexing in conjunction with the plurality of streams are part of the standard.

11. The system of claim 10, wherein:
the plurality of output signals all occupying the single wireless frequency are associated with the standard;
the single wireless frequency is a single channel associated with the standard; and
the single channel is associated with a licensed band selected from a group of licensed bands consisting of: (i) a 1.8 GHz band, (ii) a 1.9 GHz band, (iii) a 2.0 GHz band, (iv) a 2.3 GHz band, (v) a 2.5 GHz band, and (vi) a 3.5 GHz band.

12. The system of claim 10, wherein the plurality of output signals are in a licensed band and are each transmitted at a power level below 10 (ten) dBm and above −30 (minus thirty) dBm.

13. The system of claim 1, wherein the frequency bands above 1.5 GHz include a 1.8 GHz band, a 1.9 GHz band, a 2.0 GHz band, a 2.3 GHz band, a 2.4 GHz band, a 2.5 GHz band, or a 5 GHz band, or a combination of any of the foregoing.

* * * * *